US011866956B2

(12) United States Patent
Allen

(10) Patent No.: US 11,866,956 B2
(45) Date of Patent: Jan. 9, 2024

(54) FORCE LIMITER AND ENERGY DISSIPATER

(71) Applicant: John Damian Allen, Auckland (NZ)

(72) Inventor: John Damian Allen, Auckland (NZ)

( * ) Notice: Subject to any disclaimer, the term of this patent is extended or adjusted under 35 U.S.C. 154(b) by 217 days.

(21) Appl. No.: 16/486,590

(22) PCT Filed: Oct. 5, 2017

(86) PCT No.: PCT/IB2017/056135
§ 371 (c)(1),
(2) Date: Aug. 16, 2019

(87) PCT Pub. No.: WO2018/150234
PCT Pub. Date: Aug. 23, 2018

(65) Prior Publication Data
US 2020/0011391 A1    Jan. 9, 2020

(30) Foreign Application Priority Data

Feb. 16, 2017 (NZ) ......................................... 729195
Feb. 16, 2017 (NZ) ......................................... 729197

(51) Int. Cl.
*E04H 9/02* (2006.01)
*A47B 91/04* (2006.01)
(Continued)

(52) U.S. Cl.
CPC ............. *E04H 9/021* (2013.01); *A47B 91/04* (2013.01); *A47B 96/00* (2013.01); *B65G 1/02* (2013.01);
(Continued)

(58) Field of Classification Search
CPC ... F16F 1/027; F16F 7/12; F16F 13/00; E04B 1/36; E04B 1/98; E04H 9/021; A47B 91/04; E02D 5/80
(Continued)

(56) References Cited

U.S. PATENT DOCUMENTS 4,187,573 A  *  2/1980  Fyfe ...................... E01D 19/041
                                                        248/580
5,161,655 A     11/1992  Shimoda
                         (Continued)

FOREIGN PATENT DOCUMENTS

IT    PI20090109 A1    3/2011
JP       3140573 A     6/1991
                 (Continued)

OTHER PUBLICATIONS

Allen, J.D. et al, "Limit Analysis of Plates and Isoperimetric Inequalities," School of Engineering, University of Auckland, Auckland, New Zealand; The Royal Society Great Britain 1994; Excerpt from p. 113.

(Continued)

*Primary Examiner* — Brian E Glessner
*Assistant Examiner* — Adam G Barlow
(74) *Attorney, Agent, or Firm* — Avyno Law P.C.

(57) ABSTRACT

An earthquake force limiter and energy dissipater for racks or buildings. The device allowing stable yielding action of a flexure plate to enable control structures or standard structural frames to form a stable cycling high displacement elasto-plastic mechanism in resistive response to a seismic ground motion input. The stable flexural yielding of the plates limits the magnitude of forces developed within the control structure of which the plates are part of; or within a standard structural frame found in racking structures or general building structures, which the plate is typically directly supportive of. The design reduces prying action or tensile or compressive membrane forces developing in a plate of the device; so that the plate can maintain a stable constant resistive force while yielding to high transverse displacements.

29 Claims, 27 Drawing Sheets

(51) Int. Cl.

| | |
|---|---|
| *E02D 5/80* | (2006.01) |
| *E04B 1/98* | (2006.01) |
| *F16F 1/02* | (2006.01) |
| *F16F 13/00* | (2006.01) |
| *F16M 13/02* | (2006.01) |
| *A47B 96/00* | (2006.01) |
| *B65G 1/02* | (2006.01) |
| *E04B 1/36* | (2006.01) |
| *F16F 7/12* | (2006.01) |

(52) U.S. Cl.
CPC .............. *E02D 5/80* (2013.01); *E04B 1/36* (2013.01); *E04B 1/98* (2013.01); *F16F 1/027* (2013.01); *F16F 7/12* (2013.01); *F16F 13/00* (2013.01); *F16M 13/02* (2013.01); *A47B 2220/0027* (2013.01); *A47B 2220/0061* (2013.01); *F16F 2224/0208* (2013.01); *F16M 2200/08* (2013.01)

(58) Field of Classification Search
USPC ...................... 52/167.4, 17.7, 167.8
See application file for complete search history.

(56) References Cited

U.S. PATENT DOCUMENTS

| | | | | |
|---|---|---|---|---|
| 5,509,238 | A * | 4/1996 | Scalfati | E04H 9/021 |
| | | | | 52/167.7 |
| 6,324,795 | B1 * | 12/2001 | Stiles | E02D 27/34 |
| | | | | 52/167.7 |
| 7,249,442 | B2 * | 7/2007 | Pellegrino | A47F 5/0018 |
| | | | | 248/564 |
| 7,263,806 | B2 * | 9/2007 | Pellegrino | A47B 47/021 |
| | | | | 248/564 |
| 11,002,032 | B2 * | 5/2021 | Almazán Campillay | |
| | | | | F16F 1/44 |
| 2001/0005961 | A1 | 7/2001 | Fukuta et al. | |
| 2010/0251637 | A1 * | 10/2010 | Nishimoto | E04H 9/021 |
| | | | | 52/167.8 |
| 2010/0293873 | A1 | 11/2010 | Mualla | |
| 2012/0038091 | A1 | 2/2012 | Tagawa | |
| 2012/0304587 | A1 * | 12/2012 | Kenho | F16F 15/06 |
| | | | | 52/699 |
| 2014/0115979 | A1 * | 5/2014 | Kenho | F16F 7/12 |
| | | | | 52/167.7 |
| 2014/0174002 | A1 | 6/2014 | Mualla | |
| 2014/0374974 | A1 | 12/2014 | Goold et al. | |
| 2015/0101269 | A1 | 4/2015 | Moreno et al. | |
| 2016/0115703 | A1 * | 4/2016 | Katayama | E04H 9/022 |
| | | | | 52/741.3 |
| 2016/0237681 | A1 * | 8/2016 | Tanaka | E02D 27/42 |
| 2017/0081845 | A1 | 3/2017 | Kinoshita et al. | |
| 2017/0107734 | A1 | 4/2017 | Gray et al. | |
| 2017/0145686 | A1 | 5/2017 | Lee et al. | |
| 2017/0276204 | A1 | 9/2017 | Uno et al. | |
| 2018/0216687 | A1 * | 8/2018 | Thompson | F16F 3/12 |
| 2020/0318373 | A1 * | 10/2020 | Almazán Campillay | |
| | | | | F16F 1/3732 |

FOREIGN PATENT DOCUMENTS

| | | |
|---|---|---|
| JP | 7285623 | 10/1995 |
| JP | 2002338018 A | 11/2002 |
| JP | 2004069067 A | 3/2004 |
| JP | 200492096 A | 5/2004 |
| WO | 9314279 A1 | 7/1993 |
| WO | 2009124985 A2 | 10/2009 |
| WO | 2011029749 A1 | 3/2011 |
| WO | 2015025821 A1 | 2/2015 |
| WO | 2018150235 A1 | 8/2018 |

OTHER PUBLICATIONS

Lowe P.G., "Classical Theory of Structures Based on the Differential Equation," Cambridge at the University Press; 1971; Excerpts from pp. 2,3,6,7,146,147.

Raney, Joshua Michael et al, "Influence of Boundary Conditions on Building Behavior," American Society for Engineering Education, 2015; 122nd ASEE Annual Conference and Exposition Jun. 14-17, 2015, Seattle, WA; pp. 26.959.1-26.959.9.

\* cited by examiner

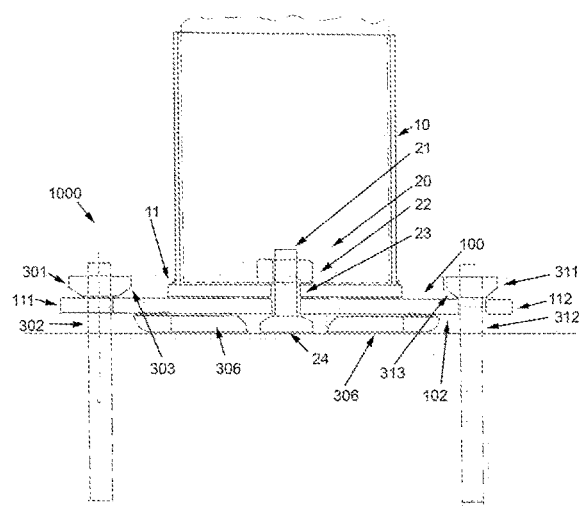
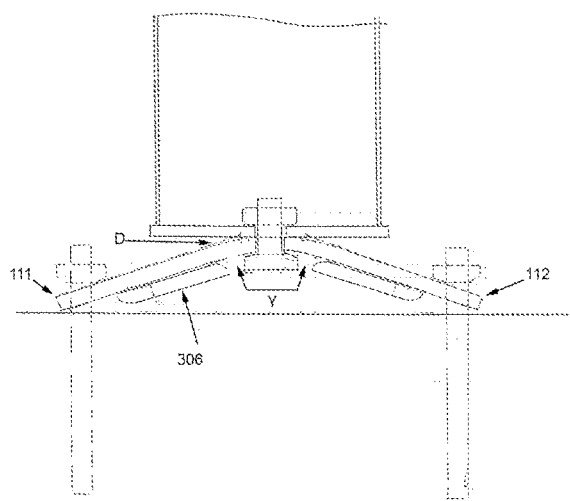
FIGURE 1A
FIGURE 1B
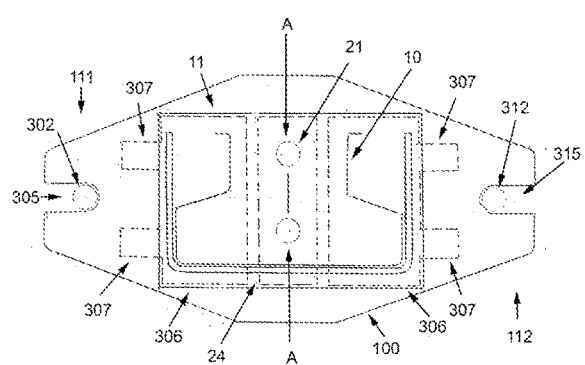
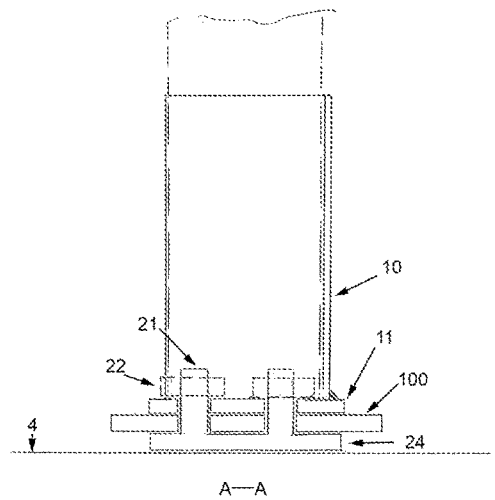
FIGURE 1C
FIGURE 1D
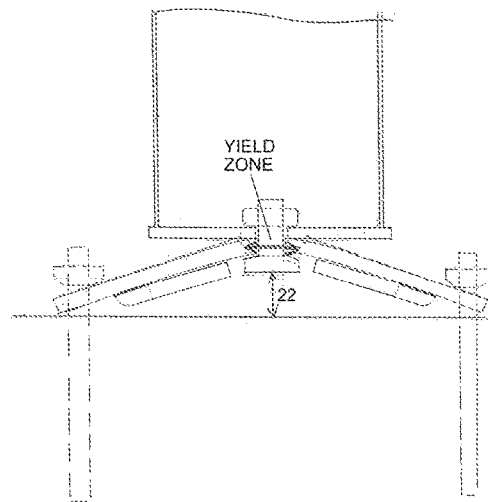
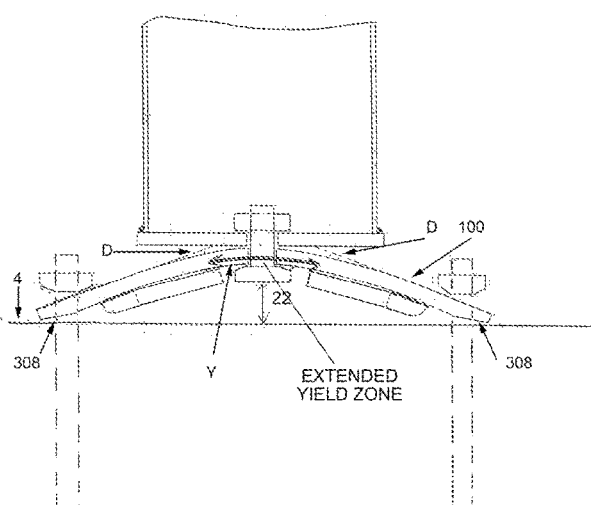
FIGURE 1E
FIGURE 1F

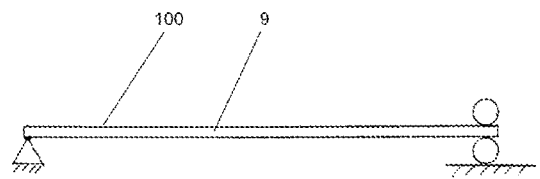
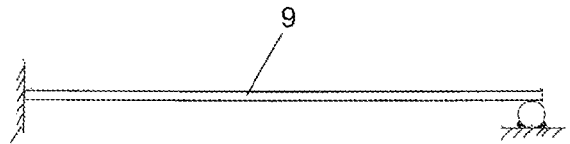
FIGURE 1G　　　　　　　　　FIGURE 1H
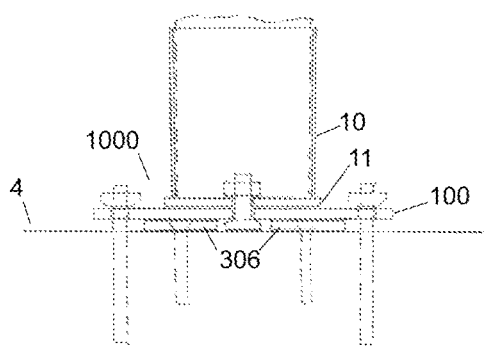
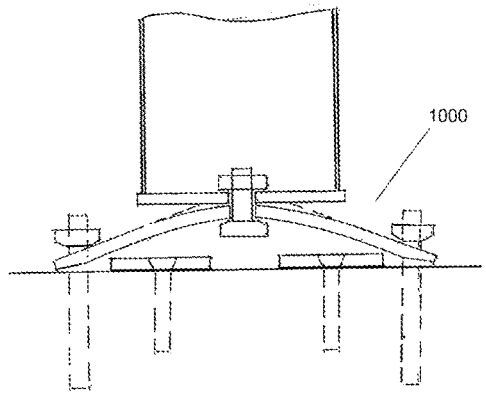
FIGURE 2A　　　　　　　　　FIGURE 2B
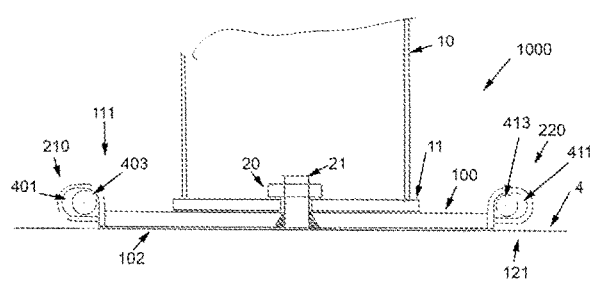
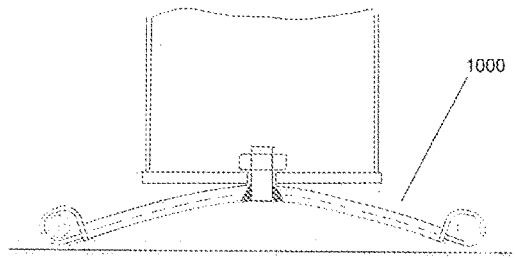
FIGURE 3A　　　　　　　　　FIGURE 3B

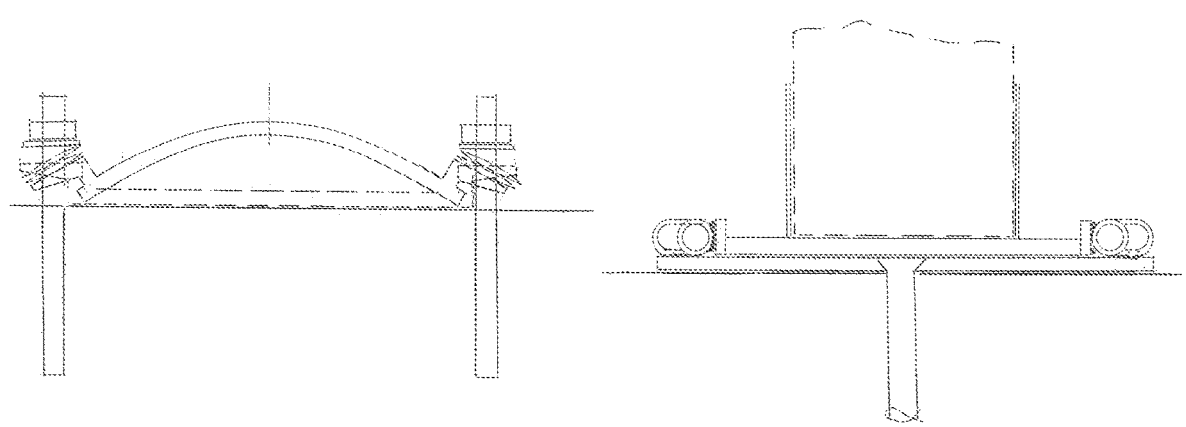
FIGURE 13B
FIGURE 14A
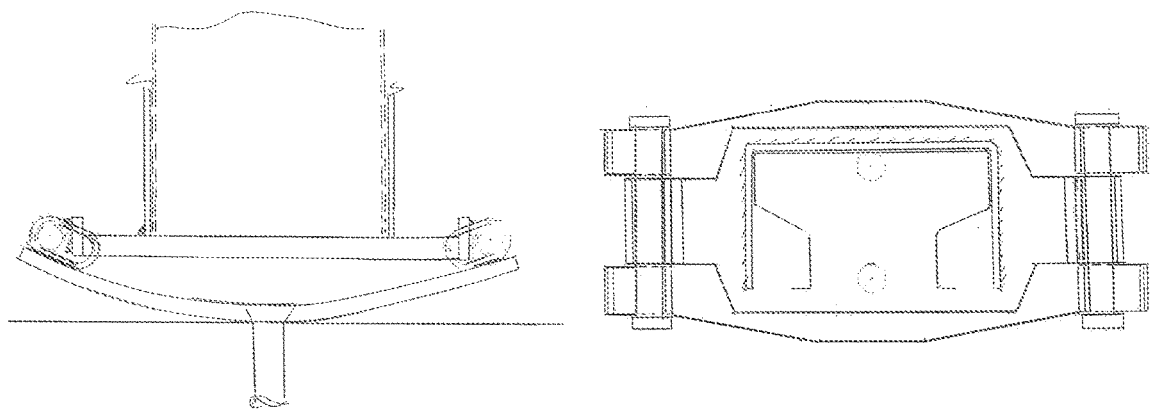
FIGURE 14B
FIGURE 14C
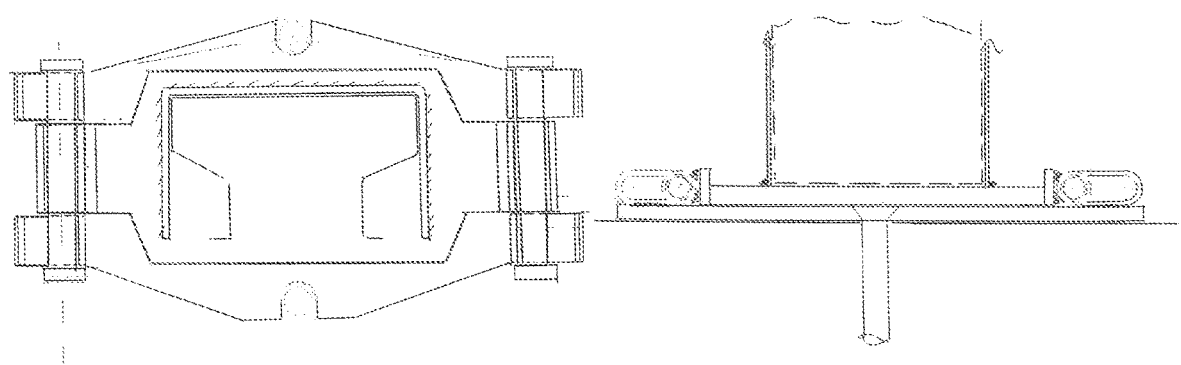
FIGURE 14D
FIGURE 14E

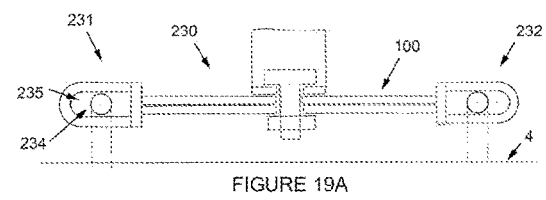
FIGURE 19A
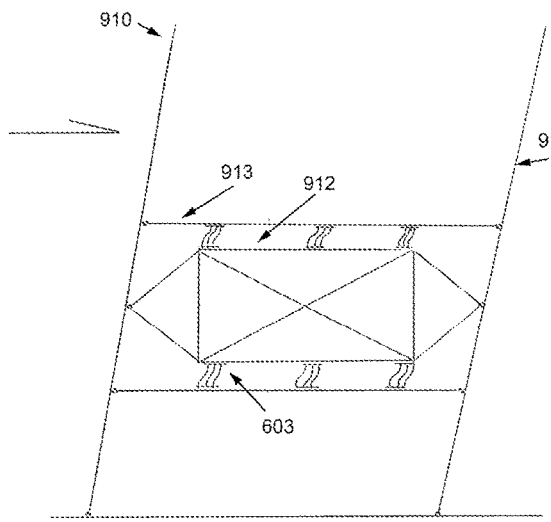
FIGURE 18B
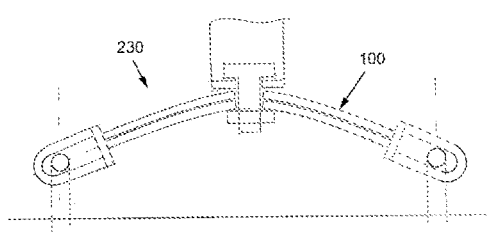
FIGURE 19B
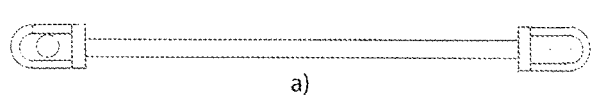
a)
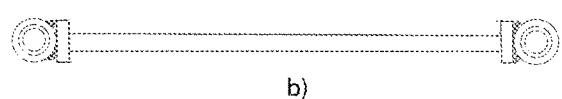
b)
FIGURE 20A
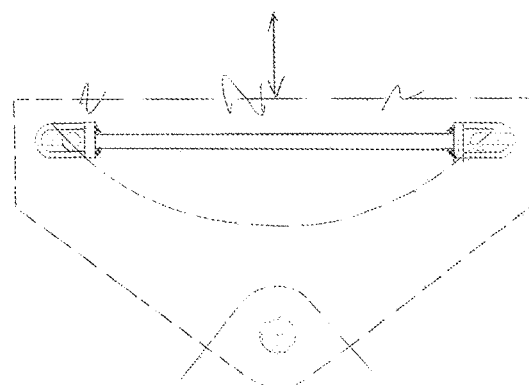
FIGURE 20B
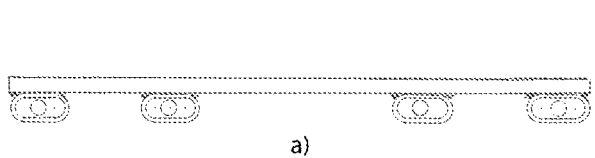
a)
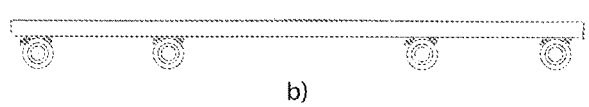
b)
FIGURE 21A
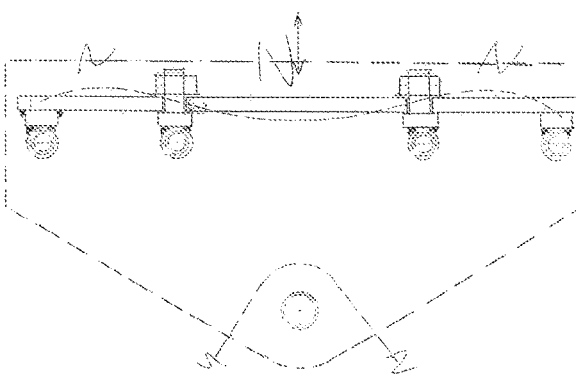
FIGURE 21B

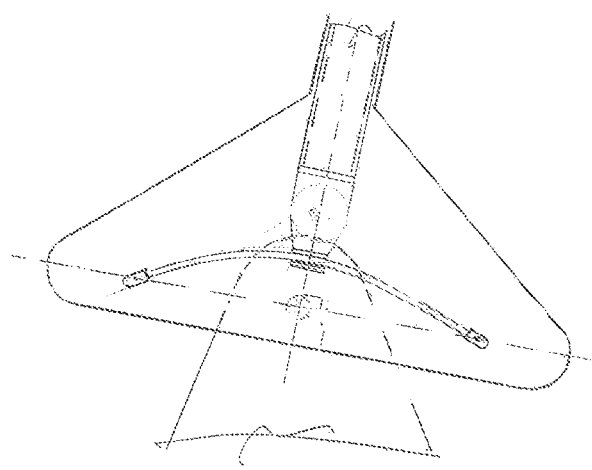
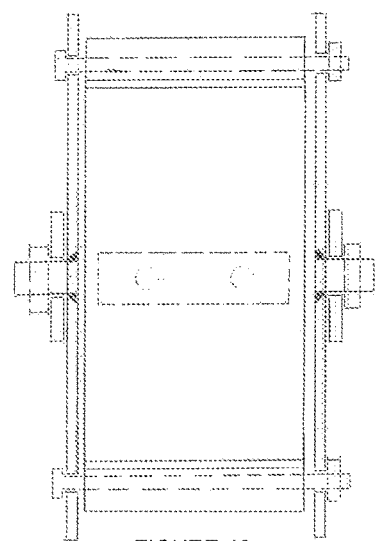
FIGURE 45
FIGURE 46
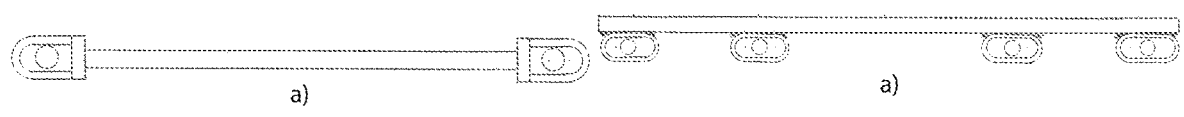
FIGURE 47
FIGURE 48
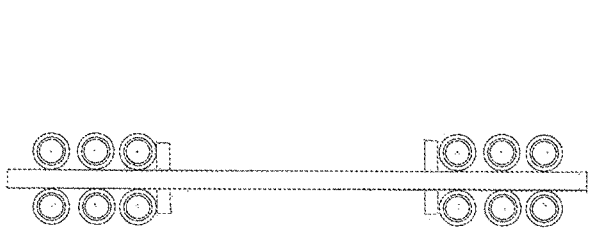
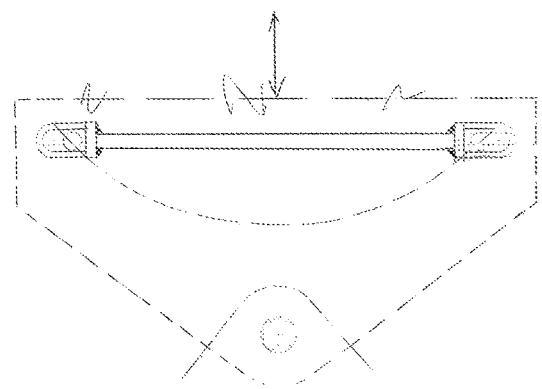
FIGURE 49
FIGURE 50

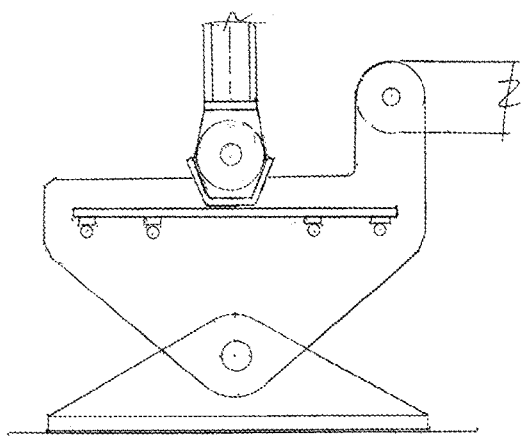
FIGURE 51
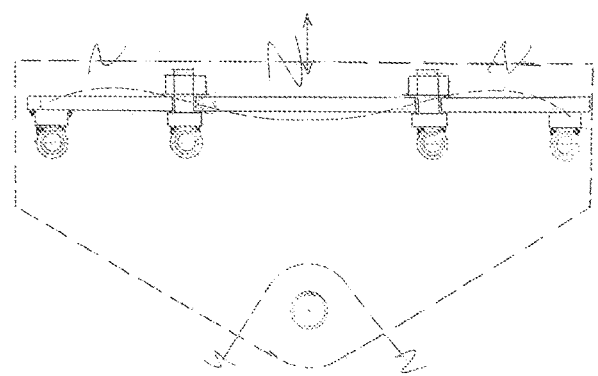
FIGURE 52
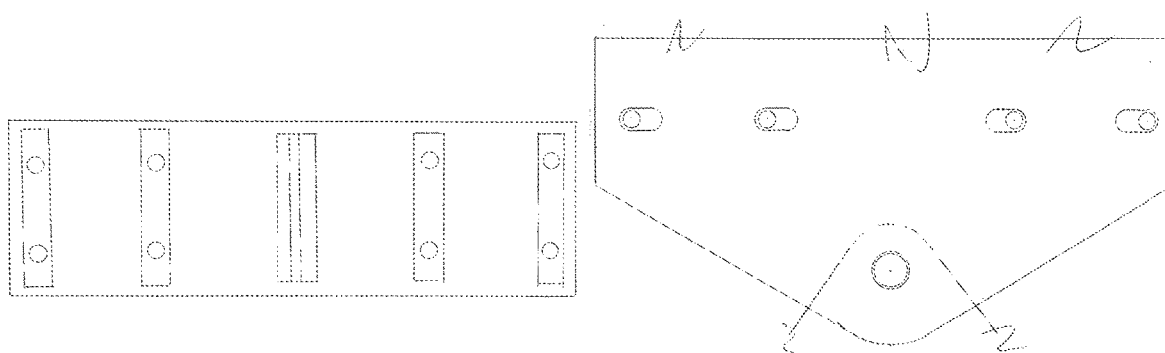
FIGURE 53
FIGURE 54
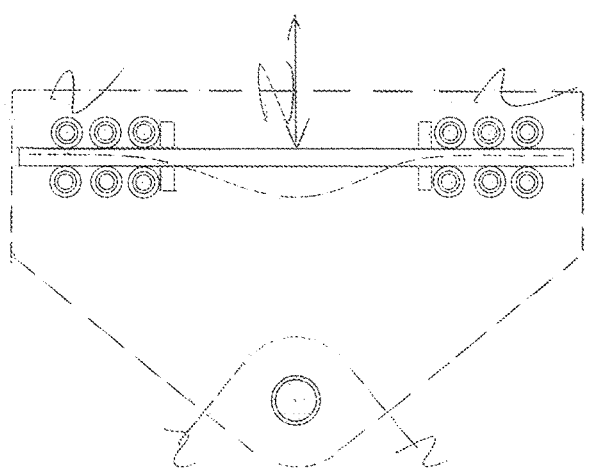
FIGURE 55
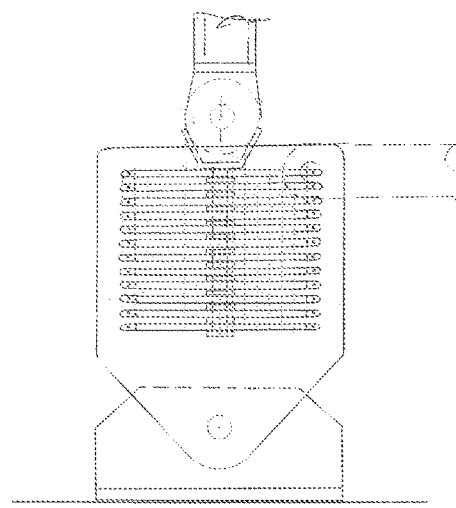
FIGURE 56

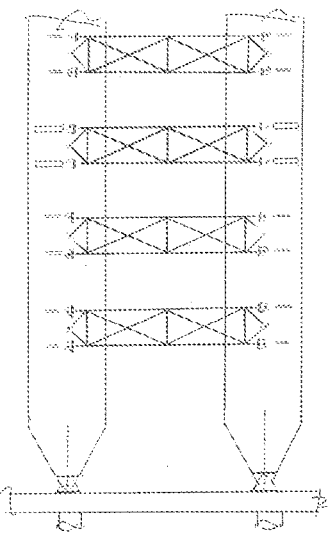
FIGURE 75
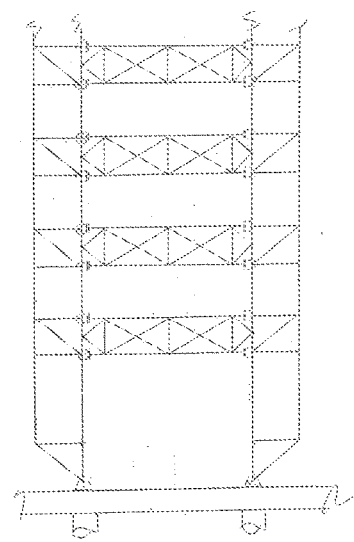
FIGURE 76
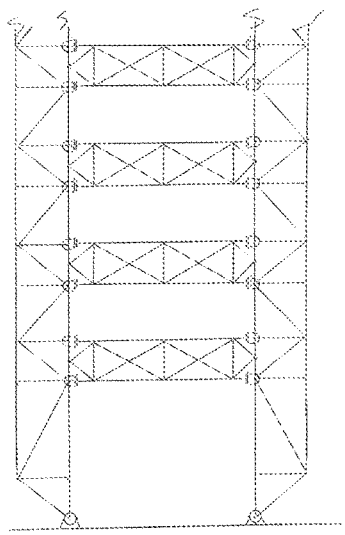
FIGURE 77
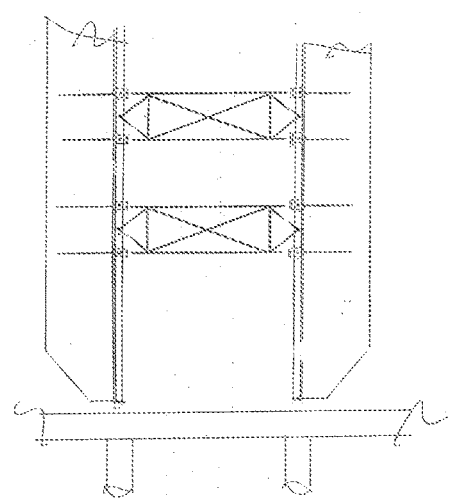
FIGURE 78
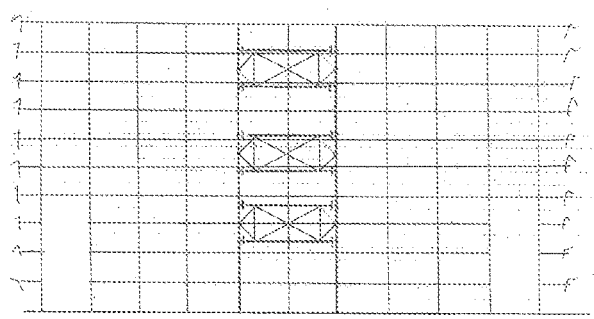
FIGURE 79                    FIGURE 80

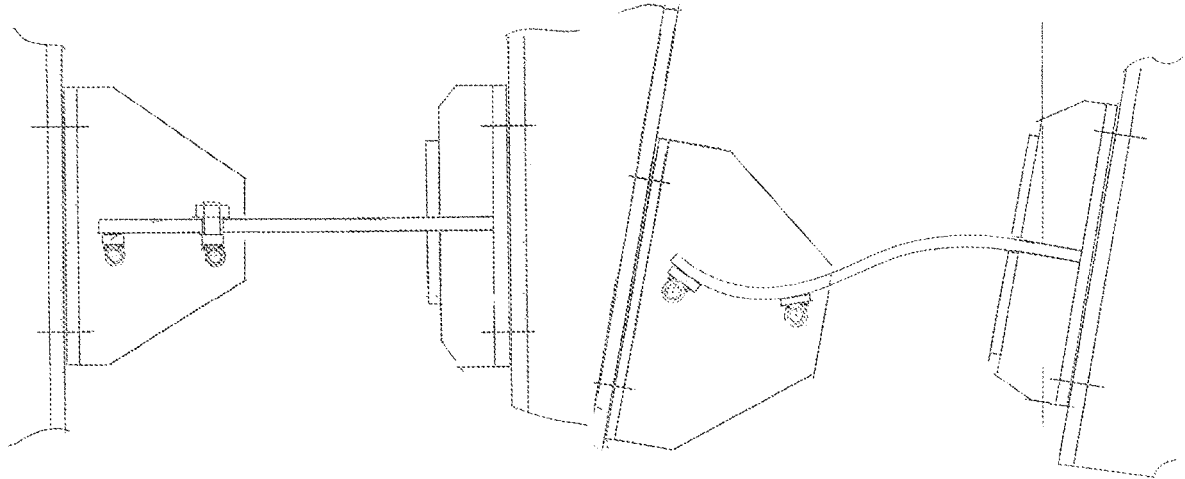
FIGURE 99　　　　　　　　　　　FIGURE 100
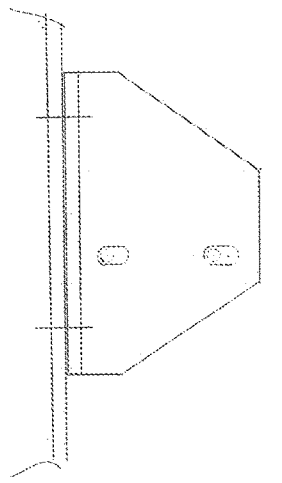
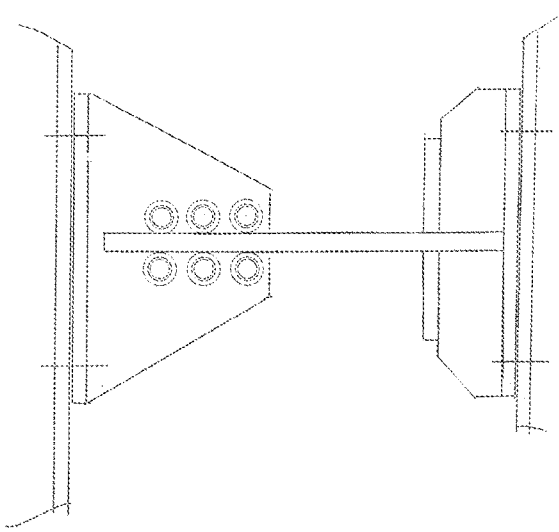
FIGURE 101　　　　　　　　　　　FIGURE 102
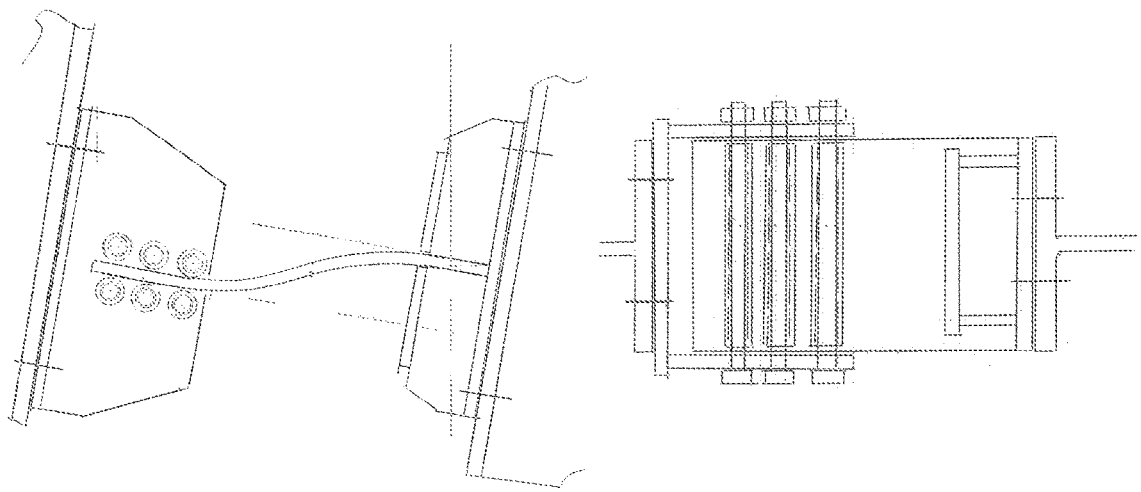
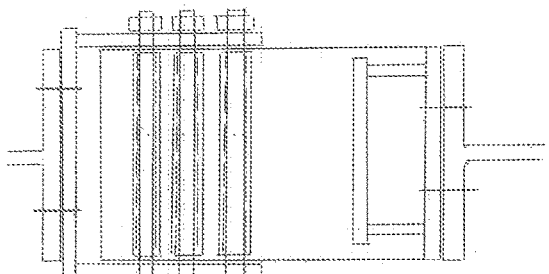
FIGURE 103　　　　　　　　　　　FIGURE 104

FORCE LIMITER AND ENERGY DISSIPATER

The present invention relates to a force limiter and energy dissipater. More particularly but not exclusively it relates to a device to limit forces and dissipate energy in structures during seismic events via elasto-plastic flexure of a plate.

1. BACKGROUND

Commercial and industrial storage rack systems are designed to hold various quantities of items and goods. While storage rack systems may withstand the vibrations caused by low levels of seismic forces, increased levels of seismic forces can cause large movements that may damage the racks and cause goods to fall off the racks.

Although they may vary in structure, a storage rack typically consists of a plurality of upright and adjacent columns pairs that are ordered in a rectilinear fashion to form two rows of columns. Between the columns are multiple horizontal shelves. The array of such shelves extends upwards to the top of the upright columns. A typical column height maybe around 10 metres. The storage rack may be typically 0.9-3 m deep and many meters in length. Shelving or pallets installed across pairs of beams normally hold the items or materials being stored. The columns bear the weight of the items or materials and transfer that weight to a rack anchor at the bottom of each column and from the rack anchor to the floor and on which the columns are installed.

The swaying of the racks in the storage rack transverse direction during an earthquake can require the rack anchors to dissipate the rocking energy.

Rack anchors are used to anchor the bottom of the upright columns to the foundation of a warehouse or similar. The foundation is generally made of concrete. There are a number of rack anchors on the market that have different means of dissipating seismic energy that is transferred into the rack. Some rack anchors use damping means such as rubber or hydraulics but these systems may be complex to produce, use expensive materials and are sometimes ungainly or large. Other rack systems may be difficult to calculate and analyse the forces being transferred to the mount, and thus an efficient and accurate design may be difficult. One publication disclosing a rack anchor for earthquake loads is U.S. Pat. No. 7,263,806.

Other earthquake systems may be utilised in other areas of a structure, such as in US20010005961.

It is an object of the present invention to provide a force limiter and energy dissipater that overcomes or at least partially ameliorates some of the abovementioned disadvantages or which at least provides the public with a useful choice.

Whilst the prior art referenced above is about storage racks, the invention is also equally applicable to general building and other structures.

2. STATEMENTS OF INVENTION

In a first aspect the present invention may be said to consist of a device or mechanism, and more preferably a force limiting and energy dissipating structural plate and connector(s), which by its form is capable of producing a stable, constant, cycling resistive yield force, while flexurally yielding about its minor bending axis to high elasto-plastic displacements. It enables structure(s) it is directly supportive of, and control structure(s) it is part of, to form a stable elasto-plastic mechanism which is able to flow and cycle to high elasto-plastic displacements with constant resistive yield force while internal forces within the structure(s) are maintained and are preferably limited to maximum values which are a function of the yield force of the structural plates which are a part of it.

The plate(s) in yielding at a constant force through its own high elasto-plastic flexural displacements is modifying the natural response (displacement, velocity, acceleration) of the structure and masses it is directly or indirectly seismically supportive of; by limiting the magnitude of accelerations and dynamic forces that can develop within the structure as it endures the ground motion (displacement, velocity, acceleration) input, by flowing as a constant resistive force plastic mechanism.

Contingent on the plates to limit the forces within the control structure and any connected structure; is their ability to sustain potentially high cycling elasto-plastic displacements (deformation) in a stable manner while maintaining a constant resistive yield force.

The magnitude of the peak elasto-plastic displacement demand on the plates is a function of a number of variables including; ground motion (acceleration) input, mass seismically supported by structure and its distribution, elastic natural frequency of structure(s) (inclusive of plates) and yield strength of plate(s). The ability of the plate(s) to sustain the cycling peak displacement demands on them, while maintaining a stable constant resistive yield force is further dependent on their material stress-strain characteristics, and structural form.

In a second aspect the present invention may be said to be a force limiting and dissipater device for absorbing energy during movement between two structure members, the device comprises a first anchor secured to a first of said structural member
second anchor(s) secured to a second of said structural member
a resiliently deformable flexural member having a first region and a second region(s) spaced from the first region and located respectively by the first anchor and the second anchor(s), whereby the first anchor secures the first region to the first structural member so that the first region is able to move with the first structural member relative to the second region(s) and second structural member during a seismic event, and the second anchor(s) allows translation or translation and rotation of the second region(s) relative to the second anchor(s) during oscillatory movement of the first structure relative the second structure allowing the flexural member to flexurally yield while maintaining a stable constant resistive yield force (and preferably not causing internal membrane forces to develop in said elongate member).

In one embodiment the elongate member extends at least between the two anchors in a first direction, wherein the first anchor secures the first region to the first structural member so as to move with said first structural member during the seismic event, and the second anchor is configured to allow the second region to rotate relative said second structural member about an axis perpendicular to the first direction and parallel the foundation in operation, and
laterally relative said second structural member translate in said first direction.

In one embodiment the second structural member is a foundation of a base structure and the first structural member is an upright member or vice versa.

In one embodiment, the first structural member is an upright member of a storage rack.

In one embodiment, the first structural member is lateral member of a storage rack.

In one embodiment, the second structural member is a foundation of a building.

In one embodiment, the first anchor and second anchor move relative to each other during said seismic events.

In one embodiment, the elongate member is composed of steel.

In one embodiment, the elongate member is composed of metal plate.

In one embodiment, there are multiple plates that form the deformable elongate member.

In one embodiment, the multiple plates are stacked parallel one another.

In one embodiment, deformable member is elongate in the first direction.

In one embodiment, the deformable elongate member is replaceable.

In one embodiment, the deformable member undergoes plastic deformation at a yield zone intermediate the first anchor and second anchor during a seismic event as a result of relative oscillatory movement between the first and second structural members.

In one embodiment, the device is engaged directly or indirectly to a structure.

In one embodiment, the structure is a warehouse rack, building and/or large civil structure.

In one embodiment, the first structural member and the second structural members are directly or indirectly tied together to prevent the first anchor from drifting away from the second anchor in the first direction.

In one embodiment, the 6 degrees of freedom are rotation and translation in/about all 3 cartesian axes.

In one embodiment, the device is intermediate, and retained to, said foundation and said structure.

In one embodiment, there are a plurality of devices intermediate said foundation and said structure.

In one embodiment, in operation the first anchor is fixed to said foundation.

In one embodiment, in operation the second anchor is fixed to a said structure.

In one embodiment, the device is acting as a mount to mount to the first structural member on said foundation.

In one embodiment, the mounted second region is configured to rotate and translate only after an earthquake force threshold has been reached.

In one embodiment, the device is intermediate a first structural member and a second structural member, both retained to a foundation or base and both forming part of a control structure engaged to a seismically supported structure (e.g. storage rack or building).

In one embodiment, there are a plurality of devices intermediate the foundation and the control structure.

In one embodiment, in operation, the first anchor and/or second anchor(s) are engaged to a control structure which is in turn engaged to the seismically supported structure.

In one embodiment, the control structure is pivotally engaged to the seismically supported structure.

In one embodiment, in operation the second anchor is fixed to said foundation.

In one embodiment, the device is intermediate, and retained to, a first member and a second member of a control structure, at least one of which is engaged to the seismically supported structure.

In one embodiment, there are a plurality of devices intermediate, and retained to, a first member and a second member of a control structure, at least one of which is or is engaged to the seismically supported structure.

In one embodiment, the first anchor is anchored to the first member and the second anchor is anchored to the second member.

In one embodiment, the first member is able to move relative to the second member cause a bending of the deformable elongate member intermediate the first and second anchor.

In one embodiment, the device has two conditions in operation, a primary condition where the elongate member is elastically displaced by a seismic event, and a second condition where the elongate member is elasto-plastically displaced by a seismic event.

In one embodiment, the secondary condition is only fulfilled over a force threshold caused by an earthquake.

In one embodiment, the secondary condition comprises ductile yielding of the deformable elongate member.

In one embodiment, in the first condition the first region and the second end region rigidly constrained.

In one embodiment, in the first condition the second region is able to one or more of translate and rotate with respect to the second anchor, and the first region is rigidly constrained relative to the first anchor.

In one embodiment, in the second condition the second region is able to translate and rotate relative the first anchor, and the first region is rigidly constrained relative the second anchor.

In one embodiment, the second anchor and the second region are together configured to allow translational movement relative each other by having complementary translation features.

In one embodiment, the translation features are one or more of the following:
  a slot to engage with a complementary sliding member that is able to slide within the slot in operation, or
  rollers or sliders to engage with the end region which allow the end region to translate with respect to the anchor in operation.

In one embodiment, the second anchor and second end region are configured to allow rotational movement relative each other by having rotational features.

In one embodiment, the rotation features are one of the following:
  a shaft that rotatably engages with a slot or hole,
  an anchor surface configured to allow the first end region to rotate about the anchor surface.

In one embodiment, there are a plurality of rotational features and translation features per plate and/or per device.

In one embodiment, the device comprises two second anchors, one at each end of the deformable elongate member and the first anchor is secured to the deformable elongate member intermediate the second anchors.

In one embodiment, the device is located at at least one base of a column of a rack.

In one embodiment, the first anchor is secured to the column and the second anchor is secured to the foundation.

In one embodiment, the deformable member has boundary conditions of a propped cantilever beam.

In a further aspect the present invention may be said to be a mount to mount a structure to a foundation, the mount comprising an elongate yield plate having a first wing, and a second wing meeting at a yield zone, and each wing having a respective anchor region distal the yield zone where each wing is able to be constrained by a respective hold down anchor of or engaged to the foundation, wherein the structure is secured or securable at the yield zone to the yield plate to thereat apply an oscillatory force to cause yielding at the yield zone of the yield plate during operation, and wherein the at least one hold down anchor and the respective anchor region are configured to allow the respective anchor region to move in a lateral direction towards and away from the other anchor, and wherein both hold down anchors and respective anchor regions are configured to allow the respective anchor region to rotate about a rotational axis perpendicular to said lateral direction and parallel with the foundation.

In one embodiment, the structure is rack.

In one embodiment, both elastic displacement and plastic yielding may occur at the yield zone.

In one embodiment, the deflection caused by plastic yielding is far greater than the deflection caused by elastic deflection.

In one embodiment, the yield zone when yielding is primarily plastic yielding.

In one embodiment, the yield plate has two conditions in operation, a primary condition where the yield zone is at its lowermost location towards the foundation and a secondary condition where the yield zone is displaced more away from the foundation.

In one embodiment, the secondary condition is only fulfilled over a force threshold caused by an earthquake.

In one embodiment, the secondary condition comprises ductile yielding of the yield plate.

In one embodiment, the at least one hold down anchor and the respective anchor region are together configured to allow translational movement by having a translation feature selected from any one of:
  (1) wing slots in a wing to slidingly engage with a complementary anchor sliding member, or
  (2) anchor slots in the anchor to slidingly engage with a complementary wing sliding member.

In one embodiment, the hold down anchors and respective anchor regions are configured to allow rotational movement by having a rotational feature.

In one embodiment, each wing and respective anchor has a rotational feature.

In one embodiment, the rotation feature is one of the following:
  (1) an anchor shaft dependent from the anchor that rotatably engages with shaft slot or shaft hole in a wing,
  (2) a wing shaft dependent from wing that rotatably engages with a shaft slot or shaft hole in an anchor,
  (3) an anchor surface configured to allow a region of a wing to rotate about it.

In one embodiment, in use, the yield plate can bow upwardly as a damper without the anchor regions of the yield plate bearing on or penetrating the underlying foundation.

In one embodiment, the rotational feature is a hinge that allows free rotation of the flexure plate during yielding of the flexure plate.

In one embodiment, the rotation feature is a hinge that does not resist rotation during yielding of the flexure plate and does not cause a moment about the anchor regions during the $2^{nd}$ condition.

In one embodiment, the translation feature and rotational feature is an end cap that covers the anchor region at each wing, the end cap having
  (1) a slot configured to receive the anchor region and allow translational movement towards the other anchor and
  (2) an anchor surface configured to allow the yield plate to rotate about said rotational axis.

In one embodiment, the yield plate comprises a top and bottom surface, the mount comprising a packer configured to bridge a gap between the yield plate's bottom surface, when the yield plate's top surface is anchored under the anchor surface, and the foundation.

In one embodiment, the wing slot is a horizontal slot in the wing, protruding from the top to the bottom surface of the wing, and aligned with the elongate axis of the elongate flexure member, and the hold down anchor is an upright shaft configured to allow the yield plate laterally slide about the upright shaft.

In one embodiment, the upright shaft comprises a cap or nut on the top to provide the anchor surface.

In one embodiment, the horizontal slot can slide vertically about the upright shaft in operation during the secondary condition.

In one embodiment, yield plate has a top and bottom surface, the mount comprising a packer configured to bridge a gap between the yield plate's bottom surface, when the yield plate's top surface is anchored under the anchor surface, and the foundation.

In one embodiment, the yield plate does not touch the foundation in operation in the second condition so that the anchor regions are free to rotate.

In one embodiment, the yield plate is elongate.

In one embodiment, the yield plate is substantially planar intermediate the anchor regions when the yield plate is in its primary (undeformed) state.

In one embodiment, each anchor region comprises a raised portion which is out of plane to the region of the plate intermediate the anchor regions.

In one embodiment, the raised portions have a top surface to react (and preferably directly or indirectly engage) with the respective hold down anchors to act as the anchor surfaces.

In one embodiment, the raised portions are offset from the foundation, so they do not touch the foundation.

In one embodiment, intermediate each raised portion and the yield zone are contact surfaces.

In one embodiment, the contact surfaces are configured to contact the foundation at certain stages during operation.

In one embodiment, the contact surfaces act to tuck the anchor regions under the respective hold down anchors upon return of the yield plate to the yield plate's primary state.

In one embodiment, the contact surfaces act to spread apart the anchor regions from each other upon contact of the contact surfaces with the foundation during return of the yield plate to the yield plates primary state.

In one embodiment, the contact surfaces are configured to contact the foundation during a period of deflection of the yield zone towards the foundation.

In one embodiment, the contact surfaces extend intermediate the foundation and at least a portion of the respective raised portion.

In one embodiment, the raised portions comprise the translation feature.

In one embodiment, springs or other compression means are located above the top surface to bear against the hold down anchor to bias down the plate onto the underlying support.

In one embodiment, the packers act to tuck the anchor regions under the cap or nut upon return to the yield plate's primary state.

In one embodiment, the packer is configured to fix to the foundation.

In one embodiment, springs or other compression means are located about the upright shafts that bear upon the top surface of the flexure and bottom surface of the cap or nut to bias down the plate onto the underlying support.

In one embodiment, the flexure plate sits flush on the foundation supporting it.

In one embodiment, the springs or other compression means are compressed vertically during the secondary condition.

In one embodiment, the springs or other compression means are configured to compress in the second condition to allow the anchor regions to be unencumbered by the foundation.

In one embodiment, the wing sliding member is a pin or shaft, which extends perpendicular to the elongate axis and parallel to the bottom surface of the plate, where the pin or shaft is configured to rotate in the anchor slot.

In one embodiment, the yield plate sits flush against the foundation in use.

In one embodiment, the yield plate comprises at least one side wing slot, protruding perpendicular to the top and bottom surface of the plate, and aligned in the direction of the elongate axis of the plate, at one or more its anchor regions.

In one embodiment, the mount comprises at least one pin or shaft complementary to the at least one side wing slot that is configured to slide in said at least one side wing slot to allow said anchor region to translate towards the other anchor region during yielding of the yield plate.

In one embodiment, the yield plate is a metal plate.

In one embodiment, the vertical forces are due to rocking of said rack via a seismic event.

In one embodiment, the plate is a least 5 mm thick.

In one embodiment, the plate is a least 8 mm thick.

In one embodiment, the force to move the plate from the $1^{st}$ condition to the $2^{nd}$ condition is over 5 kN.

In one embodiment, the force of the plate from the $1^{st}$ condition to the $2^{nd}$ condition is over 8 kN.

In one embodiment, the $2^{nd}$ condition comprises plastic deformation.

In one embodiment, the plate is configured and designed to yield in a seismic event.

In one embodiment, the yield plate forms a monotonic decreasing curve during yielding.

In one embodiment, the yield plate only has one yield zone at or near the intermediate the first and second wing, and there is no yielding at the anchor regions during the second condition.

In one embodiment, in the first condition the yield plate is held rigidly to the foundation in all degrees of freedom, upon seismic activity and yielding into the $2^{nd}$ condition, there is relative ease of lateral translation along the elongate axis, and relative ease of rotation about a rotational axis, perpendicular to the elongate axis and parallel to the foundation, at the end region.

In one embodiment, the relative ease of lateral translation and relative ease of rotation at the end regions limits yielding to said yield zone.

In one embodiment, the yield plate is engineered to be highly flexible and ductile relative the column.

In a further aspect the present invention may be said to be a mount to mount a structure to a foundation, the mount comprising a yield plate having a first wing, and a second wing meeting at a yield zone with the first wing, the yield plate configured to connect via a connection to the structure at said yield zone to transfer during operation substantially vertical forces to the yield plate though the connection, the yield plate anchored to the foundation by respective anchors at an anchor region of the first wing and second wing distal the yield zone, the anchors configured to prevent yielding of the yield plate at or near the end regions when said force is transferred.

In a further aspect the present invention may be said to be a mount to mount a structure to a foundation, the mount comprising a yield plate having a first wing and a second wing meeting with the first wing at a yield zone, the yield plate configured to connect via a connection(s) to the structure at the end regions of the plate distal to the yield zone to transfer during operation substantially vertical forces to the yield plate through the end regions connections to the plate, the yield plate anchored to the foundation by yield plate lengthwise centred anchors, the first wing and second wing to structure connections, distal the central yield zone anchored to foundation, configured to prevent yielding, prying or membrane forces at or near the end regions where the said force is transferred.

In one embodiment, the structure comprising multiple pairs of adjacent columns, and mounts are fixed to one or more pairs of columns.

In one embodiment, the yield plate sits flush against the foundation.

In one embodiment, the anchors space the yield plate a distance off the ground so a gap forms between a bottom face of the yield plate and the foundation, and a packer is used to bridge this gap.

In one embodiment, the packer allows the yield plate to be flattened when a downwards vertical force is transferred into the yield plate from the column.

In one embodiment, in use, the yield plate can bow upwardly as a damper without the anchor regions of the yield plate bearing on or penetrating the underlying foundation.

In one embodiment, the yield plate is configured to bow in a single curve in use.

In one embodiment, the yield plate is configured to form the shape of a single lobe during deformation.

In one embodiment, the yield plate is configured to plastically deform at or near the yield zone in use.

In one embodiment, the rotational feature is a 'Z' step at the end regions of the plate adapted and configured to enable the plate to be seated flush against the foundation and to elasto-plastically flex upwards away from the foundation without engaging or prying with the foundation. The base at the said 'Z' step allows the plate to remain in 'just touching' or near contact with the foundation or base at two opposite points during upwards flexing hence providing two resistive reaction points as the plate is pushed back to its flush position.

In the same embodiment, the end regions of the 'Z' step are slotted to allow free translational movement of the end region relative to the plates holding down bolts or fixings, which are set within the slots.

In a further embodiment, the plate may again be seated flush against the foundation and has rotational and translational end regions, but conversely is fixed to the foundation at its lengthwise centre, and to the overlying column base, at its end regions.

In one embodiment, as the plate elasto-plastically flexes away from the foundation under the action of an uplift force, its top surface becomes concave with sagging curvature. This is in contrast to the previously described floor mounted plates which flex to a form with a convex top surface and hogging curvatures In a further aspect the present invention may be said to be a flexure connector for attachment to or within a structure to resist and transfer internal forces arsing in a structures oscillatory movement, the flexure connector having spaced regions and translational support(s) or adaptions spanned by a flexure plate that can be held to and/or proximate to an underlying support without compromise, or substantial compromise to the plate's simple flexural yielding to ensure freedom of any internal membrane forces developing with the plate.

In one embodiment, the plastic displacement occurs (preferably only) during the extreme forces present during a seismic activity.

In one embodiment, the flexure plate remains elastic and is not susceptible to plastic displacement when seismic activity is below a certain magnitude.

In one embodiment, the flexure plate is elastic so as to rigidly retain said structure during usual operational activities.

In yet a further aspect the present invention may be said to be a flexure connector comprising a flexure plate acting as an inter-lamina shear transfer member, located and operative between chords of a rocker frame and pivoting exterior chords parallel with the chords of the rocker frame.

In one embodiment, the shear transfer member flexes but remains elastic under the action of inter-lamina shear between interior frame chord and exterior chord generated by seismic activity below a certain (building code specified or from special study) magnitude.

In one embodiment, the shear transfer member flexes plastically under the action of inter-lamina shear between interior frame chord and exterior chord generated by seismic activity above a certain magnitude.

In one embodiment, one end of the inter-lamina shear transfer member is fixed to the chord of a rocker frame and the member's opposite end connects by a free rotational and free translational fixing to a parallel exterior chord (or vice versa).

In one embodiment, the one end of the inter-lamina shear transfer member is fixed to the chord of a rocker frame and its opposite end connects by two spaced free rotational and free translational fixings to a parallel exterior chord (or vice versa).

In a further embodiment, one end of the inter-lamina shear transfer member is fixed to the chord of a rocker frame and it's opposite end connects to a free translational but rotationally restrained fixing to a parallel exterior chord (or vice versa). In a further embodiment one end of the inter-lamina shear transfer member is fixed to the chord of a rocker frame and its opposite end connects with a parallel exterior chord through a roller system which rotationally restrains the end of the plate but allows free translation.

In one embodiment the flexure member is an axial force transfer member, located between the pin ended links or push rods of a rocker frame and a connector spacing the plate off a structural base.

In one embodiment the axial force transfer member flexes but remains elastic under the action of axial force in the connected links or push rods of a rocker frame generated by seismic activity below a certain magnitude.

In another embodiment the axial force transfer member flexes plastically under the action of axial force in the connected links or push rods of a rocker frame generated by seismic activity above a certain magnitude.

In one embodiment the flexure member is a plate with free rotational and free translational end regions which simply spans between two structural base anchor rods.

In one embodiment the flexure member is a simply spanning plate with free translational and rotational end regions, pin set within a pivoting rocker connector with mid region of plate connected to links or push rods of rocker frame.

In another embodiment the flexure member is a continuous spanning plate with two spaced free translational and rotational supports each end, pin set within a pivoting rocker connector with mid region of plate connected to links or push rods of rocker frame.

In a further embodiment the flexure member is a plate rotationally restrained but translationally free at each end through rollers pin set within a structural base pivoting rocker connecter with mid region of plate connector and mid region of plate connected to links or push rods of rocker frame.

In a further aspect the present invention may be said to consist in a damping support of a structure over an underlying support, the damping support comprising or including
  spaced anchors from the underlying support, and
  a damping flexure member (1) fixed to the structure and (2) held at spaced regions or adaptions by the anchors to, or proximate to, the underlying support;
  wherein the flexure member can rise with the structure when the structure uplifts and can lower with the structure;
  and wherein the rise, whether resilient and/or plastic, is a monotonic decreasing curve.

In one embodiment, plastic uplift can only occur during the extreme forces present during a seismic activity.

In one embodiment, the flexure member is substantially rigid and is not susceptible to plastic uplift below the forces present during seismic activity.

In one embodiment, the flexure member is a substantially rigid so as to rigidly retain said structure during usual operational activities.

In a further aspect the present invention may be said to consist in a storage rack assembly, comprising the use of a doubly anchored damping leaf member itself anchoring the rack; wherein the anchoring of the leaf member within design limits allows, in the event of earthquake or like tremors,
  (1) upward resilient curvature and return,
  (2) upward plastic curvature and at least some return, and/or
  (3) some combination of (1) and (2);
  wherein any return is assisted by the weight of the rack and/or tremor loading; and wherein, within such limits, the anchoring of the leaf member does not preclude a symmetrical upward single curvature of the leaf member during (1), (2) or (3).

In one embodiment, the symmetrical upwards single curvature has no point of inflection.

In a further aspect the present invention may be said to be a rack anchor, the rack anchor comprising an elongate flexure plate having a $1^{st}$ wing and a $2^{nd}$ wing meeting at a central yield zone, each wing having an end region distal said yield zone and the end regions anchored to an underlying foundation in operation, wherein the end regions have different boundary conditions defined by respective hold down anchors depending on operational conditions, wherein in a $1^{st}$ operational condition there is no seismic activity and deformation of the flexure plate, and in a $2^{nd}$ operational condition there is seismic activity and deformation of the flexure plate, wherein in the 1$^{st}$ condition the flexure plate is held rigidly to the foundation by the respective hold down anchors at each end region in all 6 degrees of freedom, and in the 2$^{nd}$ condition the end regions of the flexure plate are able to relatively easily, compared to the 1$^{st}$ condition, rotate about an axis at each end region that is perpendicular to the elongate axis of the flexure plate and parallel to the foundation, and at least one end region is able to relatively easily, compared to the 1$^{st}$ condition, laterally translate towards the opposite end region in a direction along the elongate axis.

In one embodiment, the central yield zone is anchored at the lengthwise centre of the elongate flexure plate to the underlying foundation or base and the overlying structure is without translational or rotational restraint to the end regions of each wing distal to the centrally anchored yield zone.

In a further aspect the present invention may be said to be a force limiting and dissipater device for absorbing energy during oscillatory movement between two structure members, the device comprises:

a first anchor secured directly or indirectly to and to move with one of two structure members second anchor secured to and to move with the other of said structure members, a flexural member having a first region (preferably an end region of the flexural member) supported at the first anchor and a second region (preferably an end region of the flexural member) spaced from the first region and supported at the second anchor in a simply supported manner. This is to preferably allow the flexural member to yield in a bending mode as the first and second anchors move relative each other in a direction (and reverse) that is normal to the plane of the flexural member.

Preferably at second region(s), the flexural member is able to rotate and translate relative to its respective anchors and at the first region the flexural member is restrained to its respective anchor.

Preferably at one of the first and second regions, the flexural member is able to rotate and translate relative to its respective anchors and at the other of the first and second regions the flexural member is pinned or cantilever to its respective anchor.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

'Single curvature' means without forming a plural lobed arch form. It includes a symmetric form on either side of its intended attachment to the structure or rack from its anchoring, encumbered, fettered or like adaptions or zones. Preferably the symmetric form is monotonic decreasing towards the intended attachment. Preferably, the curve formed by the yielded flexure plate has no inflection point.

'Rack' in relation to a structure that is subjected to seismic forces may refer to a rack in a warehouse, or other larger structures such as a building or other civil structure that is subject to earthquake loads.

As described herein the term plastic or ductile can be interchangeable and relate to material deformation past elastic deformation. When a stress is sufficient to permanently deform a material (such as a flexure plate), it is called plastic or ductile deformation.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

3. FIGURE DESCRIPTIONS

The invention will now be described by way of example only and with reference to the drawings in which:

FIG. 1A: shows a cross sectional front view of a yield connector of the 1$^{st}$ embodiment in a 1$^{st}$ condition mounted to a rack column to anchor the column to a foundation.

FIG. 1B: shows a cross sectional front view of a yield connector of the 1$^{st}$ embodiment in a 2$^{nd}$ deformed condition mounted to a rack column.

FIG. 1C: shows a plan view of yield connector of the 1$^{st}$ embodiment.

FIG. 1D: shows a side transverse cross section of a yield connector of the 1$^{st}$ embodiment mounted to a rack column.

FIG. 1E: shows a 1$^{st}$ yield zone of the yield connector of FIG. 1B.

FIG. 1F: shows a 2$^{nd}$ larger yield zone the yield connector of FIG. 1B.

FIG. 1G: shows a simply supported plate/beam.

FIG. 1H: shows a cantilevered simply supported plate/beam.

FIG. 2A: shows a cross sectional front view of a yield connector of the 2$^{nd}$ embodiment in the 1$^{st}$ condition mounted to a rack column.

FIG. 2B: shows a cross sectional front view of a yield connector of the 2$^{nd}$ embodiment in the 2$^{nd}$ condition mounted to a rack column.

FIG. 3A: shows a cross sectional front view of a yield connector of the 3$^{rd}$ embodiment in the 1$^{st}$ condition mounted to a rack column.

FIG. 3B: shows a cross sectional front view of a yield connector of the 3rd embodiment in the 2nd condition mounted to a rack column.

FIG. 3C: shows a cross sectional detailed front view of the end region of the yield connector of FIG. 3A.

FIG. 3D: shows a cross sectional detailed front view of the end region of the yield connector of FIG. 3B.

FIG. 3E: shows a plan view of the yield connector of FIG. 3B.

FIG. 4: shows a plan view of a yield connector of the 3rd embodiment mounted to a column.

FIG. 5A: shows a schematic front view of a yield connector of a 4th embodiment mounted to a rack column in the 1$^{st}$ condition.

FIG. 5B: shows a schematic front view of a yield connector of a 4th embodiment mounted to a rack column, in the 2nd condition.

FIG. 6A: shows a cross sectional front view of a yield connector of a 5th embodiment mounted to a rack column, in the 1$^{st}$ condition.

FIG. 6B: shows FIG. 6A in a 2nd condition.

FIG. 7A: shows a schematic front view of a yield connector of a 6th embodiment mounted to a rack column, in the 1$^{st}$ condition.

FIG. 7B: shows the yield connector of FIG. 7A in the 2nd condition.

FIG. 7C: highlights the tucking motion of the packers.

FIG. 8A: shows a cross sectional front view of a yield connector of a 7th embodiment mounted to a rack column, in the 1$^{st}$ condition.

FIG. 8B: shows the yield connector of FIG. 8A in a 2nd condition.

FIG. 9A: shows a schematic front view of a stable rack or structure, with an intermediate member with yield connectors attached.

FIG. 9B: shows a schematic front view of a rack or structure being rocked in one direction S, with an intermediate member with yield connectors attached.

FIG. 9C: shows a schematic front view of a rack structure being rocked in another direction S, with an intermediate member with yield connector attached.

FIG. 9D: shows a cross sectional front view of a pair of columns mounted to a yield connector an intermediate member of an 8th embodiment.

FIG. 9E: shows a detailed plan view of a yield connector of the 8th embodiment.

FIG. 10A: shows an alternative to the FIG. 9D where the yield connector is or a transverse kind FIG. 10B: shows a detailed plan view of FIG. 10A.

FIG. 11: shows a coordinate system used in the detailed description.

FIG. 12A: shows a top schematic view of a mount with a 'Z' plate embodiment.

FIG. 12B: shows a side schematic view of a Z plate embodiment.

FIG. 12C: shows the Z plate of FIGS. 12A & 12B in a flexed condition.

FIG. 12D: shows a side schematic detail of a 'Z' plate.

FIG. 12E: shows a schematic section detail of FIG. 12D.

FIG. 12F: shows a plan view a FIG. 12D.

FIG. 12G: shows a side schematic detail of FIG. 12D in a flexed condition.

FIG. 13A: shows side schematic view of a Z-plate with a spring member.

FIG. 13B: shows the Z-plate of FIG. 13 in a flexed condition.

FIG. 14A: shows a side schematic view of an embodiment in which the yield plate to base fixings are lengthwise centred on the yield plate.

FIG. 14B: shows the yield plate of FIG. 14A elasto-plastically flexing with a concave top surface.

FIG. 14C: shows a plan view of FIG. 14A in which the lengthwise centred yield plate to base fixings are interior to the boundaries of overlying column base.

FIG. 14D: shows a plan view of FIG. 14A in which the lengthwise centred yield plate to base fixings are exterior to the boundaries of the overlying column base.

FIG. 14E: shows a side schematic view of an embodiment similar to that of FIG. 14A, but in which the rotational and translational in details are extended.

FIG. 14F: shows the yield plate of FIG. 14E elasto-plastically flexing with a concave top surface.

FIG. 15A: shows a schematic front view of a tower (control structure alpha1) of a first embodiment in a non-displaced condition.

FIG. 15B: shows a schematic front view of a tower of FIG. 15A in a displaced condition.

FIG. 16A: shows a schematic front view of a tower (control structure alpha1) in a further embodiment in a non-displaced condition.

FIG. 16B: shows a tower of FIG. 16A in a displaced condition.

FIG. 17A: shows a front schematic view of a tower (control structure alpha1) using shear type plates yield connector in a non-displaced condition.

FIG. 17B: shows a tower of FIG. 17A in a displaced condition.

FIG. 18A: shows a further embodiment of a tower (control structure alpha1) with a horizontal type shear structure being utilised.

FIG. 18B: shows the tower of FIG. 18A in a displaced condition.

FIG. 19A: shows a front schematic view of a simple yielding plate elevated above and connected to a horizontal base by anchor rods.

FIG. 19B: shows the yield connector of FIG. 19A in a flexed condition.

FIG. 20A: shows a simple yielding plate with rotatable and translatable end regions.

FIG. 20B: shows the yield connector of FIG. 20A within a rocker base (beta rocker) along with flexed condition.

FIG. 21A: shows a continuous yield plate with rotatable and translatable supports.

FIG. 21B: shows the yield connector of FIG. 21A within a rocker base (beta rocker) along with flexed condition.

FIG. 22A: shows a yield plate which is rotationally restrained (by rollers) but translatably free at its end regions.

FIG. 22B: shows the yield plate of FIG. 22A within a rocker base (beta rocker) along with flexed condition.

FIG. 23: shows a front schematic of multiple plates of FIG. 20A within a base rocker (beta rocker).

FIG. 24A: shows the schematic front view of the tower (control structure alpha1) of FIG. 16A with sleeve guide motion control rockers (beta rockers) with set yield plates.

FIG. 24B: shows tower of FIG. 24A in displaced condition.

FIG. 24C: shows further embodiment of rocker of FIG. 24A with multiple yield plates.

FIG. 25A: shows a simple shear type plate fixed at one side and rotatable and translatable at opposite end connected to exterior chord.

FIG. 25B: shows shear plate of FIG. 25A in displaced condition.

FIG. 26A: shows a continuous shear type plate fixed at one side and with two rotatable and translatable supports at opposite end connected to exterior chord.

FIG. 26B: shows continuous shear plate of FIG. 26A in displaced condition.

FIG. 27A: shows a rotationally restrained shear type plate fixed at one side and with rotational restraint by rollers but free translation at opposite end connected to exterior chord.

FIG. 27B: shows the plate of FIG. 27A in displaced condition

FIG. 28: shows a simple shear type connector of FIG. 25A with multiple plates.

FIG. 29A: shows plan view of two way spanning continuous circular plate with concentric supports within rocker (beta rocker).

FIG. 29B: shows a section through FIG. 29A.

Alpha$_1$ Rocker Frame

FIG. 30: Alpha1 Frame Elevation with beta1 yield plate rocker with eccentric pivot.

FIG. 31: Alpha1 Frame sway mode (beta1 rocker/eccentric pivot).

FIG. 32: Alpha1 Frame Elevation with beta1 yield plate rocker with concentric pivot.

FIG. 33: Alpha1 Frame sway mode (beta1 rocker/concentric pivot).

FIG. 34: Alpha1 Frame Elevation with beta2 yield plate rocker with eccentric pivot.

FIG. 35: Alpha1 Frame sway mode (beta2 rocker/eccentric pivot).

FIG. 36: Alpha1 Frame Elevation with beta2 yield plate rocker with concentric pivot.

FIG. 37: Alpha1 Frame sway mode (beta2 rocker/concentric pivot).

FIG. 38: Beta2 yield plate rocker elevation with motion control sleeve guide, multiple plates and concentric pivot.

FIG. 39: End elevation of FIG. 38.

FIG. 40: Plan of rocker sleeve (beta2 rocker), plan of yield plate.

FIG. 41: Beta2 yield plate rocker section.

FIG. 42: Beta2 yield plate rocker elevation with motion control sleeve guide, and multiple yield plates and eccentric pivot.

FIG. 43: Part Elevation of alpha1 Frame with beta2 yield plate rocker and eccentric pivot.

FIG. 44: Plan of beta1, beta2 yield plate rocker with eccentric pivot and delta1 yield plate.

FIG. 45: Beta2 yield plate rocker, with concentric pivot and flexing/yielding plate.

FIG. 46: Plan of beta1, beta2 yield plate rocker with concentric pivot and delta1 yield plate.

FIG. 47: Delta1 yield plates; simply spanning, no rotational or translational restraints each end.

FIG. 48: Delta2 yield plates; continuous with variable stiffness rotational restraint at each end. No translational restraints.

FIG. 49: Delta3 yield plates; full rotational restraints and each end. No translational restraints.

FIG. 50: Elevation of delta1 yield plate within beta1, beta2 rocker with eccentric pivot.

FIG. 51: Elevation of delta1 yield plate within beta1 rocker with motion control stays and eccentric pivot.

FIG. 52: Elevation of delta1 yield plate within beta1, beta2 rocker with eccentric pivot.

FIG. 53: Plan of delta1 yield plate.

FIG. 54: Elevation of beta1, beta2 rocker with slots for delta1 yield plate.

FIG. 55: Elevation of delta3 yield plate within beta1, beta2 rocker with eccentric pivot.

FIG. 56: Elevation of beta1 rocker with motion control stays, multiple plates and eccentric pivot.

FIG. 57: Elevation of beta1 rocker with motion control stays, multiple plates and concentric pivot.

FIG. 58: Elevation of delta1 yield plate within beta1, beta2 rocker with concentric pivot.

FIG. 59: Elevation of delta1 yield plate within beta1, beta2 rocker with concentric pivot.

FIG. 60: Elevation of beta1, beta2 rocker with slots for delta1 yield plate.

FIG. 61: Elevation of delta3 yield plate within beta1, beta2 rocker with concentric pivot.

FIG. 62: Part elevation of alpha1 Frame to column connection.

FIG. 63: Plan of FIG. 62.

FIG. 64: Part Elevation of alpha1 Frame base Pivot.

FIG. 65: Plan of FIG. 64.

FIG. 66-84: Various arrangements of alpha1 Frame.

FIG. 85: Elevation of alpha1 Frame within two tier ductile system.

FIG. 86: Detail of FIG. 85.

FIG. 87: Two tier system sway mode.

FIG. 88: Two tier system sway mode with yield plates at flexural limit and second tier member flexing and yielding.

FIG. 89: Plan of edge supported circular yield plate within beta1, beta2 rocker.

FIG. 90: Elevation of FIG. 89.

Alpha$_2$ Rocker Frame

FIG. 91: Alpha2 Frame Elevation.

FIG. 92: Alpha2 Frame in sway mode.

FIGS. 93 & 94: Motion control stays in sway mode.

FIGS. 95 & 96: Delta4 yield plate; simple. No rotational or translational restraint one end; fixed opposite end.

FIG. 97: Slot in connection plate for delta4 yield plate.

FIG. 98: Delta4 yield plate; flexing/yielding in frame sway mode.

FIG. 99: Delta5 yield plate; continuous variable stiffness rotational restraint with no translational restraint one end; fixed opposite end.

FIG. 100: Delta5 yield plate; flexing/yielding in frame sway mode.

FIG. 101: Slots in connection plate for delta5 yield plate.

FIG. 102: Delta6 yield plate; full rotational restraints at each end. No translational restraints at one end.

FIG. 103: Delta6 yield plate, flexing/yielding in frame sway mode.

FIG. 104: Plan of delta6 yield plate.

FIG. 105: Elevation of multiple delta4 yield plates (similar for delta5, delta6).

FIG. 106: Plan of delta4 yield plate.

FIG. 107: Elevation of motion control tie connection to exterior chord.

FIG. 108: Plan of motion control tie between exterior chord and rocker frame centre line.

FIG. 109: Elevation of motion control tie between exterior chord and rocker frame centre line.

FIG. 110: Alpha2 Frame; Vertical Orientation (motion control ties excluded for clarity).

FIG. 111: Alpha2 Frame; Vertical orientation in sway mode (motion control ties excluded for clarity).

FIG. 112: Alpha2 Frame; Horizontal Orientation (motion control ties excluded for clarity).

FIG. 113: Alpha2 Frame; Horizontal Orientation in sway mode (motion control ties excluded for clarity).

FIG. 114: Alpha2 Frame; Vertical Orientation (motion control ties included).

FIG. 115: Alpha2 Frame; Vertical Orientation in sway mode (motion control ties included).

FIG. 116: Alpha2 Frame; Horizontal Orientation (motion control ties included).

FIG. 117: Alpha2 Frame; Horizontal Orientation in sway mode (motion control ties included).

4. DETAILED DESCRIPTION

The deformable members (primarily herein referred to as "plates" or "yield plates") that are herein described in various forms and configurations (and that form an important part of the invention) are capable of stable cycling high displacement elasto-plastic flexure about their minor bending axis. They are the replaceable yielding components of a control structure or standard structural frame.

Their stable yielding action enable control structures or standard structural frames to form a stable cycling high displacement elasto-plastic mechanism in resistive response to a seismic ground motion (base) input. The stable flexural yielding of the plates limits the magnitude of forces developed within the control structure of which the plates are part of; or within a standard structural frame found in racking structures or general building structures, which the plate is typically directly supportive of.

The yield plates are effectively cushioning the control structures response to ground motion or base excitation.

Contingent on the plates to limit the forces within a control structure or standard structural frame is their ability to sustain potentially high cycling elasto-plastic displacements (deformation) in a stable manner while maintaining a constant resistive force.

The magnitude of the peak elasto-plastic displacement demand on the plates is a function of a number of variables including ground motion (acceleration) input, mass seismically supported directly (or indirectly) by the control structure or standard structural frame, distribution of mass, elastic natural frequency of structure(s) (inclusive of plates) and yield strength of the plate(s) itself.

The ability of the plate(s) to sustain the cycling peak displacement demands on them, while maintaining a stable constant resistive yield force is further dependent on their material stress-strain characteristics and structural form.

Applications of the deformable members or plates will now be described. During a seismic event, as described previously, storage racks 3 in a warehouse, or any large structure such as a building, can sway or rock in an elongate (lengthwise) and transverse (widthwise) direction.

It has been found that using a deformable member, in one embodiment being a yield plate 100, that allows elastic deflection and sacrificial plastic deflection, can both modify and control the structures dynamic response to a ground motion input (base excitation) and limit the magnitude of forces that can develop within the structure or rack 3 caused by seismic activity. Absorption of energy by the yield plate 100 (or as described later in another embodiment, a plate 603) through elastic and plastic deformation reduces the internal forces that can be generated within a rack 3, so it is able to withstand greater seismic activity with damage confined to the yielding plates. These yield plates are preferably replaceable if a substantial seismic event has occurred. It is the plastic deformation of the yield plate 100 at a known calculated or load test verified force that limits forces generated in the supported structure during a seismic event.

The simple structural behaviour of the yield plate of the yield connector 230 allows for its performance to be both load tested and/or calculated accurately. Its design is such that its yield force and energy absorbing performance remains predictable during each movement cycle of the control structure and storage rack during a seismic event. The yield connector utilises a flexure member 100, that is able to deform. The flexure member 100 (also herein referred to as the plate) is designed or has its performance known for its intended purpose. As such the more accurate the analysis of it the more simplified the design of the overall structure can be and the more predictable the outcome will be during a seismic event. Further to this, it is important that the flexure member 100 (plate) is not able to develop tensile or compressive membrane forces within itself as it flexes to high transverse plastic displacements during yield. Membrane forces generated within a yielding member (plate) will both increase the (plate) stiffness and result in an increasing force resistance within the plate with increased deformation. This in turn will reduce its energy dissipating and force limiting ability, resulting in higher forces being developed in both the control structure and any adjacent structure the control structure may be seismically supportive of.

In one embodiment the flexure member/yield plate may be described as a simply supported beam. Where a simply supported beam is well known and defined in classical mechanics. A simply supported beam, in one embodiment has a pinned end end condition at one end of a beam or plate (herein the flexure member), and a translational and pinned end end condition at the other end of a beam plate as shown in FIG. 1G. The flexure plate described herein, alternatively may a fixed/cantilever end condition at instead of its pinned end as shown in FIGS. 1H. 1G and 1H also show an example of a minor axis (or out of plane axis) 9 going into the page.

It is ideal that tensile or compressive membrane forces do not develop in the flexure member 100 (plate). Briefly, the connector should allow for the flexure members 100 end regions to translate freely without impediment or restriction, or being encumbered, fettered or the like with the foundation 4 during a yielding condition. The ability of the end regions to translate relatively freely during yielding or lifting of the flexure member is preferred to allow the flexure member to be pulled and deformed/deflected into a curve. In other words the yield member 100 plates are free to flex simply without generating any tensile or compressive membrane forces in the end regions and hence within themselves and for the simply spanning plate, shown in FIG. 1G, also be free to rotate at its end regions so as not to develop any unintended end moments.

The yield plate is incorporated as part of a yield connector (also referred to as a flexure connector). One embodiment of a yield connector, that connects a rack directly or indirectly to a foundation is provided as a rack anchor 1000 as shown in FIG. 1A. It is provided to allow rack movement yet absorb energy with a constant force when the rack is swaying or rocking in a transverse (widthwise) direction. During swaying in the transverse direction (towards the sides/rows of the rack) racks are generally more unsteady as opposed to lengthwise motion of the rack along the row. The racks are typically narrower between rows than between columns. Rack anchors 1000 are proposed to modify and control the overall response of a structure to a seismic event, and limit forces generated within the structure through yielding at a maximum known force (that has been reliably established by calculation and load test) during a seismic event. The forces transferred through the rack anchor 1000 in a rack sway/rock event, are predominantly substantially vertical force. This is because the simplified resulting force caused by rack motion acts around two thirds up the height of the upright column and this higher force will sway/rock the rack back and forth between rows. A high swaying force will lift an upright column of one row upwards and the opposite upright column downwards into the foundation. So for example, whilst one rack anchor 1000 is in tension upwards due to its associated column being lifted, another rack anchor 1000 will be forced in compression in a downwards direction. In this simplified example, generally the horizontal forces at the anchor are negligible compared to the up and down compression and tension force the anchor experiences. The upwards forces may be over 8 kN. Depending on the application, the forces can vary significantly, but generally they are high and far greater than the horizontal forces at the anchor.

Due to width wise rocking of the rack during a seismic event the force direction through each column pair oscillates between columns in the pair. I.e. after an upwards force is transferred to one rack anchor 1000 on one column, and the rack motion changes direction, a downwards force is subsequently transferred into the same said rack anchor 1000. And vice versa with the opposite column where a downwards force was present, a subsequent upwards force is transferred into the rack anchor 1000. As such, each rack anchor 1000 has an oscillating upwards and downwards force transferred to it. This can repeat many times during a seismic event.

As seen in FIG. 1 there may be interposed between the column 10 and the yield plate 100, a column base 11 that is more rigid than the column 10 and allows adequate attachment area of the column 10 to the yield plate 100.

During the upwards cycle, the yield plate 100 may deform upwardly with the motion of the column 10, to a $2^{nd}$ condition. At the end of the downward cycle, the yield plate 100 deforms back to its initial, or $1^{st}$ substantially un-deformed condition due to the weight of the column 10 "flattening" the deformation. The column base 11 helps to give a large flat area which can flatten the yield plate 100 back to its substantially un-deformed condition.

Due to the oscillatory nature of the forces through each rack anchor 1000 during a seismic event, the calculation of the specific performance of the rack anchor 1000 should desirably be accurate and remain consistent even after the first cycle. To achieve this the yield characteristics of the rack anchor 1000 should not substantially change after each cycle or not change significantly after each cycle. Importantly, the variables that stay substantially similar are yield strength and elastic stiffness of the yield connector 1000. Preferably the yield plate 100 of the yield connector 1000 has 1) a stable and constant cycling yield strength and 2) a stable and constant cycling elastic stiffness. Of course, many other variables may also stay substantially similar or similar.

The design of the yield connector 1000 is preferably to be calculated accurately so the specific performance of the anchor is known. For example, the stiffness, deflection and deformation in operation, weaknesses, stress concentrations et cetera are accurately able to be calculated. This allows the design of the yield connector 1000 to be designed or have its performance ability known for its intended purpose. As such the more simple and accurate the analysis of the structure, as a whole, in responding to ground (earthquake) motion.

The yield connector 1000 of the present invention utilises the yield plate 100 that throughout many cycles induced by oscillating forces, does not significantly change its yield characteristics. For the yield connector 1000 of FIG. 1A, this is achieved by having a yield plate 100 that is not susceptible to prying (i.e. an end moment) and is free to translate (slide) at its end boundaries/distal ends. This means that a simple curve is produced after upwards load is applied to the yield plate 100. The simple curve allows easy analysis of its characteristics before, during and after deformation. Preferably the curve produced by the yield plate is a monotonic decreasing curve with no point of inflection. However in other embodiment (as shown if FIGS. 22B and 27B), there are multiple curves in a yield plate 100. The yield plate 100 is free to translate (slide) at its supports (end regions) and is not stretched or compressed in a tensile or compressive manner and is not able to develop membrane forces— substantial yielding only occurring at yield zone/s which are not the translatable end region of a yield plate.

One embodiment, shown in FIGS. 1-11 show a yield plate 100 having a $1^{st}$ and $2^{nd}$ wing that meet at a yield zone Y (FIG. 1B). Each wing has a respective end region and anchor region. The two wings may be integrally formed, or connected or engaged otherwise. The yield connector 1000 of the embodiments shown in FIGS. 1-13 can be known as rack anchors 1000, as they anchor the column 10 of a rack 2 to a foundation 4.

The rack anchor 1000 preferably has or utilises two hold down anchors, a first anchor 210 and a second anchor 220 FIG. 3A. In a preferred embodiment the plate is substantially elongate, with a hold down anchor located at or towards each end of the yield plate 100, and the column 10 fixed, attached or integral to the plate at an attachment region 20 intermediate each end region 111, 121 of the yield plate 100. The hold down anchors 210, 220 hold or limit the motion of the yield plate 100 and associated column 10 a set distance from the foundation 4. The hold down anchors 210, 220 can be a number of different designs and configurations. In some embodiments as described later, the hold down anchors 210, 220 hold end regions 111, 121 of the yield plate 100 directly on the foundation 4, wherein other embodiments the hold down anchors 210, 220 hold the end regions 111, 121 of the yield plate 100 a set distance off the foundation 4, and in further embodiments the hold down anchors allow the end regions 111, 121 to travel a predetermined distance off the foundation 4. These embodiments will be described in detail later.

The hold down anchors should allow for the end regions 111, 121 to preferably rotate and preferably translate freely without impediment or restriction, or being encumbered, fettered or the like with the foundation 4 during the second or yielding condition. The ability of the end regions 111, 121 to rotate relatively freely during yielding or lifting of the plate is preferred to allow the yield plate 100 to be pulled and deformed/deflected into a single curve. In other words, the hold down anchors 210, 220 prevent the creation of an end moment upon the end regions 111, 121. Types of preferred rotational hold down anchors will be described later.

If the hold down anchors were rigidly fixed, even during yielding, to the end regions 111, 121 as well as the foundation 4, then end moments and subsequent prying may occur about the end regions 111, 121. At the regions where prying would occur, would be yield zones. The creation of a yield zone at the end regions is undesirable as during the $2^{nd}$ uplift cycle, the material variables of the yield plate 100 will have changed due to the kinks at the yield zones in the material. It is these variables that is one issue that the present invention overcomes. Fixed end regions, that do not have relatively easy rotation during yielding, lead to the plate having multiple curves. Multiple curves are more difficult to analyse than a single curve, especially after multiple cycles.

At least one of the hold down anchors 110, 120 must also allow for relatively easy lateral translation of its respective plate end region during yielding in the direction towards the opposite hold down anchors. This lateral translation during yielding allows the yield plate 100 to be drawn up with the column 10 during its operational up-stroke from the foundation without stretching or prying the plate 10 at the end regions. And subsequently the substantially lateral translation of an end region allows the yield plate 100 to be pushed down with the column 10 during its operational down-stroke without the yield plate 100 crumpling or kinking or going into compression.

In a preferred embodiment, both hold down anchors 110, 120 allows for lateral translational movement as described, during bend deformation of the yield plate 100. Other embodiments of the translational feature are described later.

From a boundary condition point of view, during the 1$^{st}$ condition—where there are low forces i.e. low seismic forces—the yield plate 100 of the rack anchor elastically resists translation in A, B and C directions. Wherein B is parallel the direction of the elongate axis of the flexure member, A is parallel the direction of the vertical forces and the C direction is perpendicular to both the A and B directions.

In the yielding or 2$^{nd}$ condition—where seismic forces are present and the rack is rocking—the yield plate 100 has relatively (compared to the non-yielding conditions) easy rotation at its end regions about the C direction, but relatively difficult rotation about A and B directions. Furthermore, in the yielding condition, there is relatively easy translation at one or both end regions in the B direction, but still relatively difficult translation in the A and C direction. An example of this coordinate system is shown in FIG. 11.

In one embodiment the column 10 is attached to the yield plate 100 at the attachment region 20. The attachment region 20 is preferably central and intermediate the end regions of the plate. In alternative embodiments, the attachment region 20 is not symmetric with the hold down regions of the plate, i.e. it is nearer one end region than the other.

In one embodiment, the column 10 is attached to the yield plate 100 and via a bolted connection. The bolted connection avoids having stress concentrations that may be formed from welding the column 10 to the yield plate 100.

Preferably the bolted connection utilises a hole 23 through the plate and column that a bolt 21 can be drawn through. In some embodiments, features may be required so that the head of the bolt does not impede on the plate's 100 initial substantially flat condition.

In a preferred embodiment there are multiple bolted connections running along a transverse direction of the plate as shown in the cross section of FIG. 1D. There may be more or less bolts, in various patterns depending on the configuration required for the rack system. It is envisaged that a person skilled in the art will think of many ways of attaching the yield plate 100 to the column 10.

Bolting the column 10 to the yield plate 100 also allows replacing the old plates of a rack anchor 1000 with new plates after a seismic event if required. The reason for replacing a plate may be due to fatigue or yielding of material.

A welded connection may be provided instead or in addition.

At the attachment region, is preferably a larger region of a yield zone 2. The yield zone 2 is a zone in which the yield plate 100 yields and can plastically deform, during the up-stroke and down-stroke. The yield zone 2 area is defined by the geometric and material properties of the yield plate 100, as well as the type of column attachment. Differing examples of the yield zone are shown in FIG. 1E and FIG. 1F. Preferably there is only one yield zone in the yield plate 100 during deformation.

In a preferred embodiment, the yield plate 100 is substantially planar in its original un-deformed form. During deformation upwards, it deforms into a single positive upwards curve. The curve may not be constant. During deformation downwards, it deforms back towards its initial planar form.

In other embodiments, the plate may not be substantially planar in its original un-deformed form. The plate may have a positive curve towards the column or negative curve towards the foundation. In these embodiments, there would be an intermediate member that fills out or packs the gap between the base 11 of the column 10 and the curve of the plate. Adding a pre-curve to the plate may be desirable so that it can go through a greater deformation and therefore absorb and/or dissipate more force.

In one embodiment of the present invention as shown in FIGS. 1A-1E there is shown a rack anchor 1000 attached to a column 10. In this embodiment the rotating feature of the hold down anchors is a first pivot point or surface 303 and second pivot point or surface 313 upon which the yield plate 100 can pivot about upon certain deformation conditions. In this embodiment the hold down anchors are bolts driven or bolted into the foundation 4. The bolts hold down the yield plate by an upper nut or head 301, 302 that is threaded onto the bolt and acts upon a top surface 101 of the yield plate 100.

The translational features of this embodiment are shown in FIG. 1C where first and second vertical slots 305, 315 are formed in the plate at each end region 111, 112 which allow the bolt shaft 302, 312 to translate relative to the plate 10. The slots may be machined or fabricated into the plate, or cast or moulded with the plate. The bolts preferably are Dyna bolts that are capable of being fixed to the foundation 4. Alternatively the bolts may be cast into the foundation 4 and may be vertical studs projecting from the foundation 4. In other embodiments, the bolts are merely dependent from the foundation 4.

As described above, preferably there is a bolted attachment from the yield plate 100 to the column base 11. The bolt head 24 is located below the bottom surface 102 of the yield plate 100. The bolt head 24 may also be a base 24 with 2 upstands 21 as shown in FIG. 1D. Having a larger base 24 allows a more symmetrical and consistent area about which the yield plate 100 can flex. The larger area of the base 24 can reduces stress concentrations.

To allow the yield plate 100 to be deformed back to its original substantially planar and flat position, packers 306 are provided to a) allow space for the bolt head 24 and b) space the end regions 111, 112 above the foundation 4 to prevent contact with the foundation 4 during upwards deformation as shown in FIG. 1B. During downwards deformation the packers 306 operatively act to tuck the end regions under the bolt heads 201, 311. Preferably the packers 306 may only be welded or alternatively fixed to the yield plate 100 via tabs 307. The tabs reduce the surface area of the packers 306 required to be fixed to the yield plate 100. Reducing the surface area fixed to the yield plate 100 reduces the effect the packers 306 have on the material and geometric properties of the yield plate 100. I.e. the packers 306 do not substantially inhibit flexure of the yield plate 100.

The plastic yield zone Y can be seen in FIGS. 1B and 1F. FIG. 1B shows a smaller yield zone than FIG. 1F. It depends on the configuration required for the system on how big the yield zone Y should desirably be. The deflection D can also be shown in FIGS. 1B and 1F. As can be seen in FIG. 1F where the deflection and yield zone is greater the end regions of the yield plate 100 may have a chamfer 308 to prevent contact with the foundation 4.

FIGS. 2A-2B show an embodiment where the packers 306 are fixed to the foundation 4 instead of the yield plate 100. This embodiment allows the yield plate 100 to have a more natural flexure or curvature as there is no external features such as the packer tab 307 fixing area to affect the material or geometric properties of the yield plate 100.

FIGS. 3A-3E show an alternative embodiment where the bottom surface 102 of the yield plate 100 is flush against the top surface of the foundation 4. In this embodiment the 1$^{st}$ anchor 210 and 2*ⁿᵈ* anchor 220 are further integrated into the yield plate 100. In this embodiment, the yield plate 100 comprises slots 401, 411 that are integral or fixed or at least dependent from the yield plate 100. The slots 401, 411 are formed by tubing 402, 412 as shown in FIG. 3E. The tubing is fixed or dependent from the foundation 4. The rack anchor further comprises pins 403, 413 that run through the slots 401, 411 and tubing 402, 412 to allow the end regions 111, 121 to pivot about the pins 403, 413. The slots and pins allow both free from restraint rotational and translational movement of the yield plate 100 with respect to the anchors 210, 220.

In this embodiment the column attachment 20 is via upright studs that are plugged welded or dependent from the yield plate 100. In this embodiment to allow the yield plate 100 to sit flush against the surface 4, the upright projections 21 of the column attachment 20 may be flush with the bottom surface 102 of the yield plate 100.

FIG. 3A shows this embodiment in a stable and initial condition, and FIG. 3B shows the rack in a deformed condition. FIG. 3C shows a close-up view of the end region 111 in the stable and flatten condition and lifted/deformed condition. It can be seen from FIG. 3D that the end region 111 does not contact the foundation 4.

The embodiment of FIG. 3A shows slots at both the end regions 111, 121. However in alternative embodiments there may be a slot 371 at end region 111, and merely a cylindrical hole 370 at end region 121 that allows pivotal movement but no translation about the pin 413. This option of having only one end region in a translational hold down anchor is viable for many embodiments described in this specification. FIGS. 5A-5B show an example of this where only one translational hold down anchor and a simple yield plate 100 is provided. FIG. 5A-5B also shows an example where packers 360 are used so the end regions 111 112 of the yield plate 100 are un-inhibited by the foundation 4 during deformation.

FIG. 3E shows a plan view of the rack anchor. This view highlights the tubing 402, 412 that is fixed to the foundation 4 (not shown). FIG. 4 shows an alternative embodiment of this embodiment where the rack anchor is rotated 90° with respect to the column 10. This is an example to show that it does not matter which angle the rack anchor is with respect to the column or rack as the yield plate 100 is merely providing a vertical force limit. The rack anchor 1000 may be of or at any orientation with respect to the column 10 or rack 3. This rotation of the rack anchor 1000 is viable for all embodiments, not just the present embodiment.

FIGS. 6A-6B show an almost inverse embodiment of the rack anchor to those of FIG. 3. In this embodiment the slots 501, 511 are formed by the hold down anchors 210 and 220 respectively, instead of the slots being formed in the yield plate. FIG. 6A shows the flattened condition, and FIG. 6B shows the deformed condition.

Again in this embodiment, the attachment means for attaching the yield plate 100 to the base of the column 11 is a plug welded 522 upright 521. It is envisaged that the many ways of attaching the yield plate 100 to the column 10. This embodiment is preferred as the attachment between the yield plate 100 and the base 11 provides a flat co-planar surface with the bottom of the plate 102.

Again in this embodiment, alternatively either one (but not both) of the hold down anchors 210, 220 may be solely a hold down anchor with rotational capability and not translational capability. In a further alternative embodiment, the 1*ˢᵗ* hold down anchor 210 and 2*ⁿᵈ* hold down anchor 220 are caps that restrain the end regions 111, 121. The caps restrain the end regions in a vertical direction in operation when stable, and yet allow the end regions to rotate, and slide relative to, about a pivot line 503, 513. The caps also allow the end regions 111, 121 to move in a translational direction towards the centre of the plate/towards the column 10. A stable condition of the rack anchor 1000 is shown in FIG. 7A and a deformed condition of the rack anchor 1000 is shown in FIG. 7B. In this embodiment packers 560 may be utilised to keep the end regions 111, 121 from being inhibited by the foundation 4.

The packers in this embodiment also act to tuck in the end regions 111 and 121 underneath the caps 210, 220. Tucking regions 561 at the distal ends of the packers 560 allows the bottom surface 102 of the yield plate 100 to push against the tucking region 561 during downwards deformation. The tucking regions 561 pushes the end regions 111, 121 outwards away from the column as well as lifting the end regions up with respect to the centre of the yield plate 100 during deformation of the yield plate 100. FIG. 7C shows the tucking regions 561 in action. As the column 10 moves in a downwards direction X and the end regions move in a transverse and downwards direction T.

The caps may be of any form of encasing, lid, channel or restriction that allows the end regions 111, 122 to translate within the encasing means without pulling out of the encasing means during upwards deformation of the yield plate 100. The channel encasing means also allows the rotation of the yield plate 100 at the end regions.

In a further alternative embodiment, the hold down anchors may comprise high compression springs 701 as shown in FIGS. 8A-B. The un-deformed condition of the rack anchor 1000 is shown in FIG. 8A, and the deformed condition is shown in FIG. 8B. The springs 701 allow the yield plate 100 to lift off from the foundation 4 during seismic activity towards the direction of the column 10 uplift. The high compression springs 701 allow the column base 11 and the affixed yield plate 100 to remain flush against the foundation/held against the foundation 4 during non-seismic activity. During seismic activity, as a column 10 lifts upwards, the high compression springs 701 compress allowing the end regions 111, 121 to be lifted off the foundation 4 so as not to be inhibited by the foundation 4 to create end moments at the end regions 111, 121. Once the compression springs 701 are compressed to an extent so as to relieve the end regions, the yield plate 100 is then able to flex to a deformed condition with a single curve.

In particular embodiments it may be useful to move the rack anchor 1000 towards the centre or intermediate a pair of columns 10. Preferably still a pair of rack anchors will be used with a pair of columns 10, however the rack anchors 1000 will be located towards the centre between the pair of columns 10. An intermediate member, or 'strong back', may be utilised to locate the rack anchor 1000 between the adjacent pair of columns, compared to being located at the extremities of the rack. The intermediate member 1001 is used to join the pairs of adjacent columns 10 together so at 2 intermediate locations on the intermediate member 1001 the racks may be placed. I.e. the rack anchors 1000 do not need to be placed at the base of the columns 10, but they can be placed at intermediate locations there between. An example of this is shown in FIGS. 9D and 9E.

Having this intermediate member 1001 intermediate of the columns and disassemblable from the columns, allows the entire intermediate member 1001 and engaged rack anchors 1000 to be replaced after an earthquake without having to dismantle or lift up the rack. Alternatively, the plates 100 alone may be replaced after earthquakes, either in this embodiment or in any of the embodiments described.

This embodiment will be less efficient due to the shorter torque arm that acts upon the rack anchors.

FIGS. 9A-C shows the progression of movement from a standstill rack, through to rocking of the rack in both directions due to seismic activity or velocity S. The velocity S of the rack is caused due to the relative movement of the foundation 4.

The intermediate member 1001 will be connected to both columns 10 that are opposite and adjacent each other in a rack 3. In this embodiment to locate both of the rack anchors 1000 in a compact configuration, the rack anchors 1000 are shown in the elongate direction with the rack 3. FIG. 9D shows a cross-section through the intermediate member 1001 and two rack anchors 1000. FIG. 9E shows a close-up view of one rack anchor 1000 located at one end of the intermediate member 1001. As a comparison, FIG. 10A shows a similar set up with an intermediate member 1001 but the rack anchors 1000 are in the transverse direction located on the intermediate member 1001. FIG. 10B shows a further view of 10A where the rack anchor 1000 is mounted in the transverse direction with the intermediate member 1001.

A main objective of the rack anchor design is to prevent prying action or tensile or compressive membrane forces developing in the plate; so that the plate can maintain a stable constant resistive force while yielding to high transverse displacements. Further embodiments of a rack anchor are shown in FIGS. 12 & 13. FIGS. 12 & 13 show a "Z" plate rack anchor configuration that is similar to the rack anchors as previously described. The rack anchor as shown in FIGS. 12A-C may also comprise a spring member instead of a washer as shown, which allows the yield plate 100 to move up and down prior to plastic deformation FIG. 13. The spring can be configured or pre-engineered to a stiffness for ideal characteristics for the structure.

FIGS. 12D to 12G show one embodiment of the Z-step in detail in which two exterior corners are chamfered and the vertical part of the step immediately adjacent the hold down bolts or fixings is locally cut away to ensure unimpeded translation and rotation of the Z plate at its end regions while it flexes to high elasto-plastic displacements.

FIG. 14 show a plate which is seated flush against the foundation. It is affixed at its lengthwise centre to a foundation and at its translatable and rotational end regions, to the overlying column base. These fixings are converse to previously described fixings. Under the action of an up to force the plate flexes elasto-plastically and develops a concave top surface.

In alternative embodiments, the yield plate 100 may be welded to the base of the column. That is not a preferred version as the weld forms stress concentrations, however it still gives the present invention many advantages over the prior art. This has been shown in some embodiments as shown in FIG. 8 for example.

Preferably the yield plate 100 is composed of a metal and even more preferably the yield plate is composed of steel. In other embodiments, the yield plate 100 is composed of a suitably rigid yet elastic and deformable material that is able to take the load involved. The loads that may be encountered during the seismic events can be over 8 kN. In some embodiments, the loads may be upwards of 11 kN or more. Typically the load is a vertical load that is applied to the centre of the yield plate 100.

Where the yield plate 100 is deformed it is assumed that the yield plate is plastically deformed as it yields. In a given example of a 200 mm span plate, there may be 2 mm of elastic deformation measured between the foundation 4 or underlying support and the bottom surface 102 of the plate at the centre of the yield plate 100. Once this elastic yielding has reached a plateau, plastic yielding takes over. It may be common to see an additional 20 or more millimetres of deflection between the bottom surface of the plate and the underlying support or foundation 4, when measured at the centre of the plate intermediate each hold down anchor.

The yield plate 100 may also herein be referred to as a flexure member 100 due to the flexing nature of the yield plate 100. The plate may also be of another geometry such as hollow sections, box sections or non-plate like members or other geometrical shapes that the stresses and strains are easily calculated, and the material geometry can withstand the forces involved yet still be able to yield to absorb the appropriate amount of energy.

To summarise, some advantages of products embodying the invention are
1. The plate has a substantially stable and constant cycling yield strength.
2. The plate has a substantially stable and constant cycling elastic stiffness
3. The plate may offer at least one of:
    i. high and/or predictable yield displacement,
    ii. high and/or predictable ductility,
    iii. high and/or predicable flexibility.
4. The yield plate is not susceptible to prying or end moments at its end regions
5. The plate is free to translate (slide) at its supported end regions so that membrane forces are not generated within the plate even at high yield displacements.
6. The rack anchor has a single curvature of the yield plate,
7. Preferably there is bolted connection between the yield plate and the column base. The bolted connector reduces any material deficiencies or weaknesses that are hard to calculate when compared to a welded connection.
8. A bolted connection allows for more accurate calculations of any weaknesses in the material
9. The lack of welding also means the yield plate is generally free of stress concentrations which can lead to an inefficient or weak design.
10. The yield plate is simple to analyse and load test. As such it is reliable due to as many factors as possible being known.
11. The yield plate is replaceable after yielding during a seismic event.

The yield plate or deformable member is also able to be used in many other configurations and embodiments. A deformable member or yield plate 100 may be used in many embodiments where a large amount of energy needs to be dissipated. As described previously, a plate with two wings and an intermediate yield zone can be used intermediate a rack column and a foundation. The deformable member is preferably an elongate deformable member and preferably made from metal preferably such as mild steel. The yield plate 100 may also be used in other parts of a system relating to a rack 3 or structure 3.

The systems are here defined as control structures.

Some arrangement and combinations of control structures are presented in the list of figures under the sub-titles are alpha1 rocker frames and alpha2 rocker frames.

Herein pivoting rocker frames, yield plates (e.g. flexure member) and yield plate rockers (e.g. yield plate connectors) are more specifically categorised; respectively as alpha frames (types alpha1 and alpha2), delta plates (types delta1 to delta6) and beta rockers (types beta1, beta2). In one embodiment the yield plate 603 is intermediate the foundation 4 and a control structure 700. Where the control structure 700 is engaged to the rack or structure 3. The control structure 700 transfers any movement from the structure 3 to the plate 603. An example of this embodiment is shown in FIG. 15.

Flexural yielding in the plates is a co-reactive response to axial forces and displacements generated within the double pin links or push rods as the 1) control structure sways in response to ground motion input.

In another embodiment, the plate 603 is intermediate two parts (i.e. a first member and a second member) of a control structure. For example, a control structure 800, 900 or 910 is engaged to a structure 3 and a foundation 4. The control structure has plate 603 as part of the control structure system. As the control structure rocks with the structure 3, the plate 603 has force transferred into it via the relative movement between the first and second members. An example of this embodiment is shown in FIGS. 17-18.

Flexural yielding in the plates is a co-reactive response to the inter-lamina shear forces and displacements generated between the exterior chord and interior frame chord as the (alpha2) control structure sways in response to ground motion input.

An important aspect of the present invention is that the yield plate 603, or plates 603, is not subjected to tensile/compression membrane forces during a loading mode. This is as described with the yield plate 100, where the hold down anchor allows translation at at least one end region of the yield plate. This translation prevents membrane forces developing at an end region.

A loading mode is any mode where the plate 603 is subjected to elastic or plastic deformation. Anywhere where membrane tension is created in a plate 603 can lead to stresses and strains in the plate 603 that alter or restrict the intended movement of the plate, thereby restricting movement of the structure 3 or control structure. That is why the anchors herein described are designed to ensure that only bending of the yield plate occurs.

FIG. 25 shows a yield plate 603 intermediate a first member 601 and second member 602 which form part of a control structure. This type embodiment may be used in the control structures shown in FIGS. 17-18.

In the embodiments of FIGS. 25-28, a shear type action occurs between the first member 601 and the second member 602. This shear action is produced by relative movement between the exterior chord and the interior chord of the rocker frame.

In this embodiment, the control structure is engaged to a structure 3 and the foundation 4. FIGS. 25A and 25B show a yield plate 603 in a non-displaced condition, and in a displaced condition. The plate 603 is rigidly attached to the second member 602 at one end, at the opposite end the plate 603 is translatably and rotatably attached to the first member 601.

The use of translation and rotation features prevent membrane tension from occurring in the plate. The rotation and translation feature in one embodiment is a slot 605 located in the plate 603 which can slide about a pin or shaft 606 located at the respective member, or vice versa. In the embodiment shown, the pin or shaft is rigid with the first member 601 or dependent from a first member 601. The slot 605 also allows the plate 603 to rotate about the pin or shaft 606.

FIGS. 27A and 27B show a further embodiment much like the embodiments of FIG. 25, where a plate 603 is rigidly fixed to a second member 602 and rotatably and translatably attached to a first member 601. In this embodiment there are numerous rollers or shafts 607 that retain a distal end 608 of a plate 603. The rollers or shafts 607 allow a plate 603 to move in and out, or away and towards the first member 601 to prevent membrane tension in the plate 603.

FIGS. 26A and 26B, show a further embodiment similar to the embodiment of FIG. 25, where a plate 603 is intermediate a first member 601 and a second member 602. In this embodiment the distal end 608 is rotatably and translatably retained by two engagement features 609. The first engagement feature 609 at the distal end comprises a shaft and slot system. The second engagement feature 609 comprises a similar shaft and slot system both of which allow the plate to translate at these supports and not develop membrane forces while the yield plate 603 is bending.

From a boundary condition point of view, during the non-displaced condition—where there are low forces i.e. low seismic forces—the plate 603 elastically resists translation in the A, B and C directions (i.e. relative difficulty 6 degrees of freedom) as shown in FIG. 14. Wherein B is parallel the direction of the elongate axis of the flexure member, A is parallel the direction of the vertical forces 10 and the C direction is perpendicular to both the A and B directions.

In the yielding condition—where seismic forces are present and the structure 3 is rocking or rocked—there is relative movement between the distal end region 608 and the proximal end region 610. The plate 603 has relatively (compared to the non-yielding conditions) easy rotation at its distal end region 608 about the C direction, but relatively difficult rotation at the distal end region 608 about the A and B directions. Furthermore, in the yielding condition, there is relatively easy translation at the distal end region 608 in the B direction, but still relatively difficult translation in the A and C direction. Whilst there is no easy translation or rotation at the proximal end region 610 in or about any direction. These end boundary conditions prevent membrane tension in a plate 100/603 during plastic yielding. In particular, during a seismic event, there is no membrane tension developed that would bind the plate assembly, control structure or anchor.

The plate's boundary conditions during a seismic event (i.e. during and above the high force threshold present in a seismic event, and in some embodiments, below the threshold of the high seismic forces) can be likened to the boundary conditions of a propped up cantilever.

In alternative embodiments, the translation boundary condition and translation boundary condition are separated to the distal end region 608 and the proximal end region 610 respectively.

Plates described to this point are typically fixed directly to a base or foundation. As such they are able to flex only in one direction; away from their base, or in returning, towards that base.

An extension of this is to plates which are able to flex transversely in either direction from their neutral or original position. These plates are elevated from their base and not restricted in movement by that base. In the figures these plates are designated as d plates, as shown in for example, FIGS. 47-53.

These plates function as the sole yielding components within a control structure; the control structure being capable of forming a stable cycling elasto-plastic mechanism during a severe seismic event. These replaceable plates, through yielding at a known calculated and/or load test verified force, limit forces that can develop within the control structure or within the control structure and another structure adjacent to it that the control structure is seismically supportive of.

In the broadest sense the plates are able to be utilised in the systems shown in FIGS. 15-18. These systems utilise control structures that are engaged to the structure 3. The control structure moves with the structure 3, and the movement is modified and the energy dissipated by the plates of the present invention. In the figures these control structures are designated as frames, shown in for example, at least in FIGS. 30-37.

FIG. 15: In this embodiment, the plates 603 are intermediate the foundation and the control structure 700. The control structure 700 comprises at least one rocker 701. The rocker 701 further comprising at least two anchors 702 which utilise the present invention plates 603. The rocker 701 also comprises a pivot anchor 703. The control structure further comprises a body 704 which, in a first embodiment, connects the rocker directly or indirectly to the structure 3. During seismic rocking, the rocker 701 pivots with the rocking of the structure 3 relative the foundation. The anchors 702 and pivot 703 connect the control structure to the foundation 4, and there is relative movement between the foundation and control structure. This relative movement is modified by the plates 603. The rocking causes bending of the plates 603 which try to resist said rocking movement. FIG. 15A shows a non-displaced condition, and FIG. 15B shows a displaced condition.

In FIG. 19A a simple yielding plate(s) is connected to a horizontal base by anchor rods. In this connection the rotatable and translatable end regions of the plate allow it to freely elasto-plastically flex to high transverse displacements without generating any internal membrane forces within itself. This allows the plate to remain stable under high cycling transverse displacements while maintaining a constant resistive force while yielding. The plates flexural action is shown in FIG. 19B.

FIG. 20A shows the same simple plate configuration, and FIG. 20B shows the plate supported within, and connected to a horizontal base by, a pivoting rocker. In the figures these rockers are designated as b rockers.

This is a more ideal base connection than the rod connection in FIG. 19A. This is because the rocker is able to maintain an ideal orthogonal transverse loading to the plate; from the pin ended connecting ties (push rods) of the frame, while the plate undergoes high transverse elasto-plastic displacements.

FIG. 21A shows a similar but continuous plate with four individual supports. Continuity at each end of the mid-span section provides variable rotational boundary stiffness to the mid-span section of the plate along with additional yield strength.

As with the simple plate of FIG. 20A the continuous plate is free to rotate and translate at its connectors and similarly not self generate internal membrane forces. Again this allows the plate to flex to high transverse elasto-plastic displacements while both remaining stable and maintaining a constant resistive force while yielding.

FIG. 21B shows this plate set within a pivoting rocker.

FIG. 22A shows a plate which is rotationally restrained at each end but through the use of rollers is, as with the simple and continuous plate, free to translate. Again, this freedom of translation allows the plate to achieve high elasto-plastic displacements without generating structural response changing tensile or compressive membrane actions within itself. Through these cycling displacements the plate remains structurally stable and is able to maintain a constant resistive force while yielding.

Figure 3C:
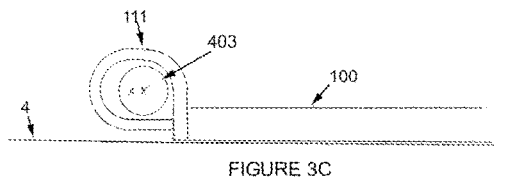
Figure 3E:
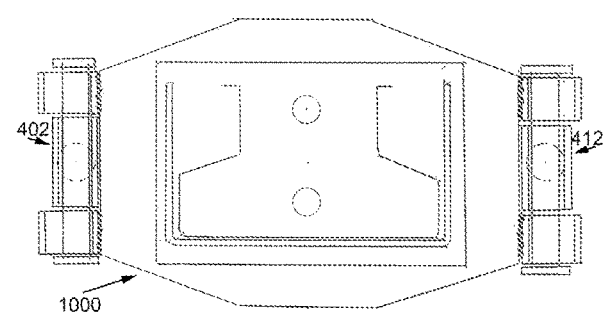
Figure 3D:
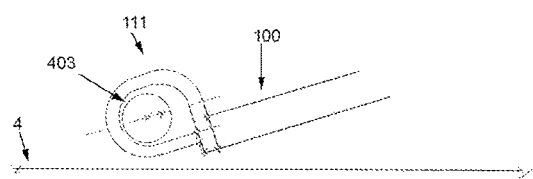
Figure 4:
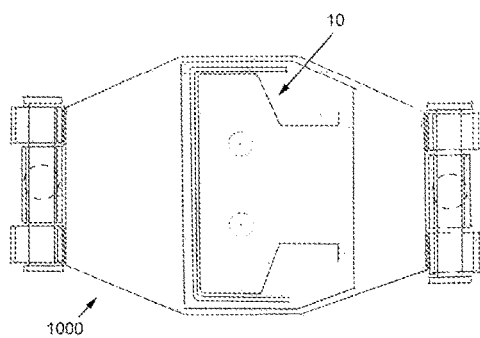
Figure 5A:
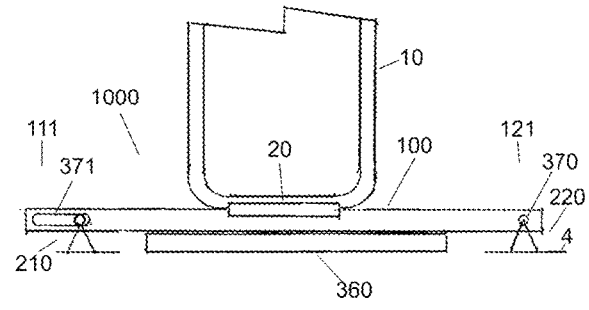
Figure 5B:
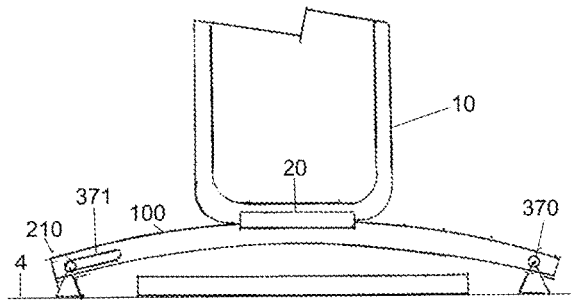
Figure 6A:
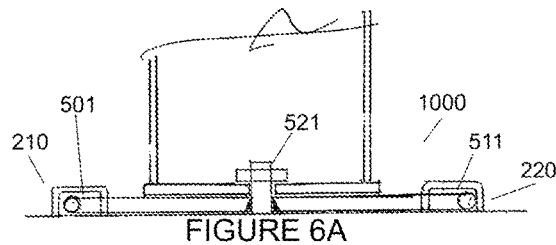
Figure 6B:
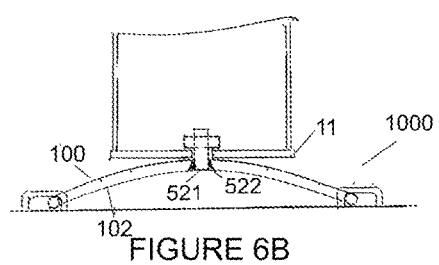
Figures 7A, 7B:
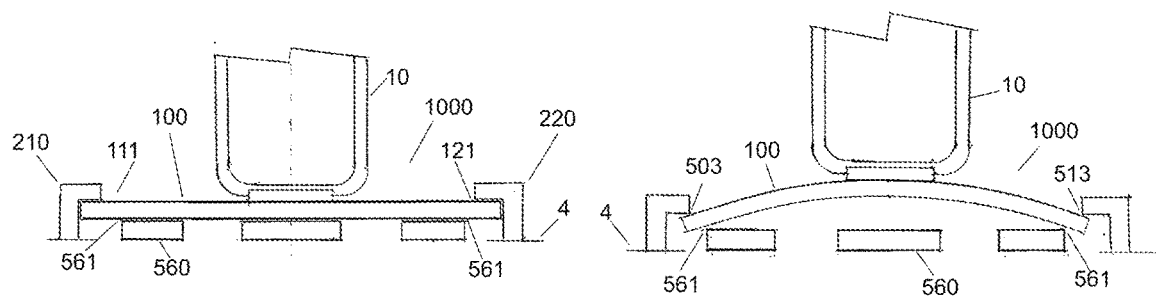
Figure 7C:
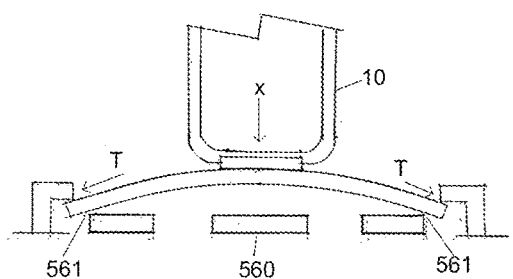
Figure 8A:
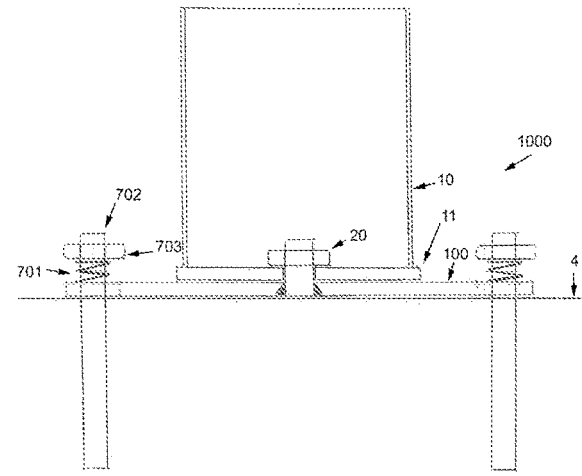
Figures 8B, 9A, 9B, 9C:
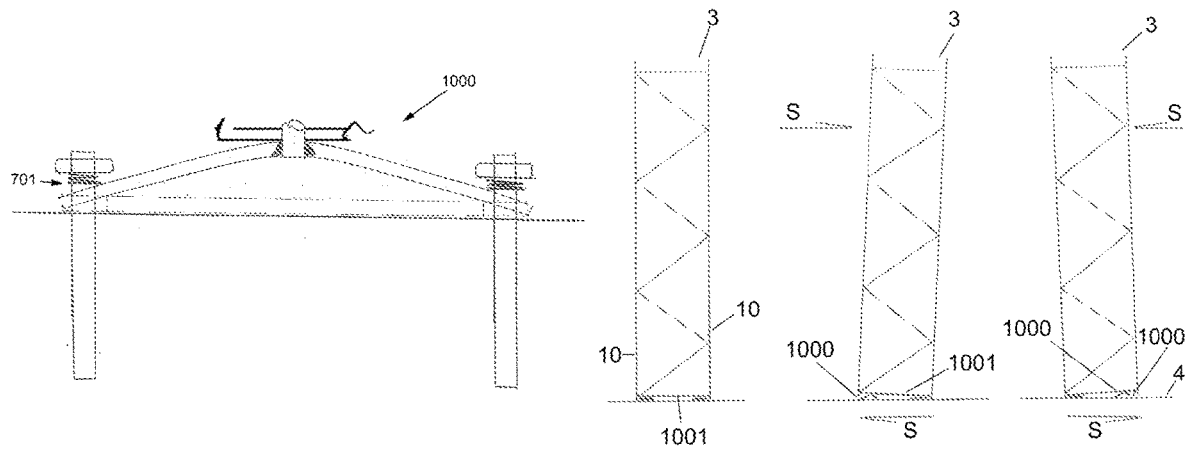
Figure 9D:
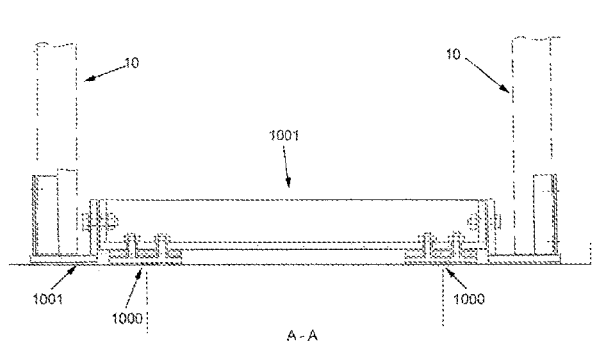
Figure 9E:
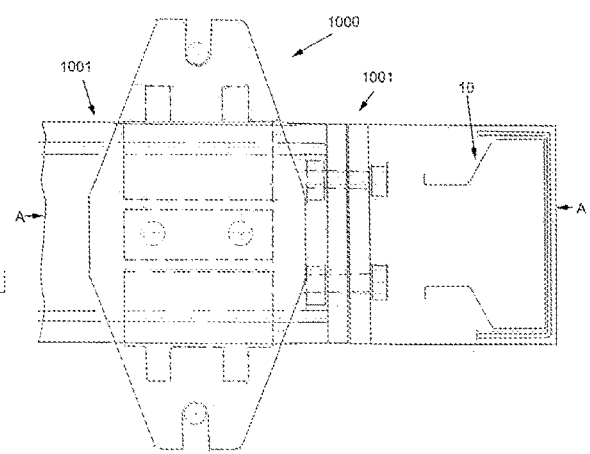
Figure 10A:
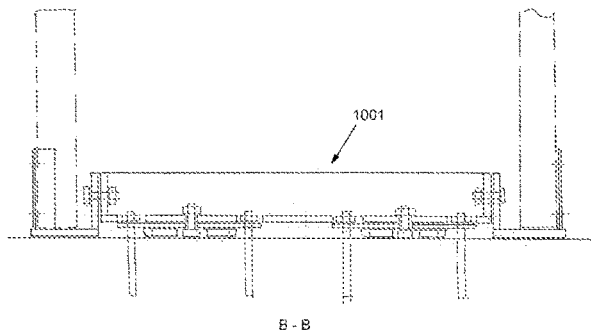
Figure 10B:
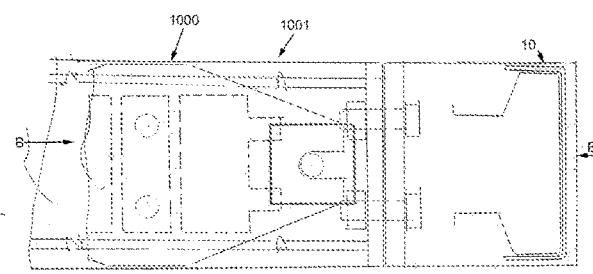
Figure 11:
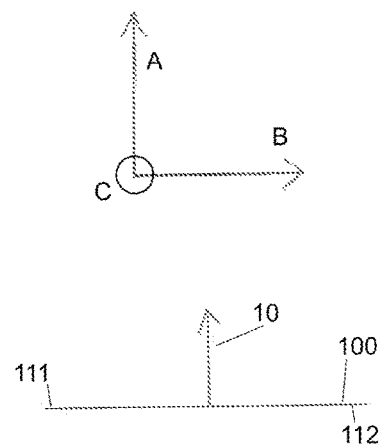
Figure 12A:
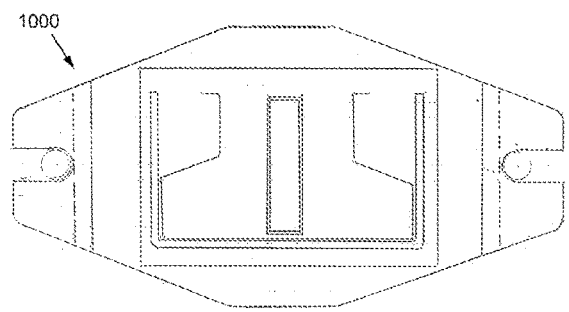
Figure 12B:
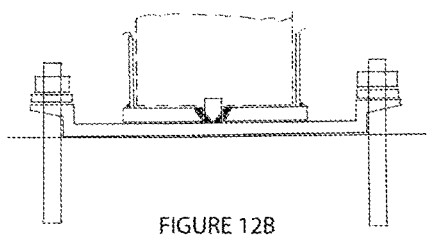
Figure 12C:
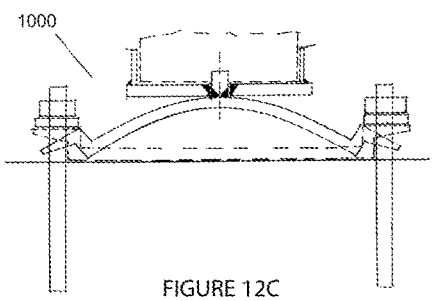
Figure 12D:
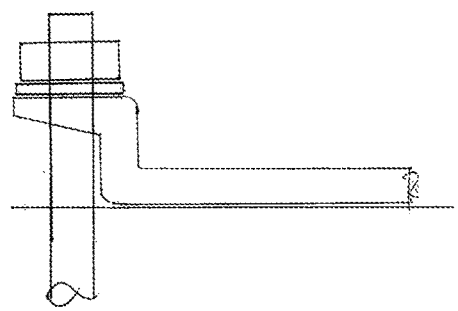
Figure 12E:
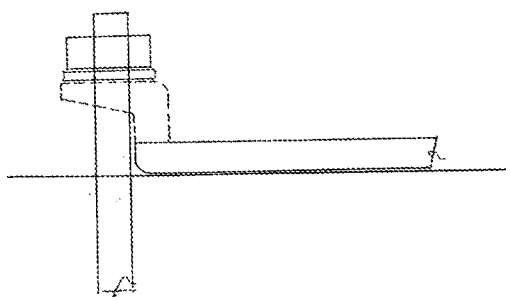
Figure 12F:
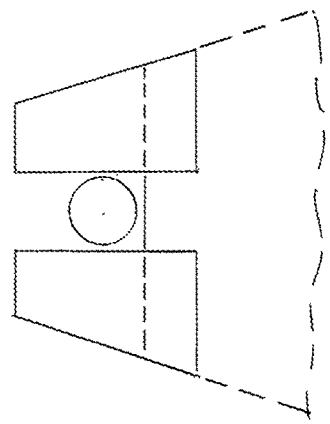
Figure 12G:
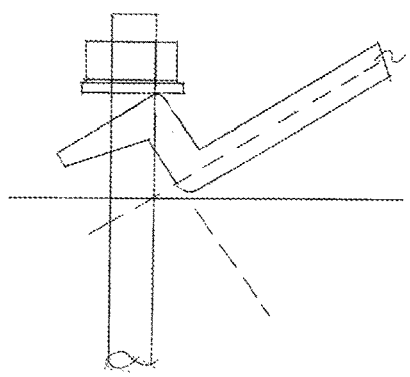
Figure 13A:
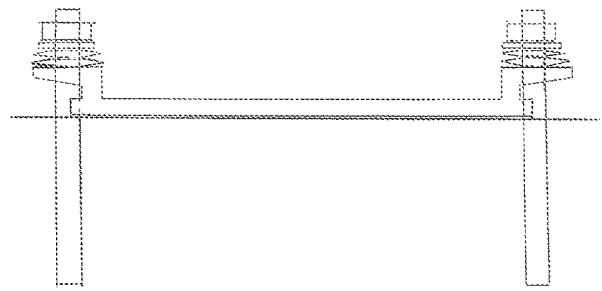
Figure 14F:
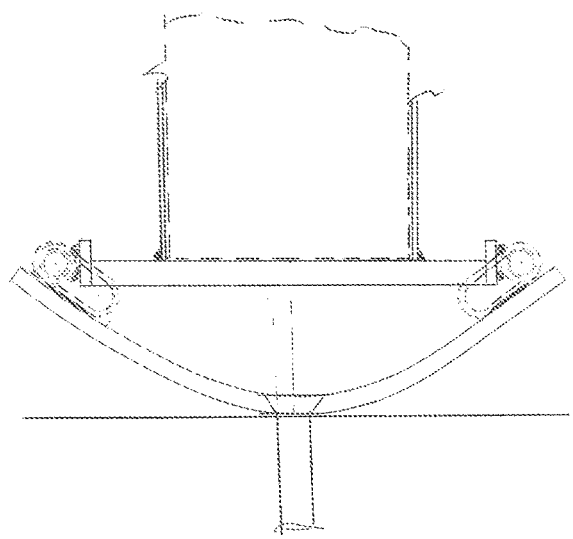
Figures 15A, 15B:
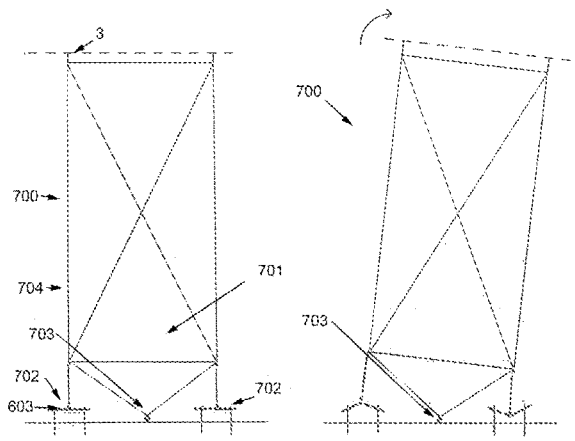
Figures 16A, 16B:
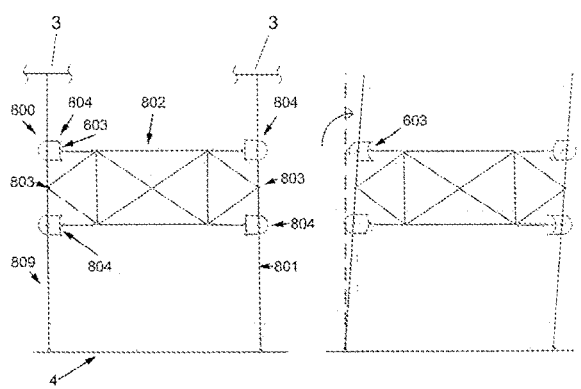

FIG. 16: In this embodiment, the plates 603 are intermediate two members 801 and 802 of a control structure 800. Where in this embodiment, the relative movement is between these two members. In this embodiment, the members are vertical chords 801 and a body 802. The vertical chords 801 are pivotally connected to a foundation or base 4, and at an upper region pivotally connected directly or indirectly to a structure 3. The control structure 800 further comprises the body 802 intermediate, and pivotally connected via pivot anchors 803, the two vertical chords 801. The body 802 is further retained between the two vertical chords 801 by anchors 804 which comprise the plates 603 of the present invention. During seismic rocking, the vertical chords 801 pivots relative the foundation, to in turn drive the body 802 to cause bending of the plates 603. FIG. 16A shows the control structure 800 in a non-displaced condition, and FIG. 16B shows the control structure in a displaced condition. The anchors 804 can be seen schematically to have their plates 603 deforming in the FIG. 16B. The embodiment of FIG. 16 merely is a horizontal version of the embodiment of FIG. 15.

FIGS. 19 to 23 relate to yield plates that are connected to a horizontal (foundation) base.

Figures 23, 24A:
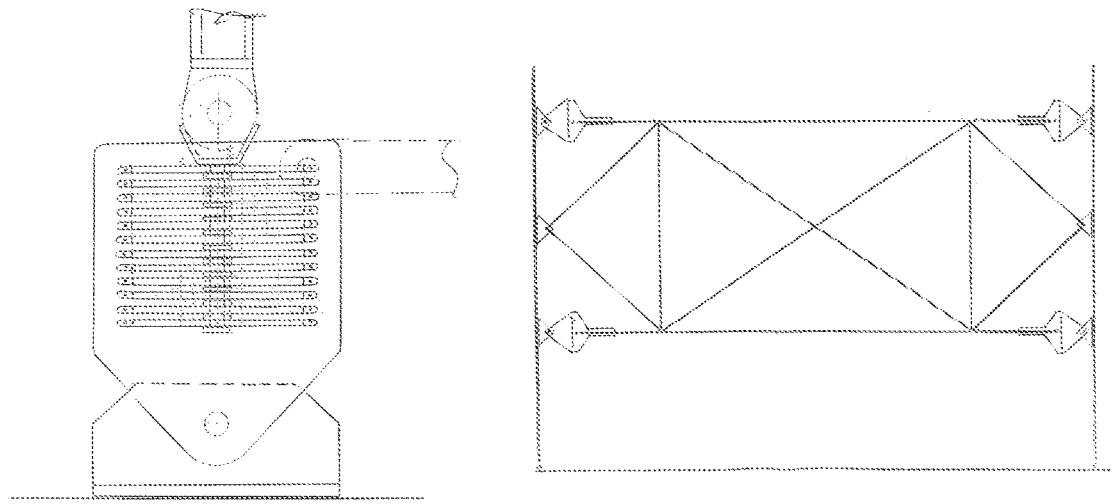
FIG. 23 shows an extension of this principle to the case of multiple plates set within a rocker.

In FIG. 24A the same system is located between two vertical members and with sleeve guided eccentrically pivoting rockers.

Figures 24B, 24C:
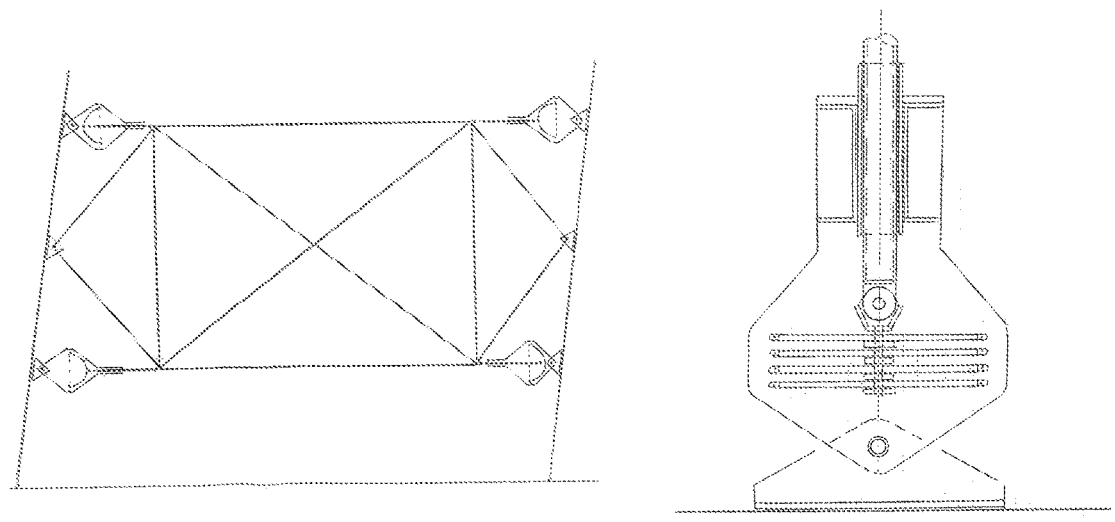

FIG. 24B shows this frame in sway mode.

FIG. 24C shows a case of multiple plates set within a rocker which connects to the vertical members.

The plates described above and shown in FIGS. 20-24 are compatible with the control structures 15 and 16. Plates compatible with the control structures 17 and 18 are shown in FIGS. 25-28.

Figure 17A:
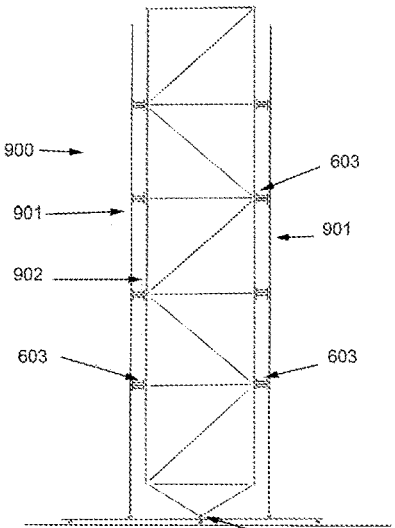
Figure 17B:
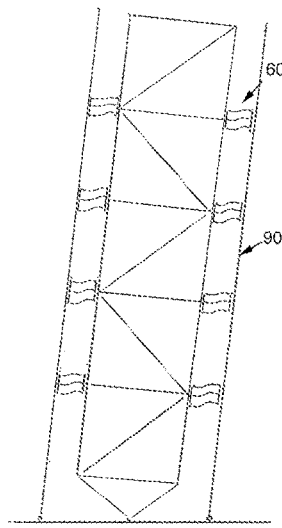

FIG. 17: In this embodiment the plates 603 of the present invention are intermediate two members 901 and 902 of a control structure 900 that is engaged to a structure 3. In this embodiment the control structure 900, comprises vertical chords 901 that are pivotally connected to both a foundation or base and an upper region of a structure 3. A body 902 is connected via the plates of the present invention intermediate two vertical chords 901. The body 902 is pivotally connected at a connection 903 at a foundation or base 4. During seismic rocking, the body 902 pivots about the connection 903 to cause relative movement (shear like movement) between the body 902 and the vertical chords 901. The relative movement is at least partially absorbed and/or resisted by the plates 603 of the present invention. FIG. 17A shows the control structure 900 in an non-displaced condition, and FIG. 17B shows the control structure 900 in a displaced condition.

These yield plates transfer inter-lamina shear forces between the external chords and the chords of the frame. This shear produces flexural action about the plates minor axis. Their flexural yielding both absorbs energy and limits forces that can be generated in the overall structure during the shearing and rocking motion of the system.

Figure 25A:
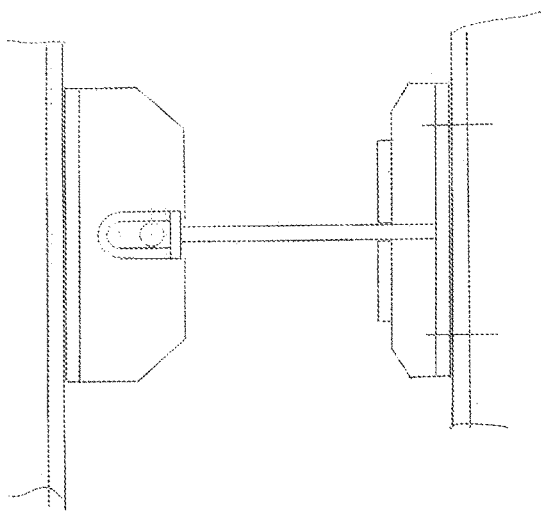

FIG. 25A shows a simple shear transfer plate which is fixed at one side to the frame and is free to translate and rotate at its opposite end where it connects to the external chord.

Figure 25B:
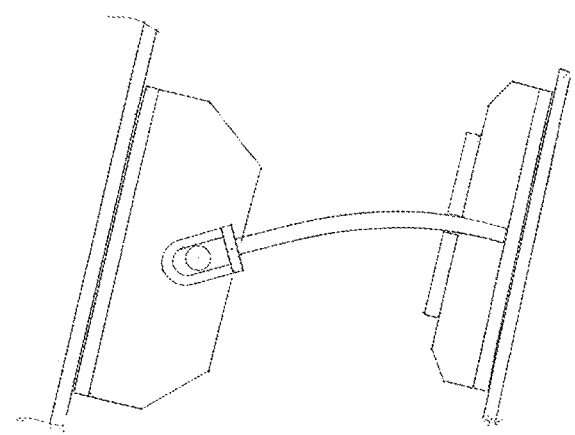

FIG. 25B shows the flexural action of the plate during frame sway mode.

As with all other plates described here, the plate is able to flex freely to high elasto-plastic displacements while remaining stable and maintaining a constant resistive yield force. This is because the plate is prevented from developing structural response changing membrane forces within itself by allowing free translation of at least one of its end regions.

Figure 26A:
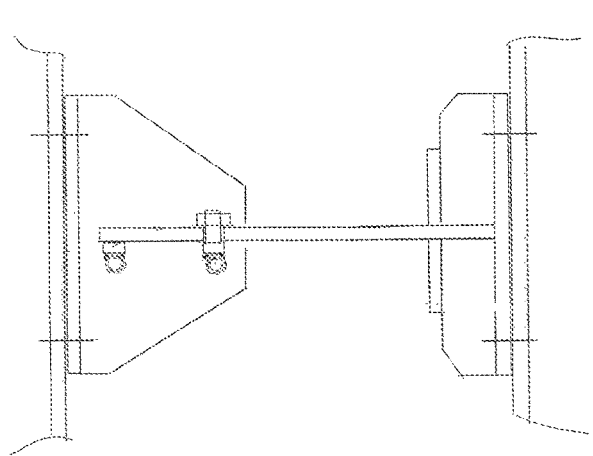

FIG. 26A shows the case of a continuous plate which again is fixed at one side at its connection to the frame but is free to rotate and translate at its opposite supports which connect to the external chord.

Figure 26B:
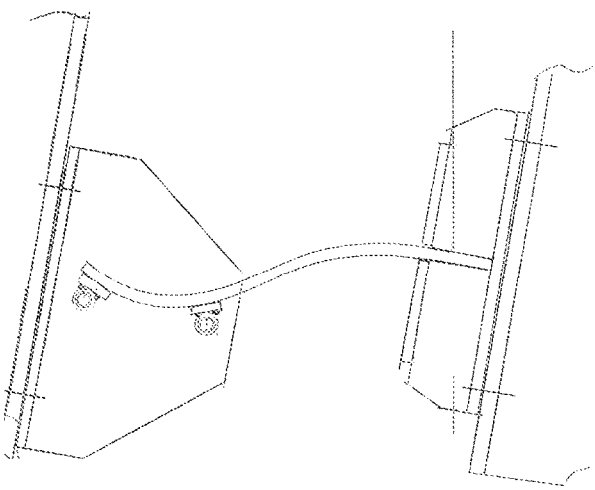

FIG. 26B shows the flexural action of the plate during frame sway mode.

Figure 27A:
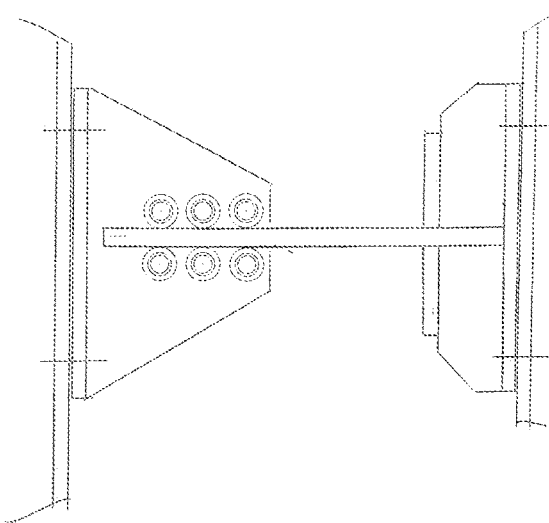

FIG. 27A shows a rotationally restrained plate which as above is fixed at one side of its connection to the frame but is free to translate at its opposite end where it connects to the extension chord.

Figure 27B:
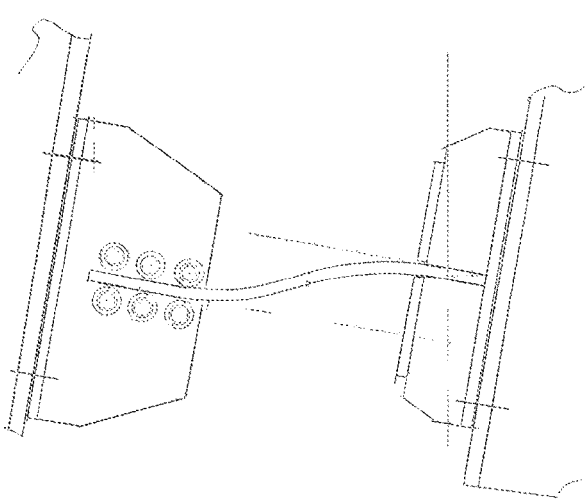

FIG. 27B shows the plate in contra flexure action during frame sway mode.

Here membrane forces are prevented from developing in the plate through the use of rollers.

Figure 28:
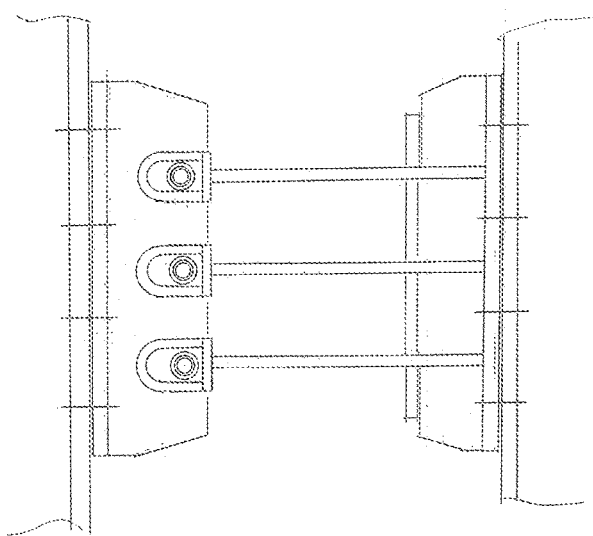

FIG. 28 shows an extension to multiple plates.

Figure 18A:
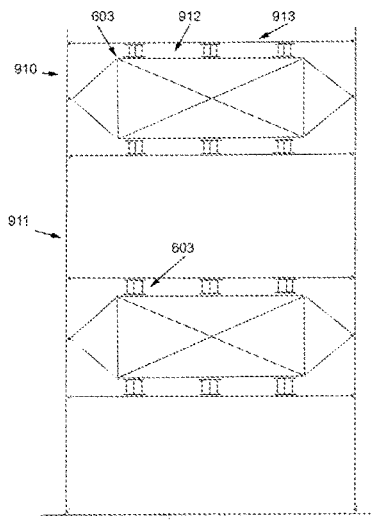
Figures 22A, 22B:
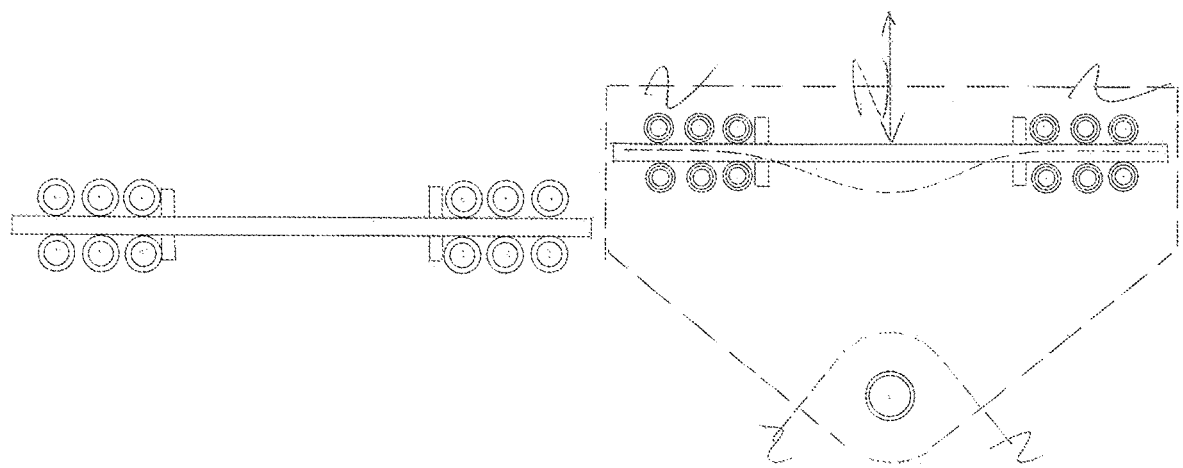
FIG. 22B shows this plate set within a rocker.

FIG. 18: In this embodiment, an embodiment similar to that of FIG. 17; the frame is horizontally retained between two vertical chords 911 to form a control structure 910. Much like the previous embodiment, the vertical chords 911 are pivotally connected to both the foundation and an upper region of a structure. A body 912 is pivotally retained intermediate the two vertical chords 911. The body 912 is further retained intermediate to horizontal chords 913 via plates 603 of the present invention. Much like in the embodiment of FIG. 17, loading of the control structure 910, as shown in FIG. 18B, causes a shear type movement between the body 912 and horizontal chords 913.

Plates considered to date can be categorised as one-way spanning and flexing; meaning that principal elastic or plastic curvature within them is in one direction only.

The use of two way spanning plates; that is plates with two orthogonal directions of principal curvature; to limit forces and dissipate energy is similarly possible.

Figure 29A:
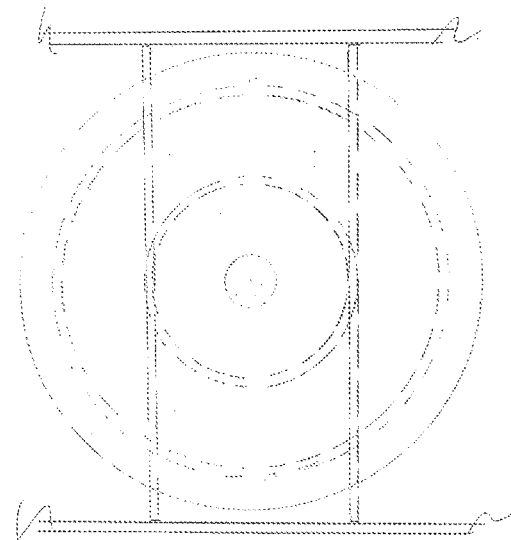
Figure 29B:
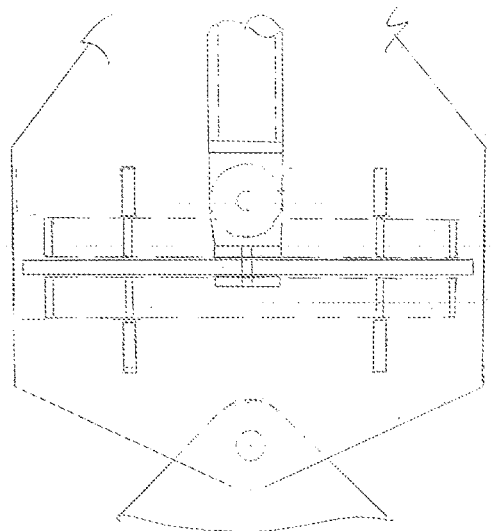
Figure 30:
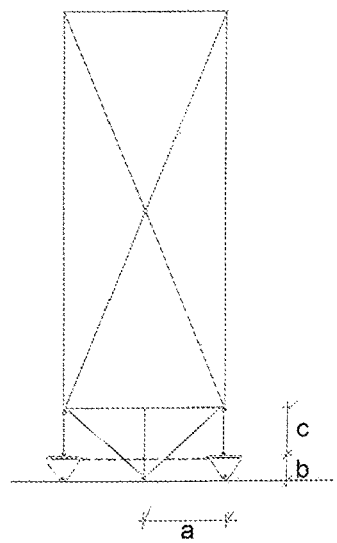
Figure 31:
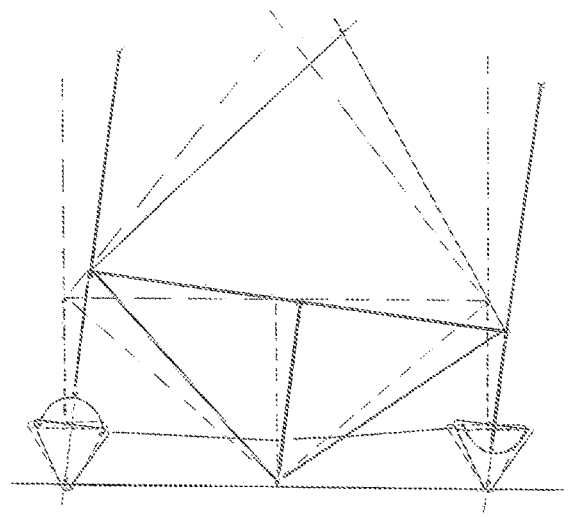
Figure 32:
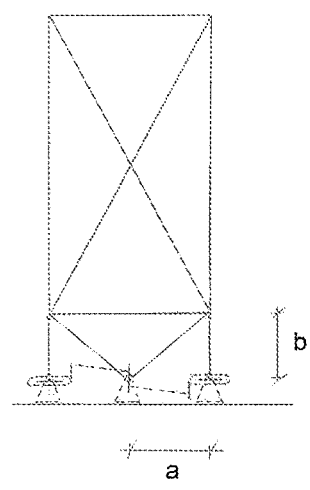
Figure 33:
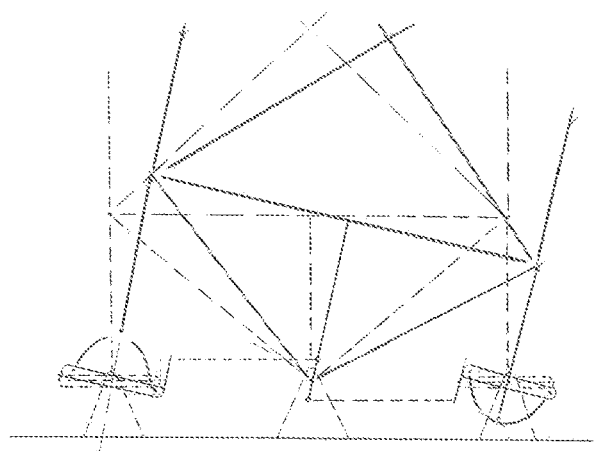
Figure 34:
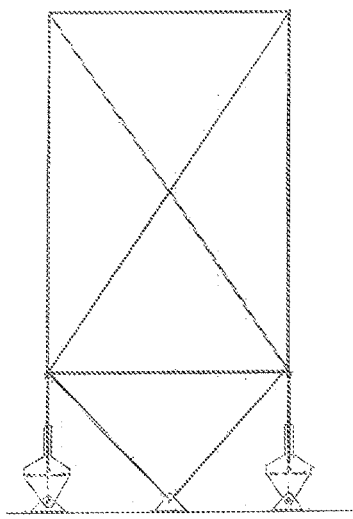
Figure 35:
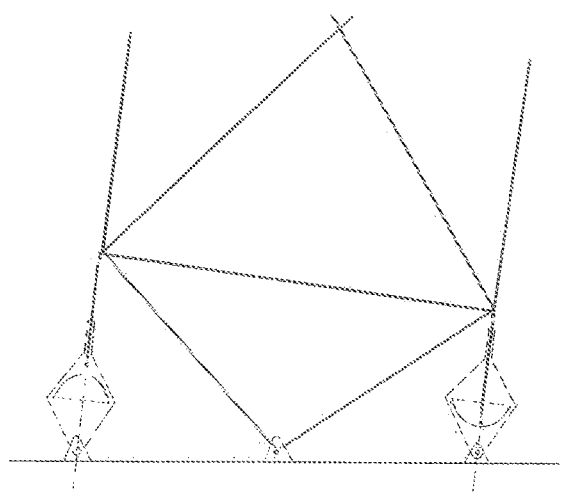
Figure 36:
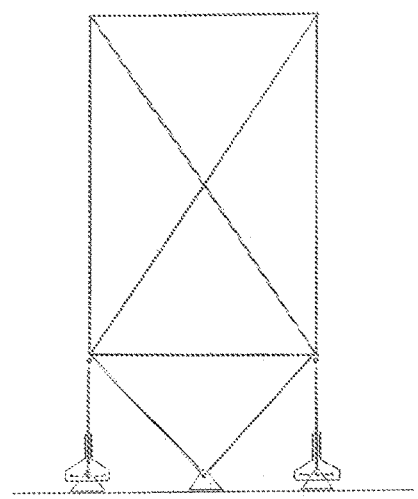
Figure 37:
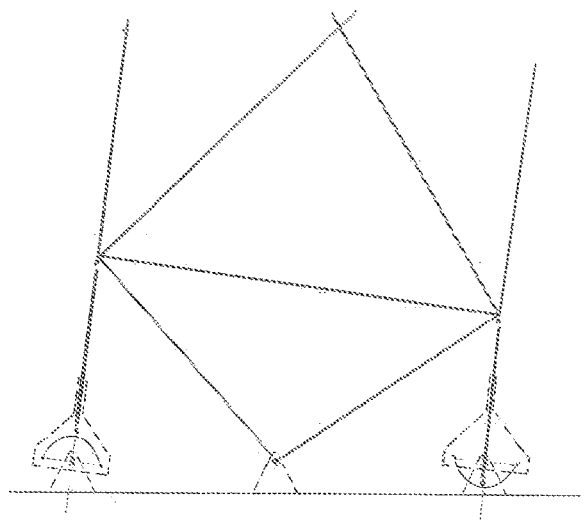
Figure 38:
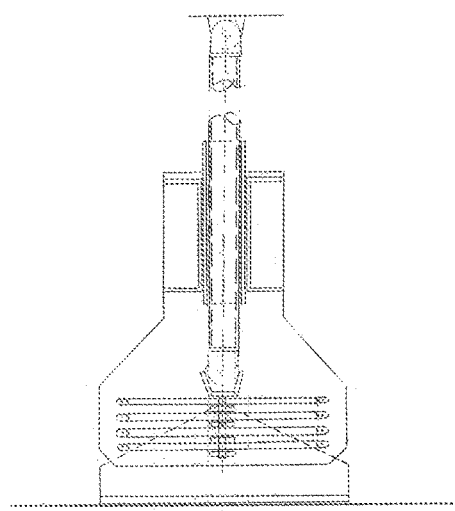
Figure 39:
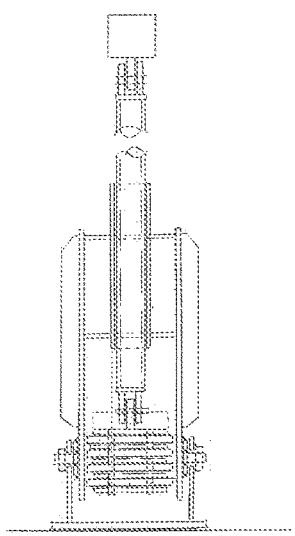
Figure 40:
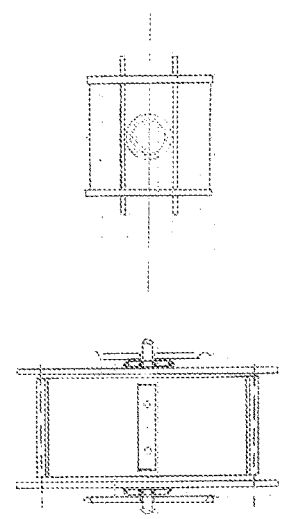
Figure 41:
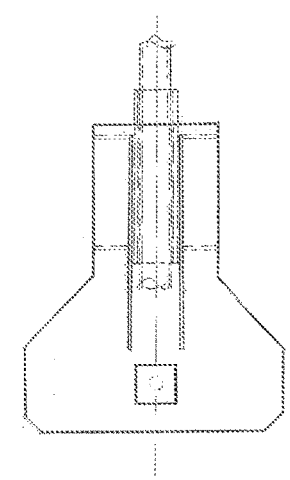
Figure 42:
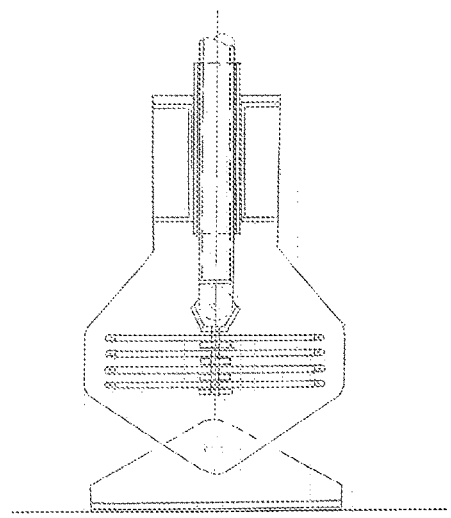
Figure 43:
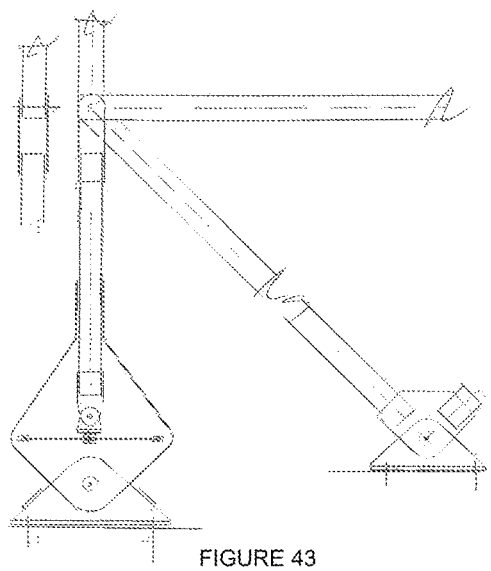
Figure 44:
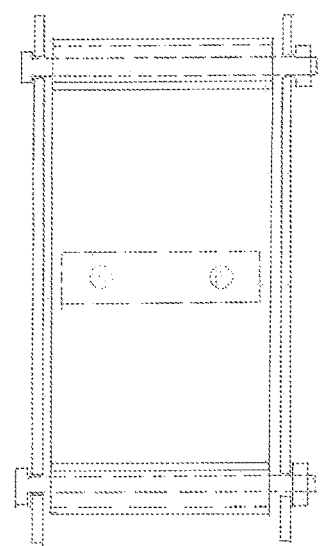
Figure 57:
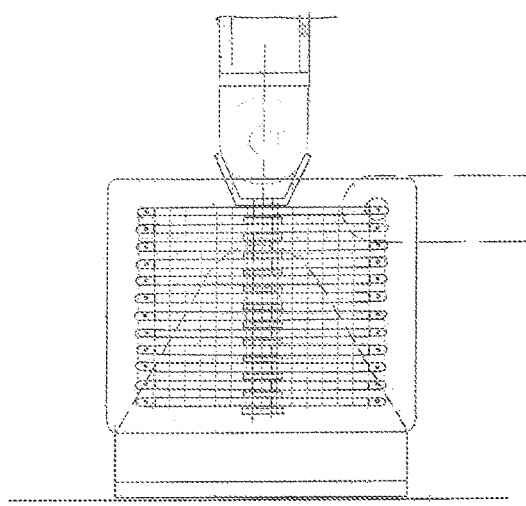
Figure 58:
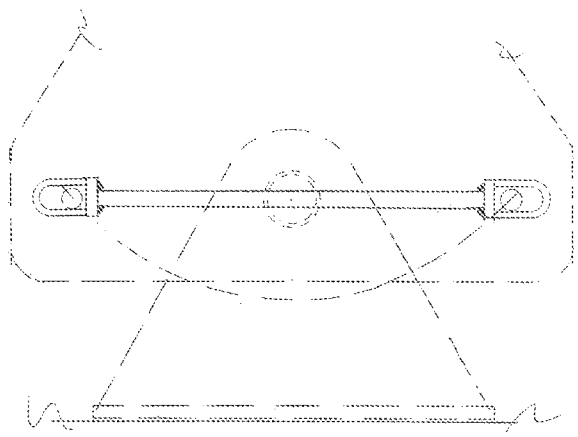
Figure 59:
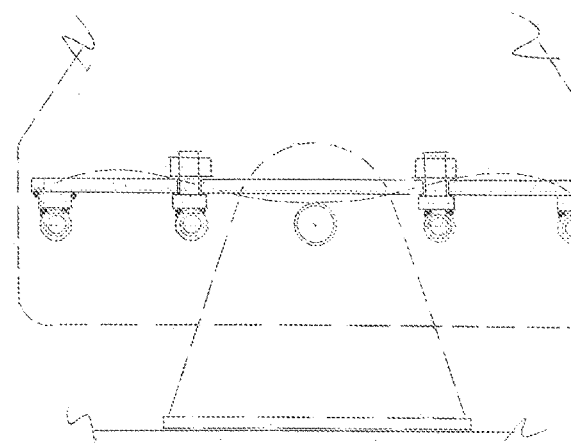
Figure 60:
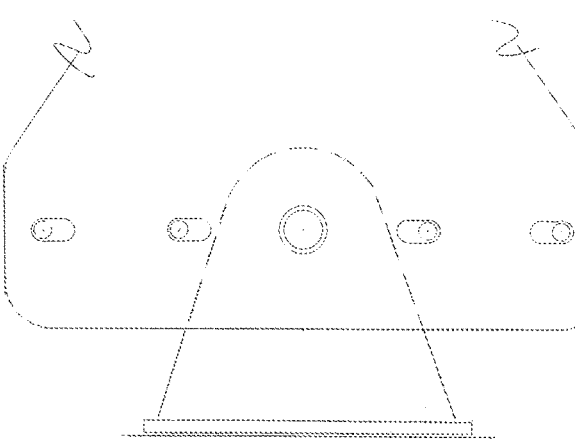
Figure 61:
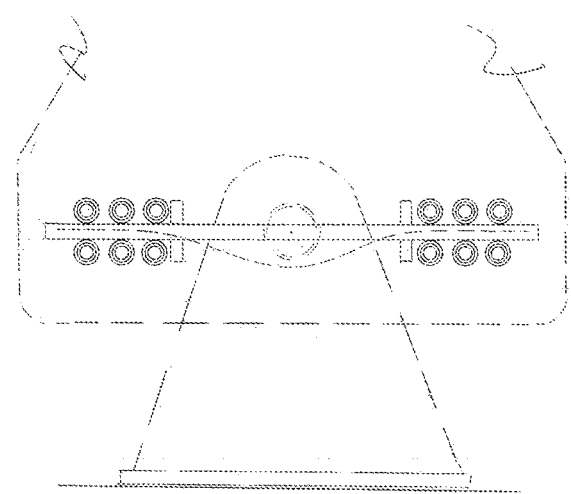
Figure 62:
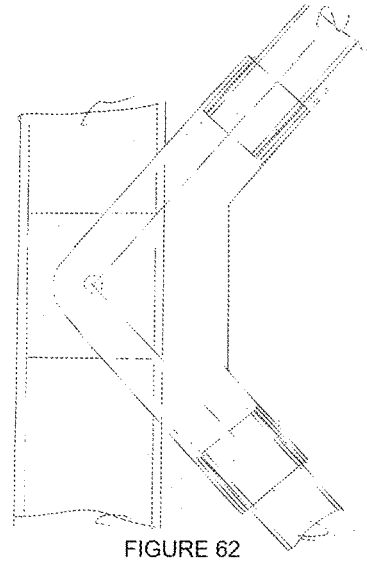
Figure 63:
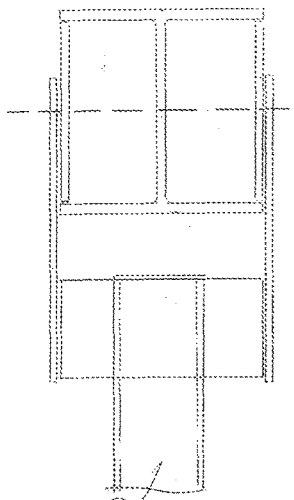
Figure 64:
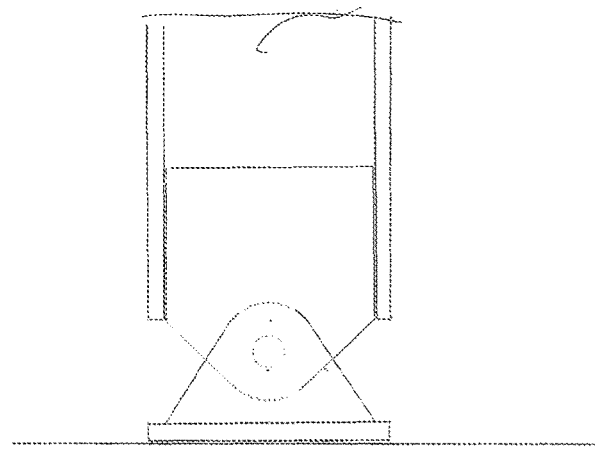
Figure 65:
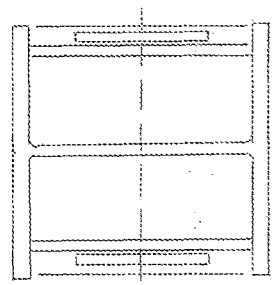
Figure 66:
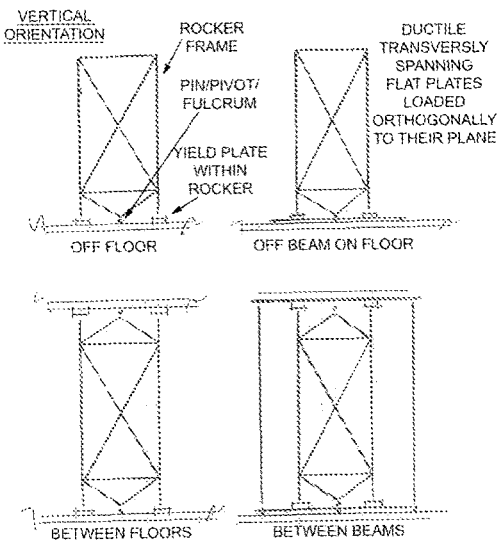
Figure 67:
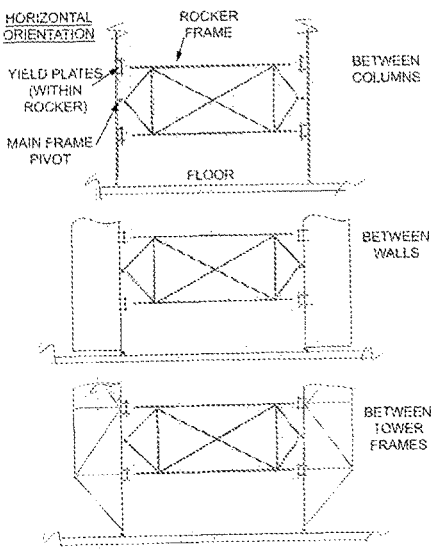
Figure 68:
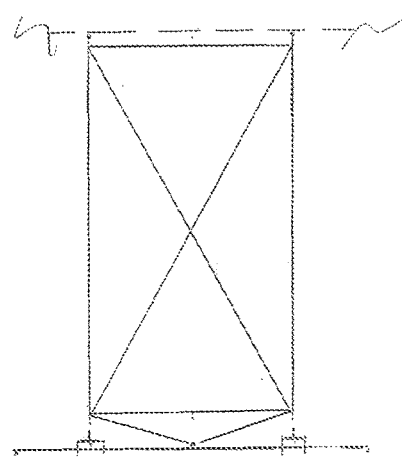
Figure 69:
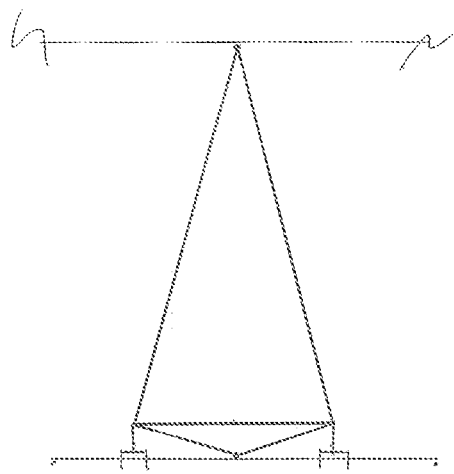
Figure 70:
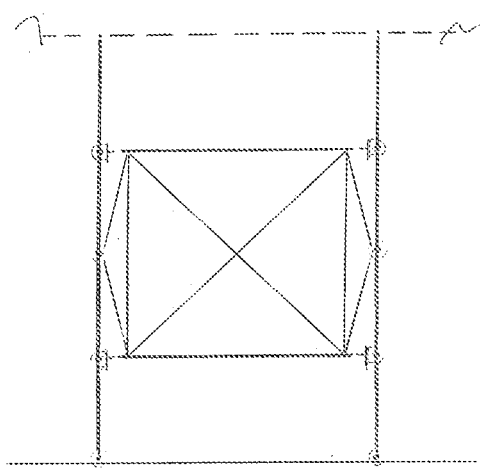
Figure 71:
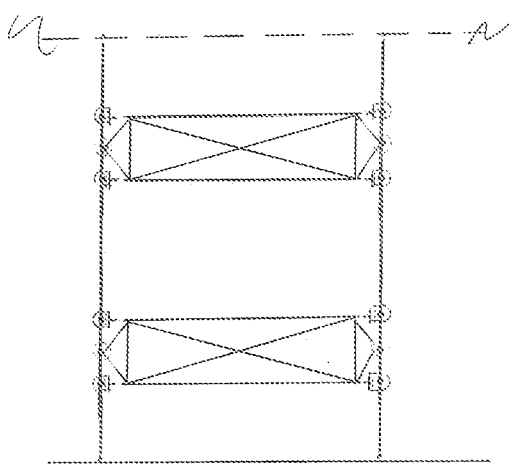
Figure 72:
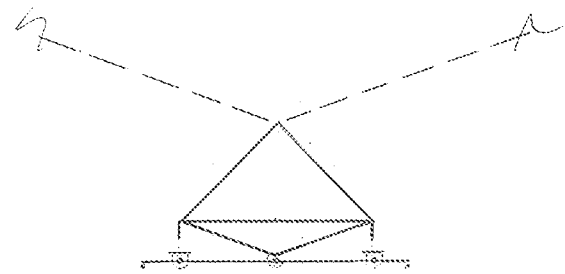
Figure 73:
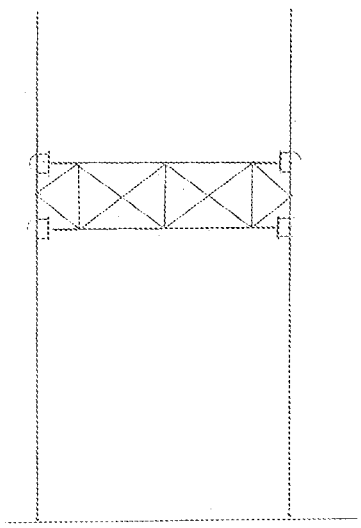
Figure 74:
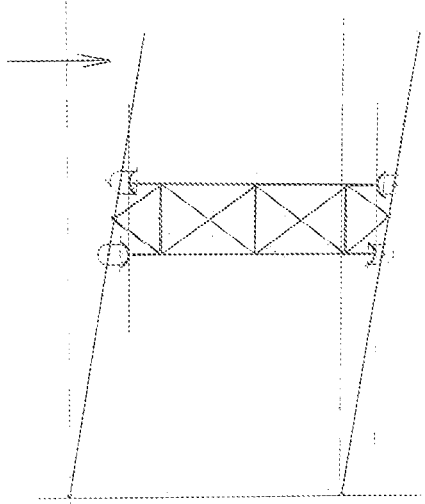
Figure 81:
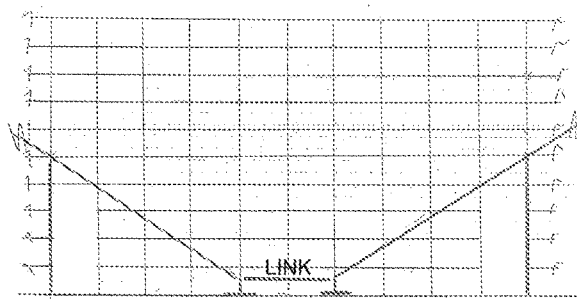
Figure 82:
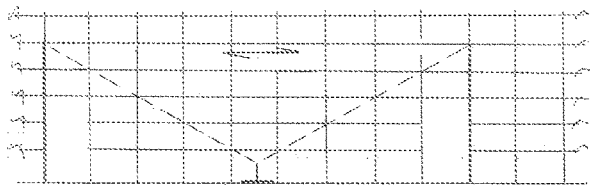
Figure 83:
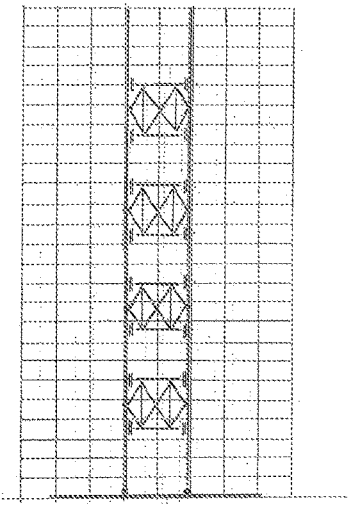
Figure 84:
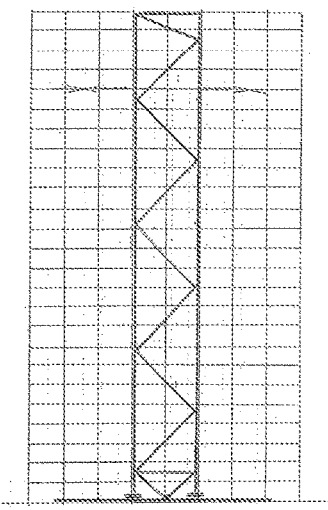
Figure 85:
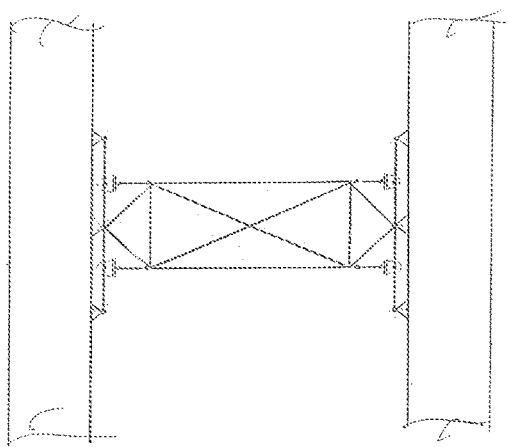
Figure 86:
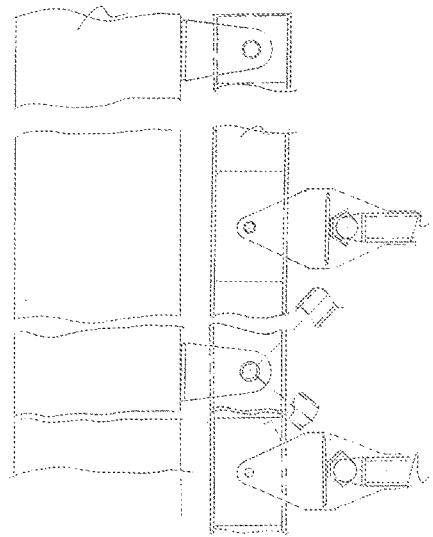
Figure 87:
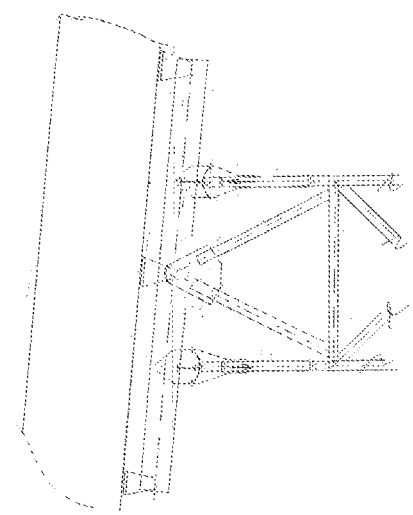
Figure 88:
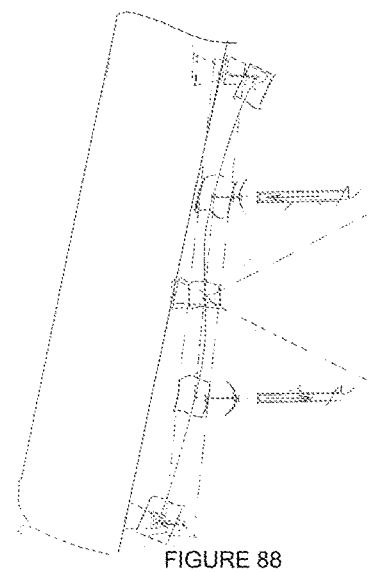
Figure 89:
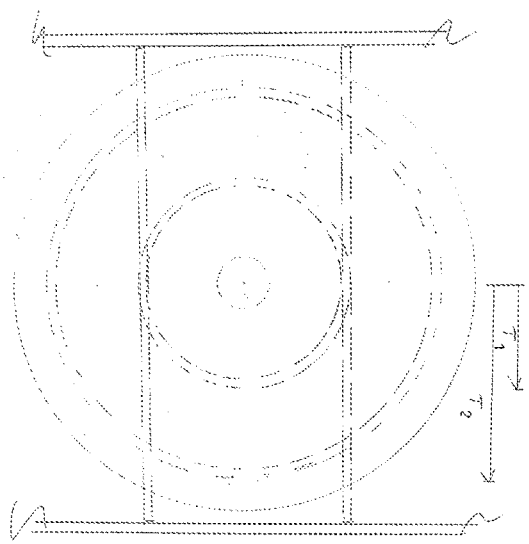
Figure 90:
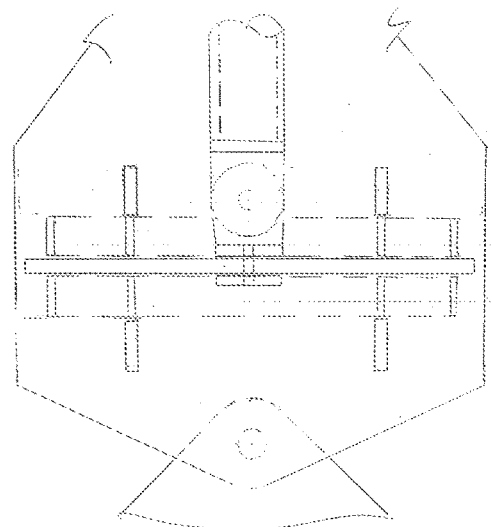
Figure 91:
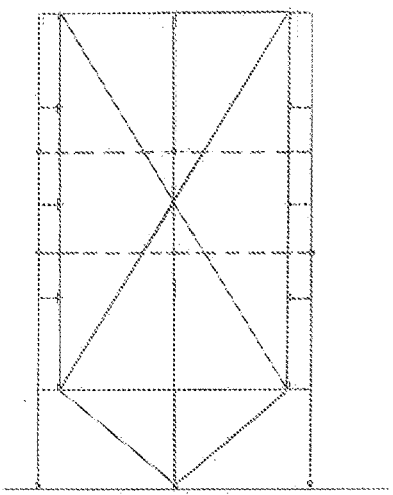
Figure 92:
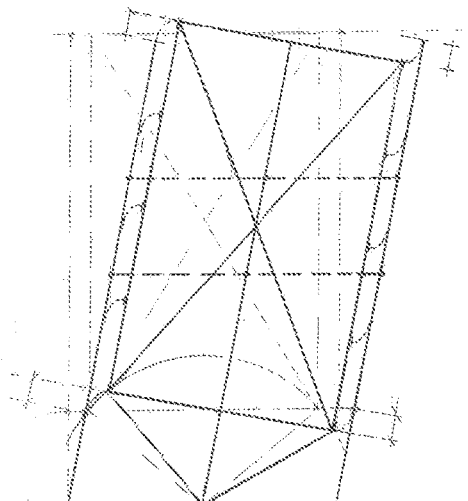
Figure 93:
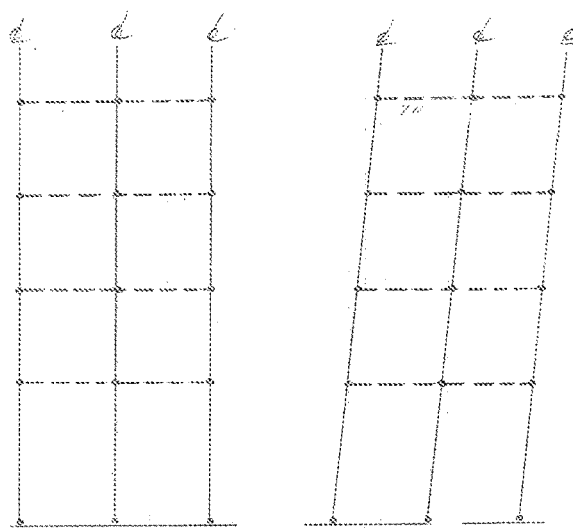
Figure 94:
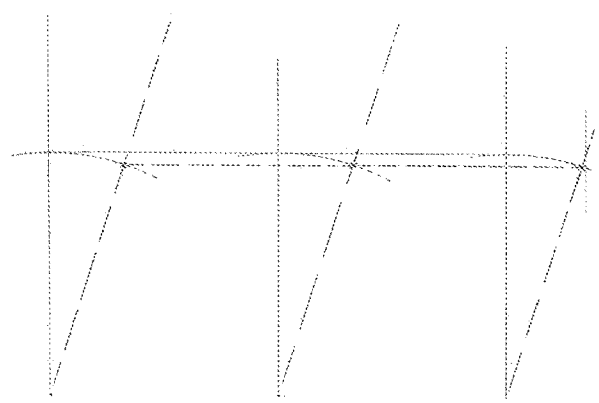
Figure 95:
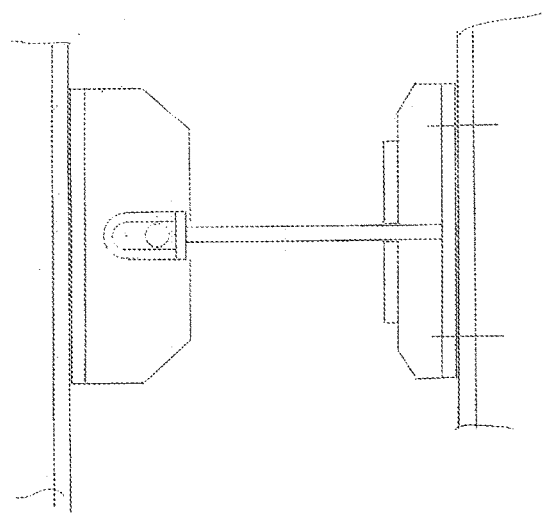
Figure 96:
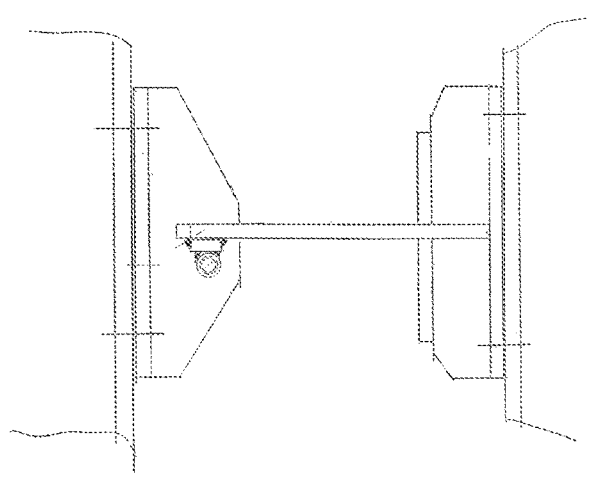
Figure 97:
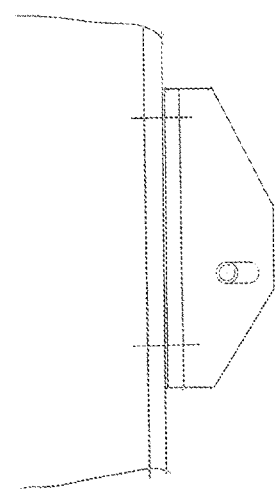
Figure 98:
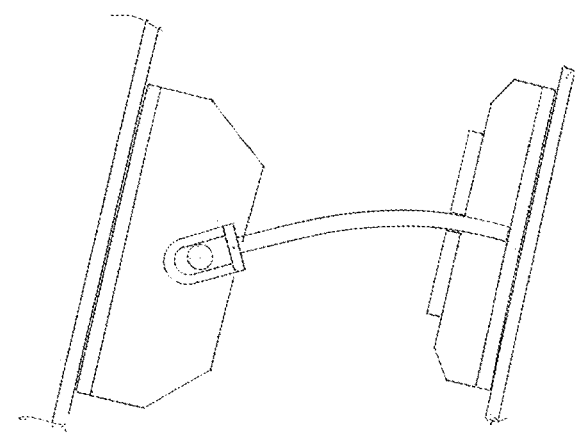
Figure 105:
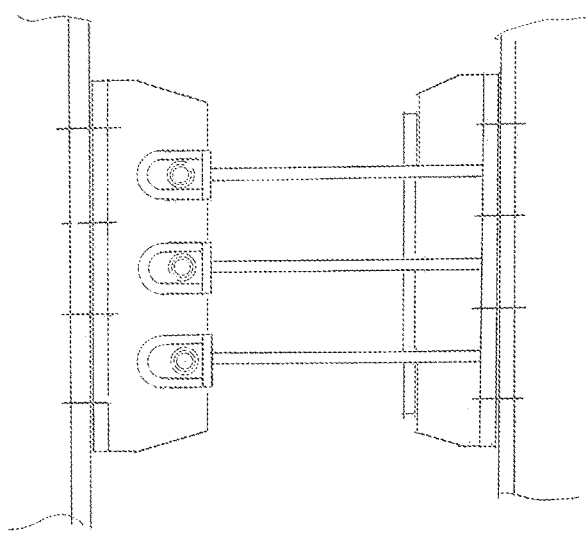
Figure 106:
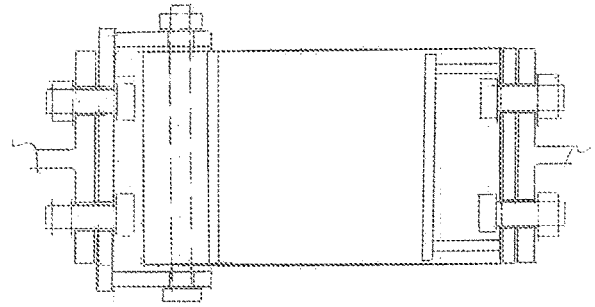
Figure 107:
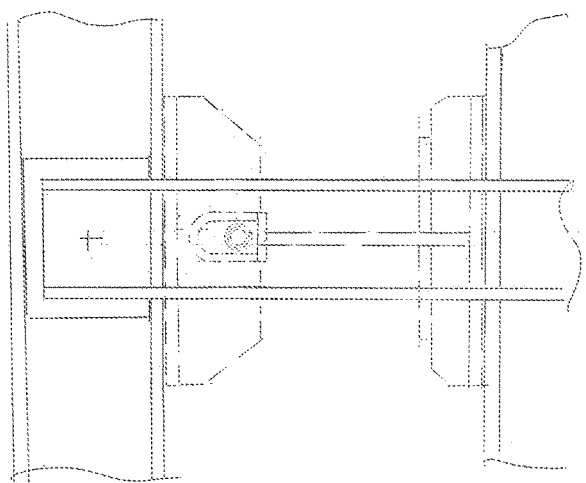
Figure 108:
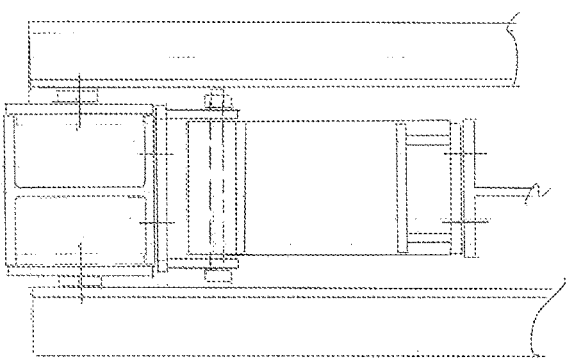
Figure 109:
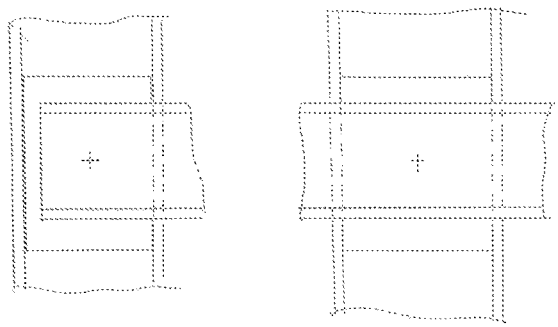
Figure 110:
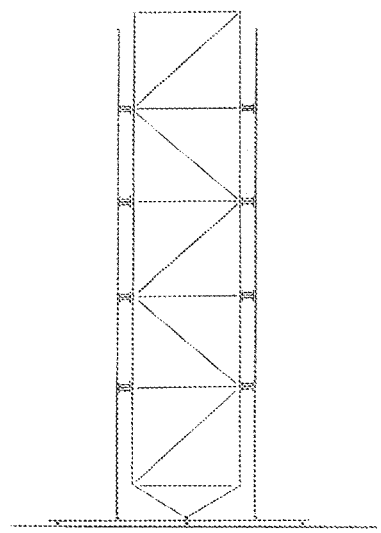
Figure 111:
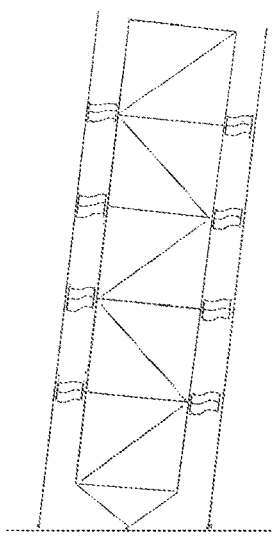
Figure 112:
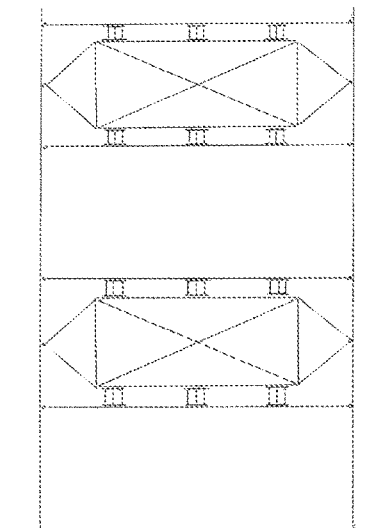
Figure 113:
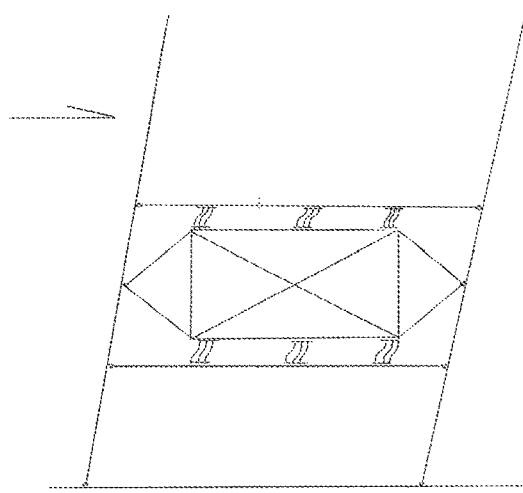
Figure 114:
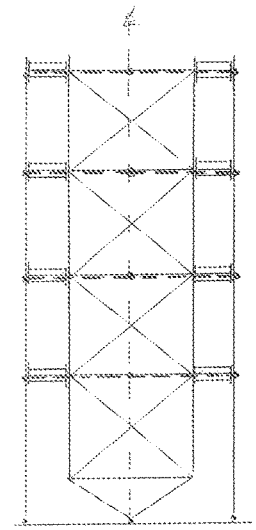
Figure 115:
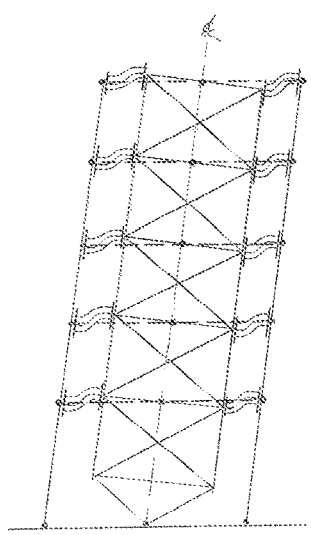
Figure 116:
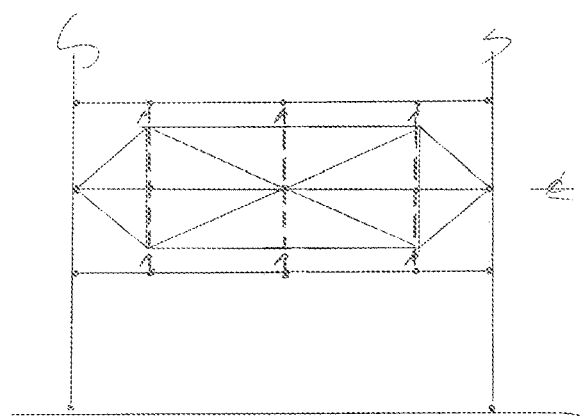
Figure 117:
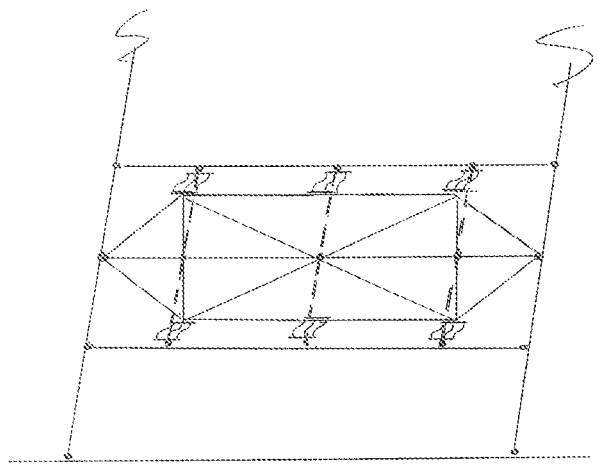

FIG. 29 shows the case of a circular plate supported both continuously and concentrically at two edges.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A force limiting and energy dissipating device and mechanism for limiting forces and dissipating energy during movement between a first structural member and a second structural member, the device comprising:
a first anchor for securement to the first structural member;
a second anchor for securement to the second structural member;
a resistively and resiliently deformable elastoplastically yielding flexural member having a first region and a second region spaced from the first region, the first and second regions being located respectively at the first anchor and the second anchor, whereby the first anchor secures the first region to the first structural member so that the first region is able to move with the first structural member relative to the second region and second structural member during a seismic event, and the second anchor and the second region are configured to allow translation or translation and rotation of the second region relative to the second anchor during oscillatory displacement of the first structural member relative the second structural member, the movement of the first region with the first structural member and the translation or translation and rotation of the second region relative to the second anchor allowing the resistively and resiliently deformable elastoplastically yielding flexural member to elastoplastically flexurally displace and yield such that a constant resistive yield force is maintained between the first and second structural members.

2. The device of claim 1 wherein the second anchor and second region are configured with free translational boundary conditions or free translational and free rotational boundary conditions to allow the resistively and resiliently deformable elastoplastically yielding flexural member to flex between the first and second anchors without generating tensile or compressive forces in the resistively and resiliently deformable elastoplastically yielding flexural member.

3. The device of claim 1 wherein the resistively and resiliently deformable elastoplastically yielding flexural member is configured to flex about a minor bending axis and yield at at least one yield zones, and cyclically displace and plastically flow, and wherein the resistively and resiliently deformable elastoplastically yielding flexural member has a length between the first anchor and the second anchor wherein the length may freely increase or decrease without generating tensile or compressive membrane forces in the resistively and resiliently deformable elastoplastically yielding flexural member, and wherein the reaction resultants at the second anchor and second region remain orthogonal to the tangent plane of the resistively and resiliently deformable elastoplastically yielding flexural member and wherein the horizontal component of the reaction resultant is in the same direction as the horizontal displacement component of the displacing second region, as the elastoplastically yielding flexural member displaces in use.

4. The device of claim 1 wherein the first anchor is connected to the first structural member and the second anchor is connected indirectly to the second structural member by a pivot connection and wherein the first structural member is a pushrod in a guide and wherein the guide pivots such that the pushrod maintains an alignment with the pivot connection and an orthogonal connection is maintained between the first structural member and the first region of the resistively and resiliently deformable elastoplastically yielding flexural member as the resistively and resiliently deformable elastoplastically yielding flexural member displaces in use.

5. The device of claim 2, wherein the first anchor is connected to the first structural member and the second anchor is connected to the second structural member and wherein one of the first structural member or the second structural member is directly supportive of a structure, and the other of the first structural member or the second structural member comprises a foundation, and wherein the constant resistive yield force is sufficient to control and limit forces developed within the device and within the structure and within the foundation and limits response accelerations and dynamic forces of masses seismically supported by the structure, and whereby the device maintains the constant resistive yield force in response to a seismic event.

6. The device of claim 1, wherein the device is connected to and intermediate the first structural member and the second structural member, and wherein the first and second structural members comprise adjacent lamina or chords, and wherein relative interlaminar displacement along and between the chords or laminar is resisted by a constant resistive shear force developed between the chords or laminar as the resistively and resiliently deformable elastoplastically yielding flexural member flexurally yields.

7. The device of claim 1 wherein the resistively and resiliently deformable elastoplastically yielding flexural member spans the first anchor and the second anchor, and wherein the second region has simply supported, flexurally continuous or flexurally restrained boundary conditions, each boundary condition being configured to enable free or unrestrained translation of the second end region, and enabling a length of the resistively and resiliently deformable elastoplastically yielding flexural member between the first anchor and the second anchor to freely increase and decrease without tensile or compressive membrane forces being generated within the resistively and resiliently deformable elastoplastically yielding flexural member, and wherein the resistively and resiliently deformable elastoplastically yielding flexural member is able to elastically or elastoplastically cyclically flex in opposing directions and flexurally yield and plastically flow, while maintaining the constant resistive yield force.

8. The device of claim 1 and further comprising a secondary flexural member integral with the force limiting and energy dissipating device, the secondary flexural member enabling independent adjustment of the elastic stiffness provided by the resistively and resiliently deformable elastoplastically yielding flexural member while the constant resistive yield force is maintained, thereby enabling independent adjustment of the natural elastic response frequency of a mass supporting structure within which the device is located while the structure maintains a constant resistive yield force.

9. The device of claim 7 further comprising a displacement limiter configured to stop displacement or deformation of the resistively and resiliently deformable elastoplastically yielding flexural member at a prescribed limit.

10. The device of claim 1 wherein the resistively and resiliently deformable elastoplastically yielding flexural member is able to cyclically displace and plastically flow while maintaining a constant resistive yield force within and across itself and between the first and second structural members when connected between the first and second structural members.

11. The device of claim 1 further comprising a pivotable rocker frame having a pivot connection to one of the first or second structural members, wherein the first or second structural members may comprise a foundation or structural base, and wherein the device is connected between the first or second structural members to provide a seismic control structure being configured to form a stable elastoplastic mechanism and cyclically displace and plastically flow while maintaining a constant resistive yield force.

12. The device of claim 10 wherein the first or second structural members may comprise a part of the rocker frame or a part indirectly connecting to the rocker frame.

13. The device of claim 10 wherein the first and second structural members comprise lamina or chords and wherein interlaminar displacement along and between the laminar or chords is resisted by a constant interlaminar shear force produced by the resistively and resiliently deformable elastoplastically yielding flexural member.

14. The device of claim 10 wherein the structure seismically supports a mass relative to a foundation and wherein a dynamic response force developed in the foundation during a seismic event is limited by the constant resistive yield force produced by the resistively and resiliently deformable elastoplastically yielding flexural member.

15. The device of claim 10 wherein the structure seismically supports a mass relative to the foundation and wherein response accelerations and dynamic response force developed in the mass during a seismic event is limited by the constant resistive yield force produced by the resistively and resiliently deformable elastoplastically yielding flexural member.

16. The device as claimed in claim 10 wherein the constant resistive yield force produced by the resistively and resiliently deformable elastoplastically yielding flexural member limits the dynamic response force whereby the dynamic response force is independent of the magnitude of the seismic event.

17. The device of claim 1 wherein the device is configured to be directly supportive of a structure, or located within a control structure; and wherein the constant resistive yield force produced by the resistively and resiliently deformable elastoplastically yielding flexural member enables the structure or control structure, in response to base motion input, to form a stable elastoplastic mechanism;

the structure or control structure able to cyclically displace and plastically flow while maintaining the constant resistive yield force;

the structure or control structure, enabled to control and limit forces developed within itself and within its supporting foundations, and to control and limit response accelerations and dynamic forces of masses it is supportive of or of masses supported by other structures it is seismically supportive of as it resists and endures with the constant resistive yield force, ground or base motion input from a seismic event, or from blast impact of ground at distance, or from load or impact load applied directly to structure.

18. The device of claim 1 wherein the second anchors fix the second end regions of the yield plate, to a second structural member, being a base, or foundation, or floor;

the first anchor fixes the first region of the plate to a first structural member, being, the base of a chord of a structural frame;

the second anchors and second end regions of the plate configured with boundary conditions whereby the plate is able to cyclically flex, under the action of uplift loads from the chord, away from the base or foundation or floor, and form a curve with a convex top surface, and the plate being able to return flex to the base or foundation or floor under the action of reverse loading from the chord;

the yield plate being able to cyclically flex and flexurally yield at first region, without generating any prying action between second regions and second anchors or second structural member or the base or foundation or floor, or cause or allow any membrane forces to develop within the yield plate, while the yield plate maintains a constant resistive yield force within and across itself and a constant resistive yield force between first and second structural members as they displace relative to each other in response to base motion input from a seismic event.

19. The device of claim 18, wherein the plate able to cyclically flex under the action of uplift loads from the chord, away from the base or floor, and form a curve with a concave top surface.

20. A device as claimed in claim 1 wherein the device comprises a mount to directly support a structure to a foundation, and wherein the flexural member comprises:
   a yield plate with two second regions and the first region being provided between the second regions, the first region of the yield plate anchored to the first structural member of a structure being an upright column member or chord member;
   the yield plate extending each side of the first region, in the form of two wings, each wing extending from the first region to each of the second regions;
   the second regions of the yield plate, anchored by two second anchors to the second structural member being a base or foundation;
   the upright structural member able to apply an oscillatory force to the first region of the plate causing the plate to flex and locally yield at the plates first region;
   the first end region being a yield zone of the plate;
   the boundary conditions of the second regions and second anchors being configured to allow the second regions to translate and rotate relative to their hold down anchors, and the first region, and to allow the length along a flexing curve of the plate between the anchors to freely increase or decrease, without generating any membrane forces within the plate or prying actions between second regions, second anchors or foundation;
   the plate being configured to flex into a monotonic curve and yield at the yield zone as it is pulled away from its base by uplift action from the upright column member, and pushed back to its initial position by reversing action in the column member as the column member and the structure it is part of oscillates or rocks in response to base motion input from a seismic event;
   the yield plate maintaining a constant resistive yield force, with displacement, between the first structural member, the upright column member, and the second structural member;
   and enabling the structure to control and limit forces developed within itself, and control and limit forces developed within the foundations or base, and control and limit response accelerations and dynamic forces developed within masses that it may be seismically supportive of, or masses supported by other structures which it may be seismically supportive of, as it resists and endures with a constant resistive yield force, base motion, or ground motion input due to a seismic event.

21. The device of claim 20 wherein at least one of the second anchors and respective anchor regions are together configured with boundary conditions to allow translational and rotational movement of the second regions relative to the second anchors by having a translation and rotation feature selected from any one of:
   (i) wing slots within the second regions,
   the second regions being locally raised or elevated above the base, or being packed above the base, to allow the second regions to freely translate or freely translate and freely rotate, without prying, relative to the second anchor or base, and allow the length along the flexing curve of the plate, between first anchor and second anchors to freely increase or decrease as the plate flexes or displaces, and without generating any tensile or compressive membrane forces within the plate,
   (ii) the second anchors or the second regions being configured with springs, to allow the second regions to freely translate or freely translate and freely rotate, without prying, relative to the second anchor or base, and allow the length along the flexing curve of the plate, between first anchor and second anchors to freely increase or decrease as the plate flexes or displaces, and without generating any tensile or compressive membrane forces within the plate, or
   (iii) sliding hinges integral with and forming part and an extension of the second regions of the flexural member, and which allow the second end regions inclusive of the sliding hinges to freely translate or freely translate and freely rotate relative to the second anchors and allow the length along the flexing curve of the plate inclusive of the sliding hinges, between first anchor and second anchors to freely increase or decrease as the plate flexes or displaces, and without generating any tensile or compressive membrane forces within the plate.

22. The of claim 1, further including a rocker frame, wherein:
   the rocker frame is pivotably connected to the second structural member;
   the first structural member comprising a part of the rocker frame and the first anchor fixing the first end region of the flexure member directly to the rocker frame, or the first structural member being a linking part of the rocker frame, and indirectly connecting the first anchor and first region to the rocker frame;
   the second region located and secured by the second anchor to the second structural member;
   the second structural member being a structural base or foundation, or the second structural member being a pivotably based member or chord, and part of the rocker frame, and indirectly connecting the second anchor and second region with the structural base or foundation;
   the second anchor and second region configured with free translational boundary conditions or free translational and free rotational boundary conditions, to allow the flexure member to flex, and the length along a flexing curve of the flexure member, between reaction points or reaction surfaces at anchors, to freely increase or decrease, and without generating tensile or compressive forces in the flexure member, and enable reaction resultants at the second anchor and second region to rotate with displacement of the flexure member and remain orthogonal to the tangent plane of the flexural member;
   the flexure member being configured to flex about a minor bending axis, and yield at at least one specific yield zones, while cyclically displacing while maintaining a constant resistive yield force;
   the flexure member maintaining a constant resistive yield force within and across itself and between the first and second structural members;
   the constant resistive yield force between first and second structural members, enabling a control structure to form an elastoplastic mechanism, also of constant resistive yield force,
   and enabling the control structure to control and limit forces developed within itself, and control and limit forces developed within its foundations or structural base, and control and limit response accelerations and dynamic forces developed within masses that it may be seismically supportive of, or within masses supported by other structures which it may be seismically supportive of, as it resists and endures with a constant resistive yield force, base motion or ground motion input due to a seismic event, including base or ground motion input from extreme seismic events, and from blast and ground impact at distance; and from loading and impact loading applied directly to the control structure.

23. The device of claim 1 further including a rocker frame, wherein:

the rocker frame is pivotably connected to the second structural member;

a pivotable, elastoplastically yielding rocker unit within which the elastoplastically yielding flexural member is located;

the first region located and secured at the first anchor to the first structural member;

the first structural member being of the form of a push rod, and a linking part of the rocker frame assembly, and sleeve guided at one end by the first end of the rocker unit, to secure and first anchor with the first end region of the flexure members, and linking and connecting pivotably at its second distal end to the rocker frame, indirectly connecting the first region of the flexure members to the rocker frame;

the second region located and secured at the second anchor to the rocker unit;

the second end of the rocker unit pivotably connected to the second structural member;

the second structural member being a structural base or foundation, or the second structural member being a pivotably based member or chord, and part of the rocker frame assembly, and indirectly connecting the second end of the rocker unit with a structural base or foundation;

the second anchor and second end region of the flexure member configured with free translational boundary conditions or free translational and free rotational boundary conditions, to allow the flexure member to flex, and the length along a flexing curve of the flexure member, between reaction points or reaction surfaces at anchors, to freely increase or decrease, and without generating tensile or compressive forces in the flexure member, and enable reaction resultants at the second anchor and second region to rotate with displacement of the yield element and remain orthogonal to the tangent plane of the flexure member;

the flexure member being configured to flex about a minor bending axis, and yield at at least one yield zones, while cyclically displacing while maintaining a constant resistive yield force;

the flexure member maintaining a constant resistive yield force within and across itself and between the first and second structural members;

the constant resistive yield force between first and second structural members, enabling a control structure to form an elastoplastic mechanism, also of constant resistive yield force;

and enabling the structure or control structure to control and limit forces developed within itself, and control and limit forces developed within its foundations or structural base, and control and limit response accelerations and dynamic forces developed within masses that it may be seismically supportive of, or within masses supported by other structures which it may be seismically supportive of, as it resists and endures with a constant resistive yield force, base motion or ground motion input due to a seismic event, including base or ground motion input from extreme seismic events, and from blast and ground impact at distance; and from loading and impact loading applied directly to control structure.

24. The force limiting and energy dissipating device of claim 23 wherein the structural member comprises a structural base or foundation, or the structural member comprises a chord pivotably connected to a structural base or foundation, and the yield connector is directly or indirectly connected between the rocker frame and the structural member.

25. The force limiting and energy dissipating device of claim 23 wherein the yield connector is connected between the rocker frame and a further structural member, the further structural member being pivotably connected to the structural member.

26. The force limiting and energy dissipating device of claim 24 wherein the structural member and further structural member comprise chords.

27. The force limiting and energy dissipating device of claim 23 wherein the rocker frame comprises a vertical aspect and the structural member comprises a horizontal structural base or foundation, or the structural member comprises a vertical chord pivotably connected to a horizontal structural base or foundation.

28. The force limiting and energy dissipating device as claimed in claim 23 wherein the rocker frame has a horizontal aspect and is pivotably connected at each end to vertical chords which are pivotably connected to a horizontal base or foundation.

29. The force limiting and energy dissipating device of claim 23 wherein a push rod connector element is sleeve guided by a pivotable rocker unit, the push rod anchored at one end to the first region of the yield element, and pivotably connecting the other end to a rocker frame, and wherein the yield element has two second regions, each second region being anchored by second anchors to a casing or body of the pivotable rocker unit, which pivotably connects to the structural member, whereby the pivotable rocker unit guides the push rod connector element, indirectly connecting the yield element to the rocker frame and structural member.

* * * * *